(12) United States Patent
Zawacki et al.

(10) Patent No.: US 11,813,918 B2
(45) Date of Patent: Nov. 14, 2023

(54) AXLE/SUSPENSION SYSTEM FOR HEAVY-DUTY VEHICLES

(71) Applicant: Hendrickson USA, L.L.C., Schaumburg, IL (US)

(72) Inventors: Jeff R. Zawacki, Channahon, IL (US); Dmitriy Enrikovich Rubalskiy, Glenview, IL (US); Gary E. Gerstenslager, Canton, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 0 days.

(21) Appl. No.: 17/897,927

(22) Filed: Aug. 29, 2022

(65) Prior Publication Data

US 2023/0060738 A1 Mar. 2, 2023

Related U.S. Application Data

(60) Provisional application No. 63/238,474, filed on Aug. 30, 2021.

(51) Int. Cl.
 *B60G 5/053* (2006.01)
 *B60G 9/00* (2006.01)
 (Continued)

(52) U.S. Cl.
 CPC .............. *B60G 5/053* (2013.01); *B60G 9/003* (2013.01); *B60G 15/06* (2013.01); *B60G 2200/31* (2013.01)

(58) Field of Classification Search
 CPC .......... B60G 5/053; B60G 7/04; B60G 9/003; B60G 11/04; B60G 11/10; B60G 11/107;
 (Continued)

(56) References Cited

U.S. PATENT DOCUMENTS 3,602,523 A * 8/1971 Poulos .................. B60G 11/113
 280/682
4,889,361 A 12/1989 Booher
 (Continued)

FOREIGN PATENT DOCUMENTS

CN 102658656 A * 9/2012
DE 3741334 A1 6/1989
 (Continued)

OTHER PUBLICATIONS

Description Translation for CN 102658656 from Espacenet (Year: 2012).*

(Continued)

*Primary Examiner* — Jason D Shanske
*Assistant Examiner* — Daniel M. Keck
(74) *Attorney, Agent, or Firm* — Dureska & Moore, LLC; David P. Dureska; Brent L. Moore

(57) ABSTRACT

A tandem mechanical spring axle/suspension system for heavy-duty vehicles includes a tandem assembly that comprises a front beam of a suspension assembly of a front axle/suspension system, a rear beam of a suspension assembly of a rear axle suspension system, and a mechanical spring. The mechanical spring operatively engages the front beam and the rear beam and extends longitudinally therebetween, as well as operatively engages a main member of the vehicle frame.

34 Claims, 26 Drawing Sheets

(51) Int. Cl.
  *B60G 11/10*   (2006.01)
  *B60G 11/107*  (2006.01)
  *B60G 15/06*   (2006.01)

(58) Field of Classification Search
  CPC ........ B60G 15/02; B60G 15/04; B60G 15/06;
       B60G 2200/31; B60G 2200/312; B60G
       2200/464; B60G 2202/112; B60G
       2204/121; B60G 2204/41; B60G
       2204/4102; B60G 2204/4103; B60G
       2204/43; B60G 2204/4302; B60G
       2204/4502; B60G 2206/428; F16F 1/00
  See application file for complete search history.

(56) References Cited

U.S. PATENT DOCUMENTS

| | | |
|---|---|---|
| 5,037,126 A | 8/1991 | Gottschalk et al. |
| 5,046,752 A | 9/1991 | Stephens et al. |
| 5,788,263 A | 8/1998 | VanDenberg |
| 6,991,223 B2 | 1/2006 | Platner et al. |
| 7,731,211 B2 | 6/2010 | Ramsey |
| 8,419,029 B2 | 4/2013 | Muckelrath et al. |
| 9,079,467 B2 | 7/2015 | Westnedge et al. |
| 9,261,227 B2 | 2/2016 | Pierce et al. |
| 9,327,571 B2 | 5/2016 | Pierce et al. |
| 9,580,057 B2 | 2/2017 | Pierce et al. |
| 2006/0244234 A1 | 11/2006 | Ramsey |
| 2006/0249923 A1 | 11/2006 | Ramsey |
| 2010/0253032 A1 | 10/2010 | Ramsey |
| 2011/0248115 A1* | 10/2011 | Proia ...................... B62D 7/144 244/50 |
| 2014/0117639 A1 | 5/2014 | Ramsey |

FOREIGN PATENT DOCUMENTS

| | | | |
|---|---|---|---|
| GB | 584930 | 1/1947 | |
| WO | 0242099 A1 | 5/2002 | |
| WO | 2004094170 A1 | 11/2004 | |
| WO | WO-2015012930 A1 * | 1/2015 | ............. B60G 11/22 |

OTHER PUBLICATIONS

Description Translation for WO 2015/012930 from Espacenet (Year: 2015).*

* cited by examiner

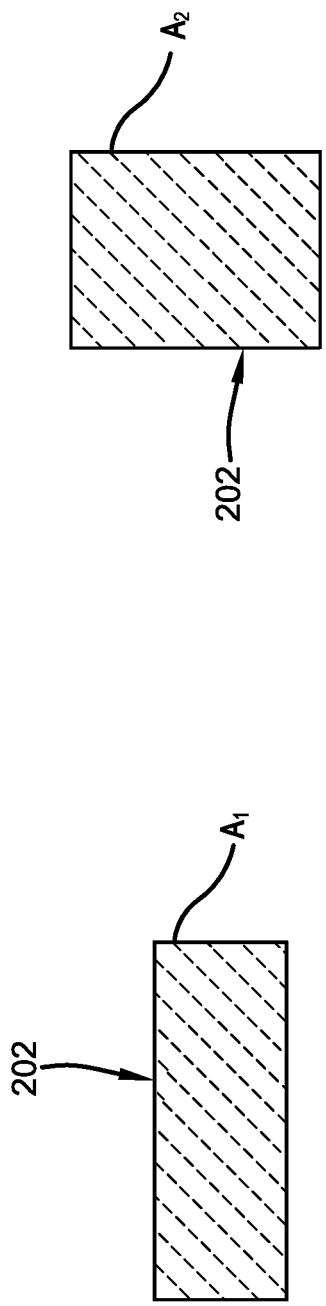
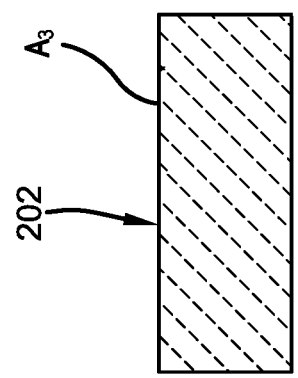
FIG. 15A
FIG. 15B
FIG. 15C

AXLE/SUSPENSION SYSTEM FOR HEAVY-DUTY VEHICLES

CROSS-REFERENCE TO RELATED APPLICATION

This application claims the benefit of U.S. Provisional Patent Application Ser. No. 63/238,474 filed on Aug. 30, 2021.

BACKGROUND

Technical Field

The subject disclosure relates generally to the art of axle/suspension systems for heavy-duty vehicles such as trucks and tractor-trailers. More particularly, the invention relates to the art of tandem axle/suspension systems for heavy-duty vehicles, such as tractor-trailers or semi-trailers, which locate the vehicle axle(s) and stabilize the vehicle during operation. More specifically, the subject disclosure is directed to a tandem mechanical spring axle/suspension system for heavy-duty vehicles that incorporates a pair of mechanical springs, each one of which spans and is operatively engaged with a respective side of the front axle/suspension system and the rear axle/suspension system of the tandem axle/suspension system and also is operatively engaged with a respective main member of the heavy-duty vehicle. The tandem mechanical spring axle/suspension system is light weight, provides improved ride quality, braking and handling, maintains static and dynamic load equalization between the axles of the tandem axle/suspension system, and lowers manufacturing and maintenance costs.

Background Art

Heavy-duty vehicles that transport freight, for example, tractor-trailers or semi-trailers and straight trucks, include suspension assemblies that connect the axles of the vehicle to the frame of the vehicle. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience, reference herein will be made to a subframe, with the understanding that such reference is by way of example, and that the subject disclosure applies to heavy-duty vehicle primary frames, movable subframes and non-movable subframes.

In the heavy-duty vehicle art, reference is often made to an axle/suspension system, which typically includes a pair of transversely-spaced suspension assemblies and the axle that the suspension assemblies connect to the vehicle subframe. The axle/suspension system of a heavy-duty vehicle acts to locate or fix the position of the axle and to stabilize the vehicle. More particularly, as the vehicle is traveling over-the-road, its wheels encounter road conditions that impart various forces to the axle on which the wheels are mounted, and in turn, to the suspension assemblies that are connected to and support the axle, as well as to the subframe of the heavy-duty vehicle to which the suspension assemblies are mounted. These forces consequently act to place or create loads on the axle and the suspension assemblies, as well as the subframe of the heavy-duty vehicle. In order to minimize the detrimental effect of these forces and resulting loads on the heavy-duty vehicle subframe and other vehicle components as the vehicle is operating, and in turn on any cargo and/or occupants being carried by the vehicle, the axle/suspension system is designed to absorb or dampen at least some of the forces and/or resulting loads.

Mechanical spring axle/suspension systems utilized with conventional or prior art subframe designs were developed before the advent of air-ride axle/suspension systems. These mechanical spring axle/suspension systems typically include a pair of leaf spring sets or stacks that are transversely spaced and are connected to the axle and also the subframe of the vehicle. Each leaf spring stack is engineered to carry the rated vertical load of its respective axle. Ordinarily, a trailer employs two mechanical spring axle/suspension systems at the rear of the trailer, that is, a front mechanical spring axle/suspension system and a rear mechanical spring axle/suspension system mounted on and depending from a pair of transversely spaced longitudinally extending main members of the subframe via hangers and equalizers or rockers, as is known in the art. This configuration is collectively referred to as a tandem mechanical spring axle/suspension system in the art. As is known to those skilled in the art, the front end of the trailer is supported by a separate axle/suspension system of the tractor. While reference is made herein to "a tandem axle/suspension system" as including a front and rear axle suspension system mounted on and depending from a pair of transversely spaced longitudinally extending main members of the subframe, it is to be understood that the tandem axle/suspension system could include more than two axle/suspension systems mounted on a subframe without affecting the overall concept or operation of the subject disclosure.

It is to be understood that, as mentioned above, each one of the front and rear mechanical spring axle/suspension systems includes a generally identical pair of transversely-spaced, longitudinally-extending leaf spring sets or stacks, each one of which is disposed on a respective one of the driver side and passenger side of the vehicle. In the prior art, mechanical spring axle/suspension systems have utilized a mechanical component, such as a load leveler or equalizer beam, mounted between the leaf spring stack of the front axle/suspension system and the leaf spring stack of the rear axle/suspension system. The equalizer beam is intended to balance the loads between the front and rear axles when the vehicle is static and located on a level surface, as well as when the vehicle is traversing road surface irregularities, but is generally unable to provide optimum inter-axle load transfer during braking.

With prior art tandem mechanical spring axle/suspension system designs, a heavy braking application of the heavy-duty vehicle creates forces that typically increase the load on the rear axle and decrease the load on the front axle. This increased load on the rear axle and decreased load on the front axle during braking is often referred to as inter-axle load transfer. Inter-axle load transfer during braking decreases the effectiveness of the front axle for braking, which in turn causes uneven braking of the vehicle, thereby decreasing braking or stopping efficiency and undesirably increasing the stopping distance of the vehicle. Moreover, the front axle may potentially skip or skid during a heavy braking application, creating flat spots on the tires, thereby undesirably accelerating tire wear. In addition, in those applications where an anti-lock braking system is utilized on the heavy-duty vehicle, inter-axle load transfer can force the anti-lock brake system (ABS) to cycle the brake air pressure, thus requiring longer brake times and increasing the distance it takes for the heavy-duty vehicle to stop.

Prior art tandem mechanical spring axle/suspension systems often include radius rods, which are separate components that extend between each axle and a respective vehicle subframe member, and are intended to maintain axle alignment and to react brake forces and other fore-aft forces during operation of the heavy-duty vehicle. However, radius rods typically are unable to reduce inter-axle load transfer during braking, as will be described in greater detail below. Also, because each radius rod is a separate component, it undesirably adds weight and expense to the tandem mechanical spring axle/suspension system. In addition, radius rods may need to be replaced when performing alignment of the tandem mechanical spring axle/suspension system, thereby undesirably increasing the maintenance costs associated with the system.

Prior art tandem mechanical spring axle/suspension systems primarily rely on the leaf springs to manage roll stability of the vehicle, and thus the leaf springs are designed to include a relatively high spring rate. The high spring rate of the leaf springs results in a very harsh ride, thereby decreasing comfort to passengers and also decreasing cargo protection. Moreover, prior art tandem mechanical spring axle/suspension systems utilize a clamp assembly to attach the leaf springs to each axle. Because the heavy-duty vehicle is subjected to large forces or loads during operation, the clamp assembly may potentially exhibit durability issues over time and it also requires ongoing maintenance to maintain proper torque.

Air-ride axle/suspension systems for heavy-duty vehicles, which are employed in prior art tandem air-ride axle/suspension systems, are also known and have recently become the axle/suspension system of choice for heavy-duty vehicles as they typically provide improved load equalization and the best ride characteristics to the vehicle during operation. Although such air-ride axle/suspension systems for heavy-duty vehicles can be found in widely varying structural forms, in general their structure is similar in that each system typically includes a pair of transversely-spaced suspension assemblies. In some heavy-duty vehicles, the suspension assemblies are connected directly to the primary frame of the vehicle. In other heavy-duty vehicles, the primary frame of the vehicle supports a subframe, and the suspension assemblies connect directly to the subframe.

Each suspension assembly of an air-ride axle/suspension system generally includes a longitudinally extending elongated beam. Each beam typically is located adjacent to and below a respective one of a pair of spaced-apart longitudinally extending main members and one or more cross members that form the subframe of the heavy-duty vehicle. More specifically, each beam is pivotally connected at one of its ends to a hanger, which in turn is attached to and depends from a respective one of the main members of the vehicle. An axle extends transversely between and typically is connected to or captured by the beams of the pair of suspension assemblies at a selected location from about the mid-point of each beam to the end of the beam opposite from its pivotal connection to the hanger. The beam end opposite its pivotal connection to the hanger typically is also connected to an air spring, which in turn is connected to a respective one of the main members of the subframe. A brake system and/or one or more shock absorbers for providing damping to the axle/suspension system of the vehicle may also be mounted on the axle/suspension system. The beam may extend rearwardly or frontwardly from its pivotal connection to the hanger relative to the front of the vehicle, thus defining what are typically referred to as trailing arm or leading arm axle/suspension systems, respectively. However, for purposes of the description contained herein, it is understood that the term "trailing arm" will encompass beams that extend either rearwardly or frontwardly with respect to the front end of the heavy-duty vehicle.

Air-ride axle/suspension systems of heavy-duty vehicles act to cushion the ride, dampen vibrations, and stabilize the vehicle. More particularly, as the vehicle is traveling over the road, its wheels encounter road conditions that impart various forces, loads, and/or stresses, collectively referred to herein as forces, to the respective axle on which the wheels are mounted, and in turn, to the suspension assemblies that are connected to and support the axle. In order to minimize the detrimental effect of these forces on the vehicle during operation, the air-ride axle/suspension system is designed to react and/or absorb at least some of the forces.

These forces include vertical forces caused by vertical movement of the wheels as they encounter certain road conditions, fore-aft forces caused by acceleration and deceleration of the vehicle, and lateral and torsional forces associated with transverse vehicle movement, such as turning of the vehicle and lane-change maneuvers. In order to address such disparate forces, air-ride axle/suspension systems have differing structural requirements. More particularly, it is desirable for an air-ride axle/suspension system to be fairly stiff in order to minimize the amount of sway experienced by the vehicle, and thus provide what is known in the art as "roll stability". However, it is also desirable for an air-ride axle/suspension system to be relatively flexible to assist in cushioning the vehicle from vertical impacts, and to provide compliance so that the components of the air-ride axle/suspension system resist failure, thereby increasing durability of the axle/suspension system.

A key component of the air-ride axle/suspension system is the air spring, which cushions the ride of the heavy-duty vehicle from vertical impacts. An air spring typically includes three main components: a flexible bellows, a piston, and a bellows top plate. The air spring bellows is filled with a volume of pressurized air provided to the air spring via an air reservoir attached to the heavy-duty vehicle, such as an air tank. The volume of pressurized air, or "air volume", that is contained within the air spring is a major factor in determining the spring rate, or stiffness, of the air spring. The larger the air volume of the air spring, the lower the spring rate of the air spring. A lower spring rate is generally more desirable during normal heavy-duty vehicle operation because it provides a softer ride to the vehicle, and hence to passengers and cargo.

Subframes equipped with prior art air-ride axle/suspension systems, including those configured in tandem, can be relatively expensive to manufacture as they require the installation and utilization of air systems to provide pressurized air to the air springs of the air-ride axle/suspension systems. More specifically, the typical air-ride axle/suspension system requires air springs, hoses, tanks, compressed air, and one or more height control valves. These components of the air-ride axle/suspension system add additional manufacturing costs, and because they must be maintained during the life of the heavy-duty vehicle, add additional maintenance costs throughout the life of the heavy-duty vehicle. In addition, these air-ride axle/suspension system components are heavy and add additional weight to the heavy-duty vehicle, thus potentially reducing the amount of cargo that can be carried by the vehicle and increasing fuel cost associated with operation of the vehicle.

As a result, a need exists in the art for a tandem mechanical spring axle/suspension system that overcomes the disadvantages, drawbacks, and limitations of prior art tandem mechanical spring axle/suspension systems by lowering the spring rate, reducing inter-axle load transfer due to braking, improving the distribution of forces encountered by the tandem axle/suspension system during operation, eliminating the clamp assembly and decreasing the stresses placed on the vehicle subframe, while being generally lighter weight and more economical than prior art tandem air-ride axle/suspension systems. The tandem mechanical spring axle/suspension system of the subject disclosure satisfies these needs and provides a hybrid combination air-ride and mechanical-type tandem axle/suspension system which utilizes a pair of mechanical springs in order to react loads from the driver side and passenger side suspension assemblies of the front and rear axle/suspension systems, respectively. Each mechanical spring of the tandem mechanical spring axle/suspension system replaces a pair of air springs located on the driver side or passenger side suspension assemblies of the front and rear air-ride axe/suspension systems of a prior art tandem air-ride axle/suspension system, respectively, and also replaces a pair of mechanical springs located on the driver side or passenger side suspension assemblies of the front and rear mechanical spring axle/suspension systems of prior art tandem mechanical spring axle/suspension systems, respectively.

BRIEF SUMMARY OF THE SUBJECT DISCLOSURE

An objective of the subject disclosure is to provide a tandem mechanical spring axle/suspension system for heavy-duty vehicles that is light weight.

Another objective of the subject disclosure is to provide a tandem mechanical spring axle/suspension system for heavy-duty vehicles that provides improved ride quality.

Yet another objective of the subject disclosure is to provide a tandem mechanical spring axle/suspension system for heavy-duty vehicles that provides improved braking and handling.

Another objective of the subject disclosure is to provide a tandem mechanical spring axle/suspension system for heavy-duty vehicles that maintains static and dynamic load equalization between the axles of the front and rear axle/suspension systems of the tandem mechanical spring axle/suspension system.

Yet another objective of the subject disclosure is to provide a tandem mechanical spring axle/suspension system for heavy-duty vehicles with decreased manufacturing and maintenance costs.

These objectives and others are achieved by the tandem mechanical spring axle/suspension system for a heavy-duty vehicle of the subject disclosure, which includes a tandem assembly comprising: a front suspension assembly pivotally attached to a main member of the heavy-duty vehicle; a rear suspension assembly pivotally attached to the main member; and a mechanical spring operatively engaged with the front suspension assembly, the rear suspension assembly, and the main member.

These objectives and others are also achieved by a mechanical spring for an axle/suspension system for a heavy-duty vehicle of the subject disclosure, which includes an elongate structure, the elongate structure tapering in both a transverse width and a vertical thickness in a semi-parabolic manner along a length of the elongate structure.

BRIEF DESCRIPTION OF THE SEVERAL VIEWS OF THE DRAWINGS

The exemplary embodiments of the invention, illustrative of the best mode in which Applicant has contemplated applying the principles, are set forth in the following description and are shown in the drawings.

FIG. 15A is a transverse cross-sectional view of the driver side mechanical spring of the first exemplary embodiment tandem mechanical spring axle/suspension system shown in FIG. 15, taken along line 15A-15A;

FIG. 15B is a transverse cross-sectional view of the driver side mechanical spring of the first exemplary embodiment tandem mechanical spring axle/suspension system shown in FIG. 15, taken along line 15B-15B;

FIG. 15C is a transverse cross-sectional view of the driver side mechanical spring of the first exemplary embodiment tandem mechanical spring axle/suspension system shown in FIG. 15, taken along line 15C-15C;

Similar numerals refer to similar parts throughout the drawings.

DETAILED DESCRIPTION OF THE SUBJECT DISCLOSURE

Figure 1:
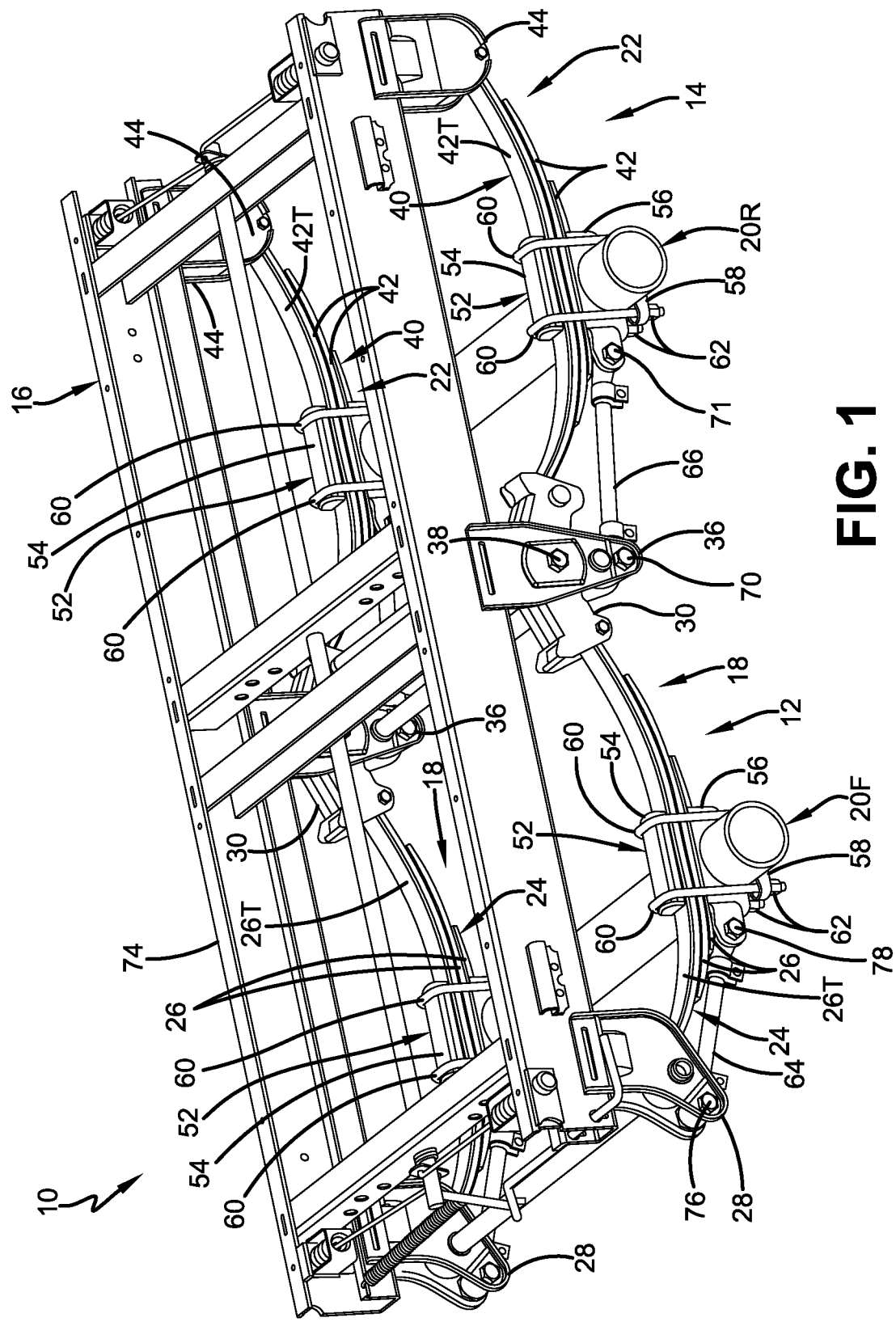
FIG. 1 is a driver side top-front perspective view of a prior art tandem mechanical spring axle/suspension system, shown in an overslung configuration mounted on a subframe of a heavy-duty vehicle.
Figure 2:
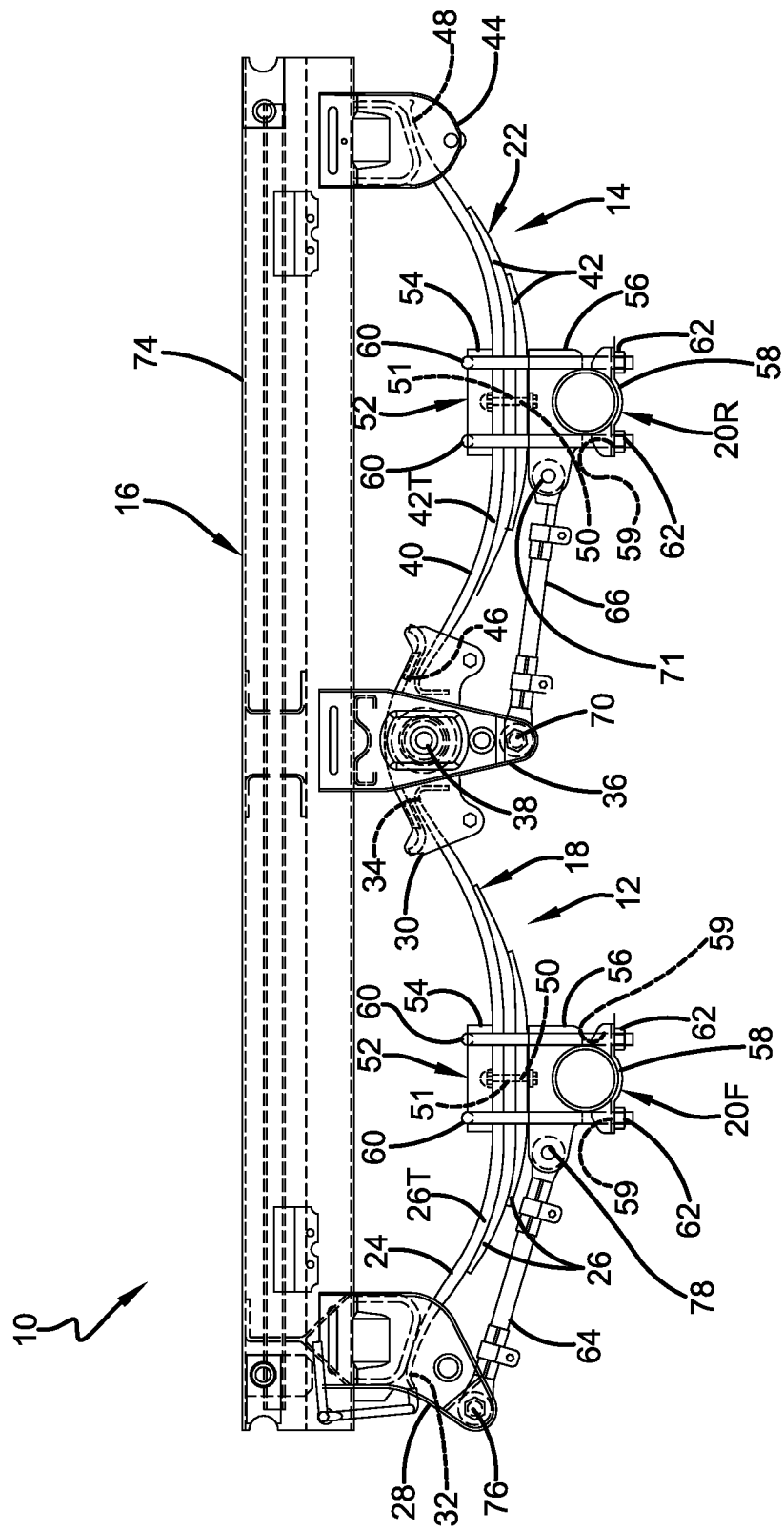
FIG. 2 is a driver side elevational view of the tandem mechanical spring axle/suspension system shown in FIG. 1, with hidden components represented by broken lines.

In order to better understand the tandem mechanical spring axle/suspension system for heavy-duty vehicles of the subject disclosure, a prior art tandem mechanical spring axle/suspension system is shown in FIGS. 1 and 2 and is indicated generally at reference numeral 10. Prior art tandem mechanical spring axle/suspension system 10 includes a front axle/suspension system 12 and a rear axle/suspension system 14, each of which is connected to and depends from a vehicle frame or subframe 16 of the heavy-duty vehicle, as known in the art.

Front axle/suspension system 12 includes a pair of transversely-spaced, longitudinally-extending mechanical spring suspension assemblies 18, which connect to a front axle 20F. Similarly, rear axle/suspension system 14 includes a pair of transversely-spaced, longitudinally-extending mechanical spring suspension assemblies 22, which connect to a rear axle 20R. Inasmuch as each one of the pair of front mechanical spring suspension assemblies 18 is identical to the other, and each one of the pair of rear mechanical spring suspension assemblies 22 is identical to the other, only one of each will be described herein.

Front mechanical spring suspension assembly 18 includes a leaf spring set or stack 24, which in turn includes a plurality of leaf springs 26 with a top leaf spring 26T. Rear mechanical spring suspension assembly 22 includes a leaf spring set or stack 40, which in turn includes a plurality of leaf springs 42 with a top leaf spring 42T.

Turning first to front mechanical spring suspension assembly 18, top leaf spring 26T of each leaf spring stack 24 extends longitudinally between a front hanger 28, which is mounted on and depends from a respective one of a pair of transversely spaced longitudinally extending main members 74 of subframe 16 in a manner known to those skilled in the art, and an equalizer or rocker 30. More particularly, a front end 32 (FIG. 2) of top leaf spring 26T is formed to enable the front end of the top leaf spring to rest on and engage a cam or slipper block that is mounted in front hanger 28. A rear end 34 (FIG. 2) of top leaf spring 26T is formed to enable the rear end of the top leaf spring to rest on and engage a cam or slipper block that is mounted in equalizer 30. Equalizer 30 is pivotally connected to a center hanger 36 by a pin and bushing assembly 38, which in turn is mounted on and depends from subframe 16 in a manner known in the art. This construction enables top leaf spring 26T, and thus front spring stack 24, to float or slide at front and center hangers 28 and 36, respectively, to respond to certain load conditions.

Turning next to rear mechanical spring suspension assembly 22, top leaf spring 42T of each leaf spring stack 40 extends longitudinally between equalizer 30 and a rear hanger 44, which in turn is mounted on and depends from subframe 16 in a manner known in the art. More particularly, a front end 46 (FIG. 2) of top leaf spring 42T is formed to enable the front end of the top leaf spring to rest on and engage a cam or slipper block that is mounted in equalizer 30. A rear end 48 (FIG. 2) of top leaf spring 42T is formed to enable the rear end of the top leaf spring to rest on and engage a cam or slipper block that is mounted in rear hanger 44. In this manner, top leaf spring 42T, and thus leaf spring stack 40, are able to float or slide at center and rear hangers 36 and 44, respectively, to respond to certain load conditions. In this manner, equalizer 30 also provides a connection between front and rear mechanical spring suspension assemblies 18 and 22, respectively, and pivots in order to attempt to balance the loads between front and rear axles 20F and 20R, as is known in the art.

The plurality of leaf springs 26 of leaf spring stack 24 are held together by a center bolt 50 (FIG. 2), and are clamped to front axle 20F via a clamp assembly 52. More particularly, and with reference to FIG. 2, center bolt 50 extends through an opening 51 formed in each one of leaf springs 26 at about the longitudinal midpoint of each of the springs, and interconnects the springs. Clamp assembly 52 includes a top block 54 that is disposed on the upper surface of top leaf spring 26T at about the longitudinal midpoint of the top leaf spring, a top axle seat 56 that extends between the bottom of leaf spring stack 24 and the upper portion of front axle 20F in vertical alignment with the top block, and a bottom axle seat 58 which is disposed on the lower portion of the front axle in vertical alignment with the top block and the top axle seat. Clamp assembly 52 also includes a pair of U-bolts 60, each one of which engages top block 54 and extends through a pair of openings 59 formed in bottom axle seat 58. In this manner, top block 54, front spring stack 24, top axle seat 56, axle 20F, and bottom axle seat 58 are rigidly clamped together when nuts 62 are tightened onto U-bolts 60. It is to be understood that leaf springs 42 of leaf spring stack 40 are held together by a separate center bolt 50 and are clamped to rear axle 20R via a separate clamp assembly 52 in a manner similar to that as described for leaf springs 26 of leaf spring stack 24 and front axle 20F. The use of clamp assemblies 52 results in potentially lower durability for front and rear axle/suspension systems 12 and 14 and requires ongoing maintenance to maintain proper torque at the clamp assemblies.

In order to control and react fore-aft movement of front axle 20F, a front radius rod 64 is pivotally connected to and extends between front hanger 28 and top axle seat 56 associated with front axle 20F at pivotal connection points 72 and 78 (FIG. 2), respectively. Likewise, to control and react fore-aft movement of rear axle 20R, a rear radius rod 66 is pivotally connected to and extends between center hanger 36 and top axle seat 56 associated with rear axle 20R at pivotal connection points 70 and 71, respectively.

The design of prior art tandem mechanical spring axle/suspension system 10 enables the system to generally adequately react the forces that act on the system and the resulting loads that are encountered by the system. However, as described above, prior art tandem mechanical spring axle/suspension system 10 requires the use of front and rear radius rods 64 and 66, respectively, to control and react fore-aft movement of front and rear axles 20F and 20R, which undesirably increases the overall weight and cost of the tandem mechanical spring axle/suspension system.

In addition, prior art tandem mechanical spring axle/suspension system 10 may experience inter-axle load transfer due to braking. As described above, during a heavy braking application, the resulting forces may create inter-axle load transfer between front axle/suspension system 12 and rear axle/suspension system 14 that increase the load on rear axle 20R, while decreasing the load on front axle 20F, which undesirably increases the stopping distance of the heavy-duty vehicle. Such inter-axle load transfer during braking decreases the effectiveness of front axle 20F for braking, which in turn causes uneven braking of the heavy-duty vehicle, thereby decreasing braking or stopping efficiency and undesirably increasing the stopping distance of the vehicle. In addition, inter-axle load transfer may cause front axle 20F to skip or skid during a heavy braking application, which creates flat spots on the associated tires and thereby undesirably increases tire wear.

In order to attempt to reduce inter-axle load transfer due to braking in prior art tandem mechanical spring axle/suspension system 10 that employ radius rods 64 and 66 connected between respective front and center hangers 28 and 36 and clamp assemblies 56, it has been shown that it is desirable to vertically lower the position of pivotal connection point 70 between rear radius rod 66 and center hanger 36. However, lowering or moving connection point 70 closer to the ground also increases the vertical moment arm at center hanger 36, as well as front hanger 28, which undesirably increases the stress on subframe 16 and related components.

Moreover, prior art tandem mechanical spring axle/suspension system 10 includes other disadvantages. For example, pivotal connection point 70 between rear radius rod 66 and center hanger 36 is vertically lower than pivotal connection point 76 between front radius rod 64 and front hanger 28. This difference in connection heights may potentially cause improper alignment of front axle 20F and rear axle 20R relative to one another when the vehicle executes a tight turning maneuver, which undesirably causes the vehicle tires to steer out of parallel alignment relative to one another, thereby undesirably increasing tire wear. Moreover, each respective front end 32 and 46 and rear end 34 and 48 of each respective top leaf spring 26T and 42T of front and rear spring stacks 24 and 40 rides on cams or slipper blocks, and thus float relative to subframe 16, rather than being fixed in their respective positions. This construction of leaf spring stacks 24 and 40 creates a propensity for the springs to lift off of their respective cams or slipper blocks when the vehicle executes a maneuver that creates roll forces, a phenomenon known in the art as "spring lash", which undesirably decreases the roll stability of the vehicle.

In addition, in those applications where an anti-lock braking system (ABS) is utilized on the heavy-duty vehicle employing prior art tandem mechanical spring axle/suspension system 10, inter-axle load transfer can force the anti-lock brake system to cycle the brake air pressure, thus also requiring longer brake times and increasing the distance it takes for the heavy-duty vehicle to stop.

Moreover, because prior art tandem mechanical spring axle/suspension system 10 relies on leaf springs 26 and 42 to primarily manage roll stability of the vehicle, the leaf springs tend to be designed with a relatively high spring rate. The high spring rate of leaf springs 26 and 42 can result in the heavy-duty vehicle having a very harsh ride, thereby decreasing comfort to passengers and decreasing cargo protection. It should be noted that stabilizer bars (not shown) have been utilized to lower the spring rate of the leaf springs, such as leaf springs 26 and 42, but they undesirably add cost and weight to the heavy-duty vehicle. In addition, prior art tandem mechanical spring axle/suspension system 10 exhibits harsh ride characteristics when empty and also may potentially exhibit decreased cargo protection when the vehicle is partially laden.

Figure 3:
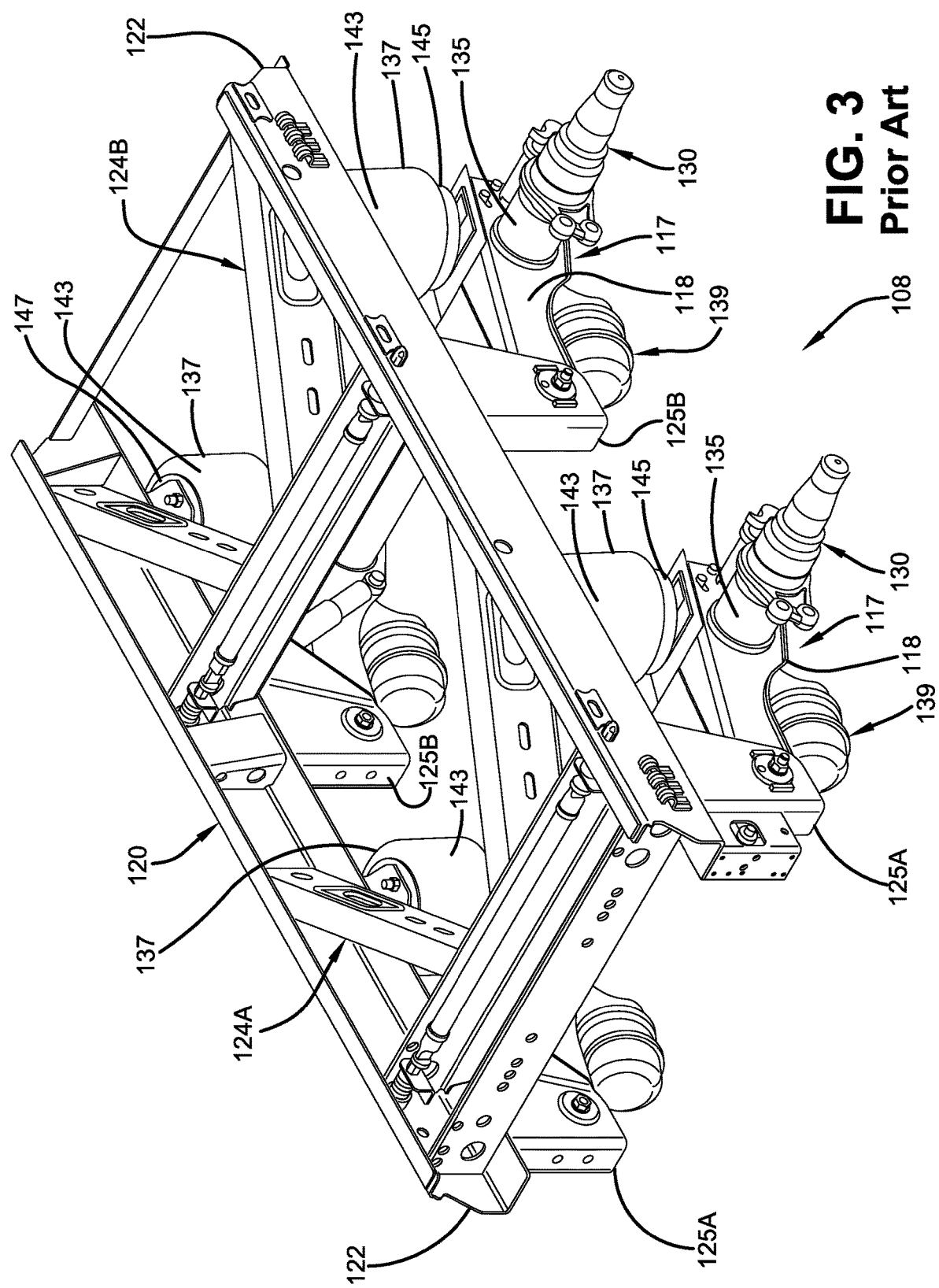
FIG. 3 is a top-front perspective view of a prior art tandem air-ride axle/suspension system, shown mounted on a subframe of a heavy-duty vehicle.

In order to further understand the tandem mechanical spring axle/suspension system for heavy-duty vehicles of the subject disclosure, a prior art tandem air-ride axle/suspension system is shown in FIG. 3 mounted on a subframe 120 of a heavy-duty vehicle (not shown), and is indicated generally at reference numeral 108. Subframe 120 is of a type that is employed in tractor-trailers or other similar heavy-duty vehicles. Subframe 120 includes a pair of transversely spaced longitudinally extending main members 122. Main members 122 are connected to each other by a pair of K-shaped cross members 124A and 124B. K-shaped cross members 124A and 124B extend between, typically nest in, and are welded to main members 122 to form subframe 120. Subframe 120 includes two pairs of front and rear hangers 125A and 125B, respectively. Front and rear hangers 125A and 125B are longitudinally spaced from one another and are mounted on respective main members 122 of subframe 120 in a manner known in the art.

Front and rear hangers 125A and 125B pivotally mount and suspend front and rear axle/suspension systems 130 of prior art tandem air-ride axle/suspension system 108 from main members 122 of subframe 120. More specifically, each one of front and rear axle/suspension systems 130 employs a pair of suspension assemblies 117A and 117B, respectively, which enable pivotal attachment of the front and rear axle/suspension systems to front and rear pairs of hangers 125A and 125B, respectively. Each suspension assembly 117A and 117B of front and rear axle/suspension systems 130 generally includes a longitudinally extending elongated beam 118. Each beam 118 typically is located adjacent to and below a respective one of pair main members 122 and one or more cross members 124A or 124B that form the frame of subframe 120. More specifically, each beam 118 is pivotally connected at one of its ends to a respective one of front and rear hanger 125A and 125B via a bushing assembly (not shown). An axle 135 extends transversely between and typically is connected to or captured by beams 118 of the respective pair of suspension assemblies 117A and 117B at a selected location from about the mid-point of each beam. Each beam 118 is connected to an air spring 137, which in turn is connected to a respective one of main members 122 of subframe 120. A brake system 139 and/or one or more shock absorbers 141 for providing damping to air-ride axle/suspension system 130 of the heavy-duty vehicle may also be mounted on the axle/suspension system.

Each front and rear axle/suspension system 130 of prior art tandem air-ride axle/suspension system 108 acts to cushion the ride, dampen vibrations and stabilize the heavy-duty vehicle. More particularly, as the vehicle is traveling over the road, its wheels encounter road conditions that impart various forces, loads, and/or stresses, collectively referred to herein as forces, to the respective axle 135 on which the wheels are mounted, and in turn, to suspension assemblies 117A or 117B that are connected to and support the axle. In order to minimize the detrimental effect of these forces on the vehicle as it is operating, each axle/suspension system 130 is designed to react and/or absorb at least some of these forces.

These forces include vertical forces caused by vertical movement of the wheels as they encounter certain road conditions, fore-aft forces caused by acceleration and deceleration of the heavy-duty vehicle, and lateral and torsional forces associated with transverse vehicle movement, such as turning of the vehicle and lane-change maneuvers. In order to address such disparate forces, axle/suspension systems 130 have differing structural requirements. More particularly, it is desirable for axle/suspension systems 130 to be fairly stiff in order to minimize the amount of sway experienced by the vehicle and thus provide what is known in the art as roll stability. However, it is also desirable for axle/suspension systems 130 to be relatively flexible to assist in cushioning the vehicle from vertical impacts, and to provide compliance so that the components of the axle/suspension systems resist failure, thereby increasing durability of the axle/suspension systems.

A key component of each axle/suspension system 130 is air spring 137, which cushions the ride of the heavy-duty vehicle from vertical impacts. Air spring 137 typically includes three main components: a flexible bellows 143, a piston 145, and a bellows top plate 147. Bellows 143 is formed from rubber or other flexible material, and is operatively mounted on top of piston 145. Piston 145 is typically formed from steel, aluminum, fiber reinforced plastics, or other sufficiently rigid material and is mounted on the rear end of beam 118 of each suspension assembly 117 in a known manner. Bellows 143 is filled with a volume of pressurized air provided to air spring 137 via an air reservoir (not shown) located on the heavy-duty vehicle, such as an air tank. The volume of pressurized air, or "air volume", that is contained within air spring 137 is a major factor in determining the spring rate, or stiffness, of the air spring. The larger the air volume of air spring 137, the lower the spring rate of the air spring. A lower spring rate is generally more desirable during normal heavy-duty vehicle operation because it provides a softer ride to the vehicle, and thus to the passengers and cargo.

However, subframe 120 equipped with axle/suspension systems 130 can be relatively expensive to manufacture as it requires the installation and utilization of air systems (not shown) to provide pressurized air to air springs 137 that make up the axle/suspension systems. More specifically, each axle/suspension system 130 requires air springs 137, hoses (not shown), tanks (not shown), compressed air (not shown), and one or more height control valves (not shown). These components of axle/suspension systems 130 add additional manufacturing costs, and because they must be maintained during the life of the heavy-duty vehicle, add additional maintenance costs throughout the life of the heavy-duty vehicle. In addition, these components of axle/suspension systems 130 are relatively heavy and add additional weight to the heavy-duty vehicle, thus potentially reducing the amount of cargo that can be carried by the vehicle and increasing fuel cost associated with operation of the vehicle.

As a result, a need exists in the art for a tandem mechanical spring axle/suspension system that overcomes the disadvantages of prior art tandem mechanical spring axle/suspension systems, including lowering the spring rate, reducing inter-axle load transfer due to braking, improving the distribution of forces encountered by the tandem axle/suspension system during operation, eliminating the clamp assembly, decreasing the stresses placed on the vehicle subframe, reducing brake wind-up, eliminating components such as radius rods and/or stabilizer bars, and reducing harsh-ride characteristics while empty or partially laden, while being lighter in weight and more economical than prior art tandem air-ride axle/suspension systems. The tandem mechanical spring axle/suspension system for heavy-duty vehicles of the subject disclosure satisfies these needs and overcomes the above-described disadvantages, drawbacks, and limitations, and will now be described.

A first exemplary embodiment tandem mechanical spring axle/suspension system for heavy-duty vehicles of the subject disclosure is shown in FIGS. 4-11 and is indicated generally at reference numeral 200. First exemplary embodiment tandem mechanical spring axle/suspension system 200 is shown mounted on a subframe 210 of a heavy-duty vehicle. With reference to FIGS. 4-8 and 9-11, subframe 210 includes a pair of elongated, longitudinally extending, spaced-apart, parallel main members 211 and a plurality of cross members 285 (FIGS. 5-6, 8, and 10) connected to the main members in a manner known in the art. Subframe 210 is representative of various types of frames used for heavy-duty vehicles, including primary frames that do not support a subframe and primary frames and/or floor structures that do support a subframe.

First exemplary embodiment tandem mechanical spring axle/suspension system 200 generally includes a front axle/suspension system 220F (FIGS. 4-6 and 8) that is longitudinally spaced from a rear axle/suspension system 220R (FIGS. 4-6 and 9-11) along main members 211 of subframe 210. A pair of mechanical springs 202 (FIGS. 2-15) are spaced transversely from one another, with each one being mounted on a respective driver side and passenger side of the heavy-duty vehicle. More specifically, each mechanical spring 202 is operatively engaged with front axle/suspension system 220F and rear axle/suspension system 220R, as well as subframe 210, as will be described in detail below. Front axle/suspension system 220F includes a pair of transversely spaced apart and aligned front suspension assemblies 217F (FIGS. 4-8), each one of which is located on a respective driver side and passenger side of the heavy-duty vehicle. Rear axle/suspension system 220R includes a pair of transversely spaced apart and aligned rear suspension assemblies 217R (FIGS. 4-6 and 9-11), each one of which is located on a respective driver side and passenger side of the heavy-duty vehicle.

Figure 4:
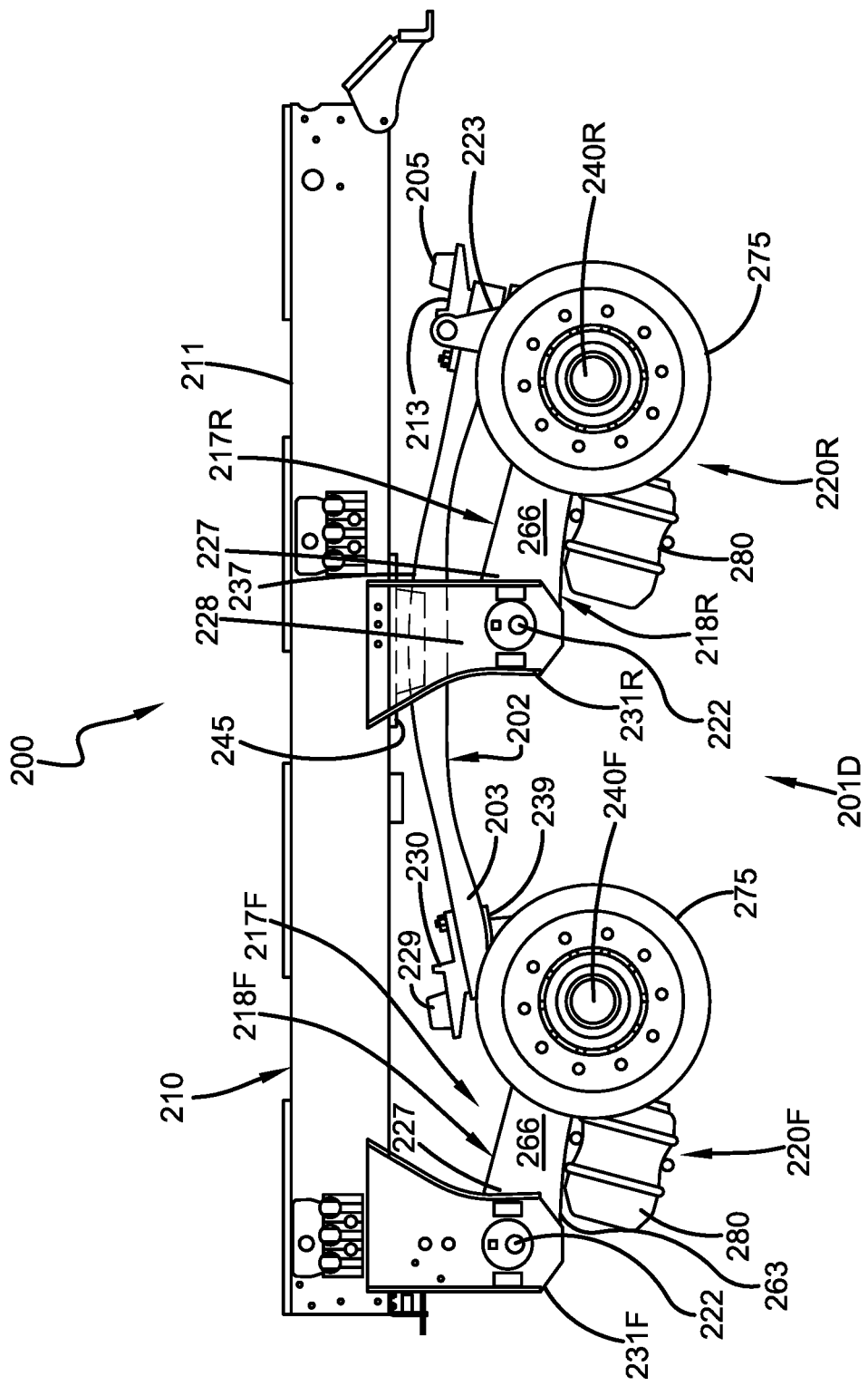
FIG. 4 is a driver side elevational view of a first exemplary embodiment tandem mechanical spring axle/suspension system for heavy-duty vehicles of the subject disclosure mounted on a subframe of the heavy-duty vehicle, showing a driver side suspension assembly of a front axle/suspension system and a driver side suspension assembly of a rear axle/suspension system operatively engaged with a driver side mechanical spring of the subject disclosure, and showing the mechanical spring operatively engaged with the subframe of the vehicle, with portions shown in ghost.
Figure 5:
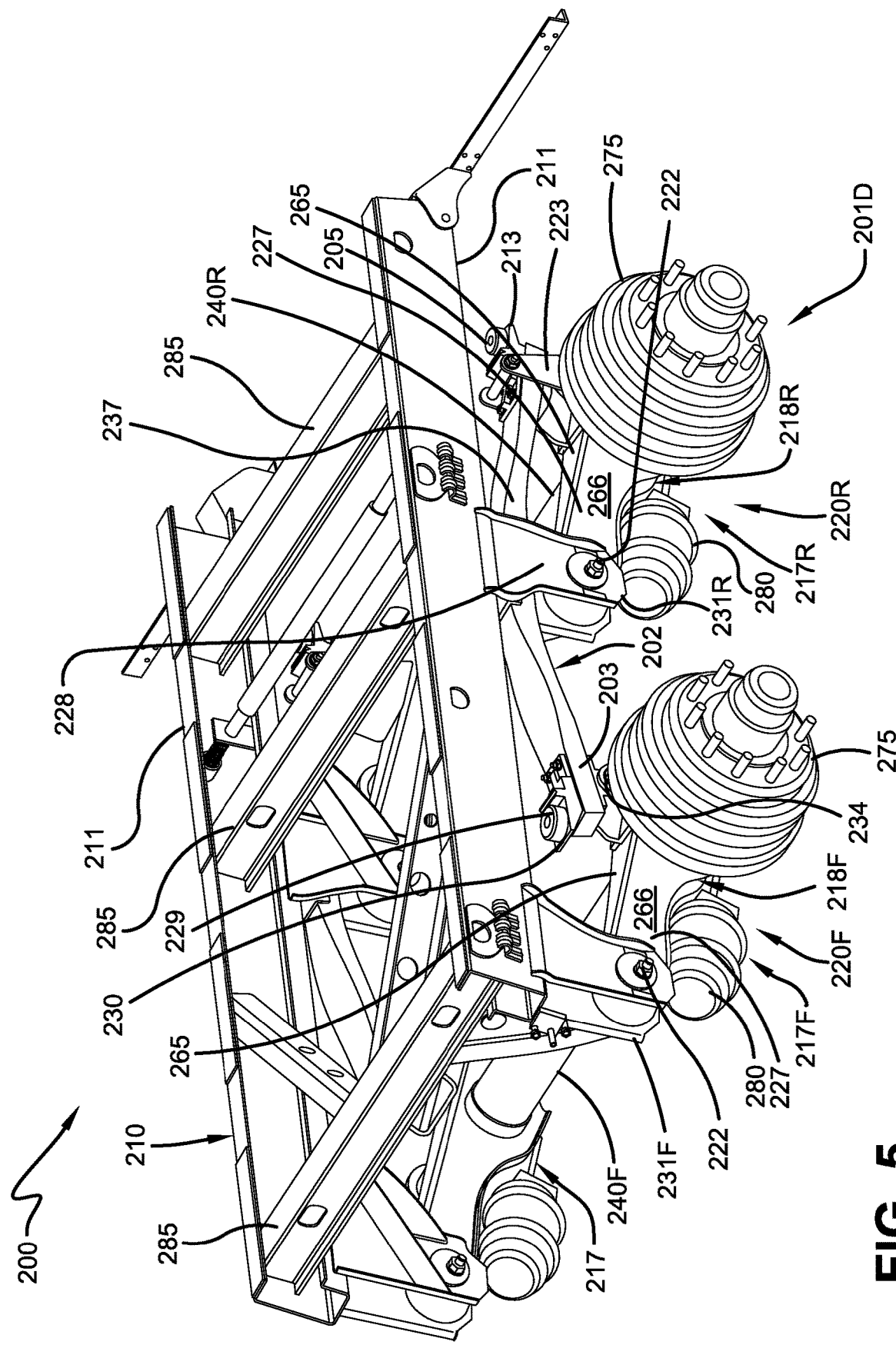
FIG. 5 is a driver side top-front perspective view of the first exemplary embodiment tandem mechanical spring axle/suspension system shown in FIG. 4.
Figure 6:
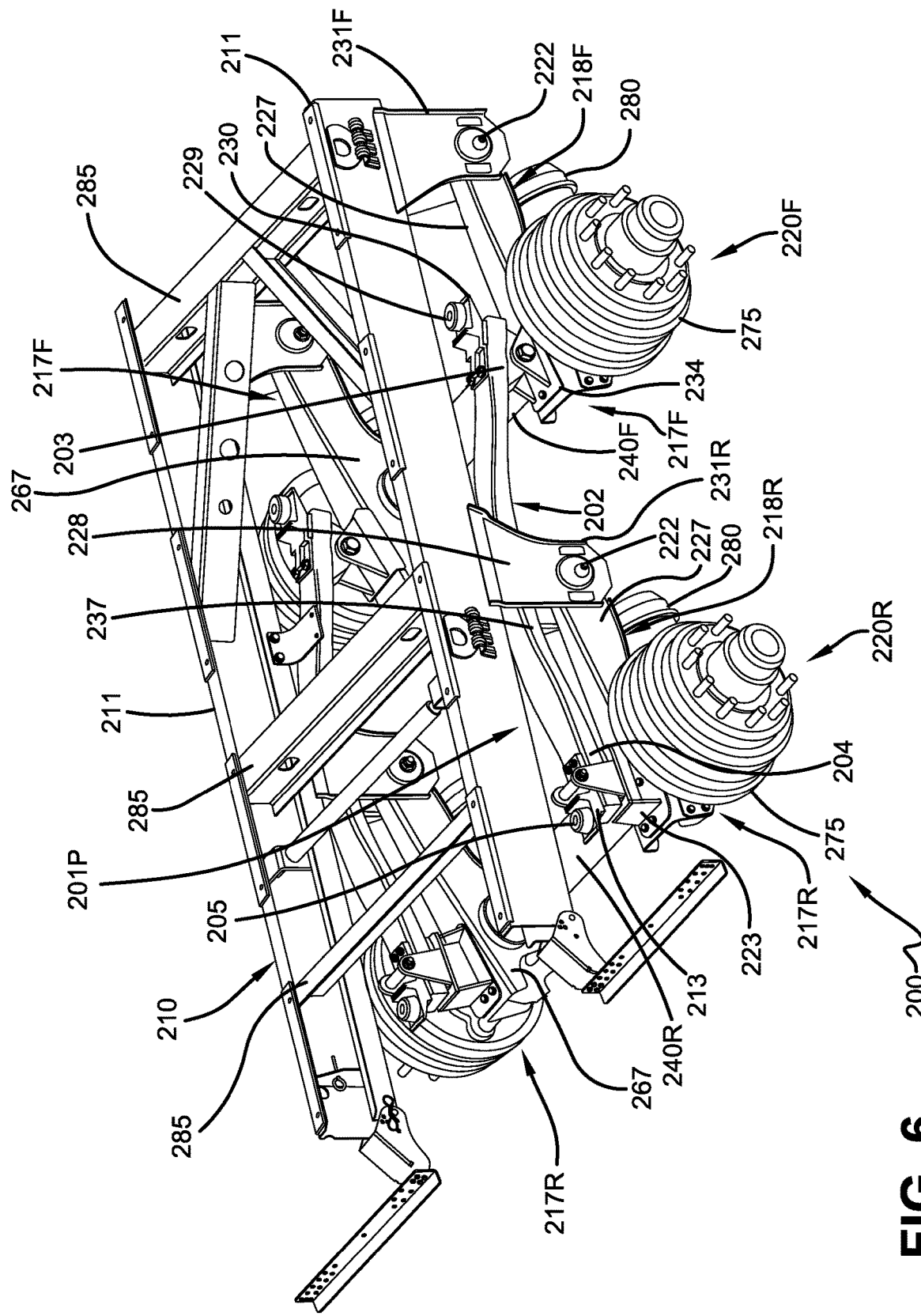
FIG. 6 is a passenger side top-rear perspective view of the first exemplary embodiment tandem mechanical spring axle/suspension system shown in FIG. 4.

Each one of front suspension assemblies 217F of front axle/suspension system 220F and rear suspension assemblies 217R of rear axle/suspension system 220R includes a front trailing arm beam 218F and a rear trailing arm beam 218R, respectively. Each front beam and rear beam 218F and 218R is formed having a generally upside-down integrally formed U-shape structure with a pair of sidewalls 266 and a top wall 265, with the open portion of the front beam and rear beam facing generally downwardly. A bottom plate 263 (FIG. 4) extends between and is attached to the lowermost ends of sidewalls 266 by any suitable means, such as welding, to complete the structure of each front beam 218F and rear beam 218R. Each front and rear suspension assembly 217F and 217R is pivotally mounted on its respective main member 211 of subframe 210 via a respective front hanger 231F and rear hanger 231R. More specifically, and with reference to FIGS. 4-6, a pair of front hangers 231F are transversely spaced from one another and aligned, each one of which is fixedly mounted to a respective one of main members 211 of subframe 210. With reference to FIGS. 4-7 and 9-10, a pair of rear hangers 231R are longitudinally spaced from front hangers 231F along main members 211 of subframe 210. Rear hangers 231R are also transversely spaced from one another and aligned, each one of which is fixedly mounted to a respective one of main members 211 of subframe 210. Each front and rear beam 218F and 218R includes a front portion 227 with a bushing assembly 222 that includes a bushing 251 (FIG. 9A), pivot bolts (not shown), and washers (not shown) to facilitate pivotal connection of the beam to its respective front or rear hanger 231F or 231R. Each front and rear beam 218F and 218R also includes a rear portion 267, which is welded or otherwise rigidly attached to a respective transversely-extending front axle 240F or rear axles 240R (FIGS. 5-8 and 11). With reference to FIGS. 4-6, for purposes of completeness, first exemplary embodiment tandem mechanical spring axle/suspension system 200 is shown with wheel hubs 275 and components of a brake system 280 mounted on or incorporated into front and rear axles 240F and 240R or front and rear beams 218F and 218R.

First exemplary embodiment tandem mechanical spring axle/suspension system 200 includes a driver side tandem assembly 201D and a passenger side tandem assembly 201P. Because driver side tandem assembly 201D and passenger side tandem assembly 201P of tandem mechanical spring axle/suspension system 200 are identical mirror image copies of each other, for purposes of conciseness and clarity, only the driver side tandem assembly will be described in detail below with the understanding that the passenger side tandem assembly is an identical mirror image copy of the driver side tandem assembly. Driver side tandem assembly 201D comprises driver side front beam 218F of driver side front suspension assembly 217F of front axle/suspension system 220F and driver side rear beam 218R of driver side rear suspension assembly 217R of rear axle/suspension system 220R.

With reference to FIGS. 4-5, 7, 9-10, and 12-15, and in accordance with an important aspect of the subject disclosure, driver side tandem assembly 201D also includes and incorporates mechanical spring 202, which is operatively engaged with and extends longitudinally between driver side front beam 218F and rear beam 218R of front and rear suspension assemblies 217F and 217R, respectively, which will be described in detail below. With reference to FIGS. 4-7, 9-10, and 12-15, mechanical spring 202 includes a middle portion 237 that is also operatively engaged with main member 211 of subframe 210, as will also be described in detail below.

Figure 7:
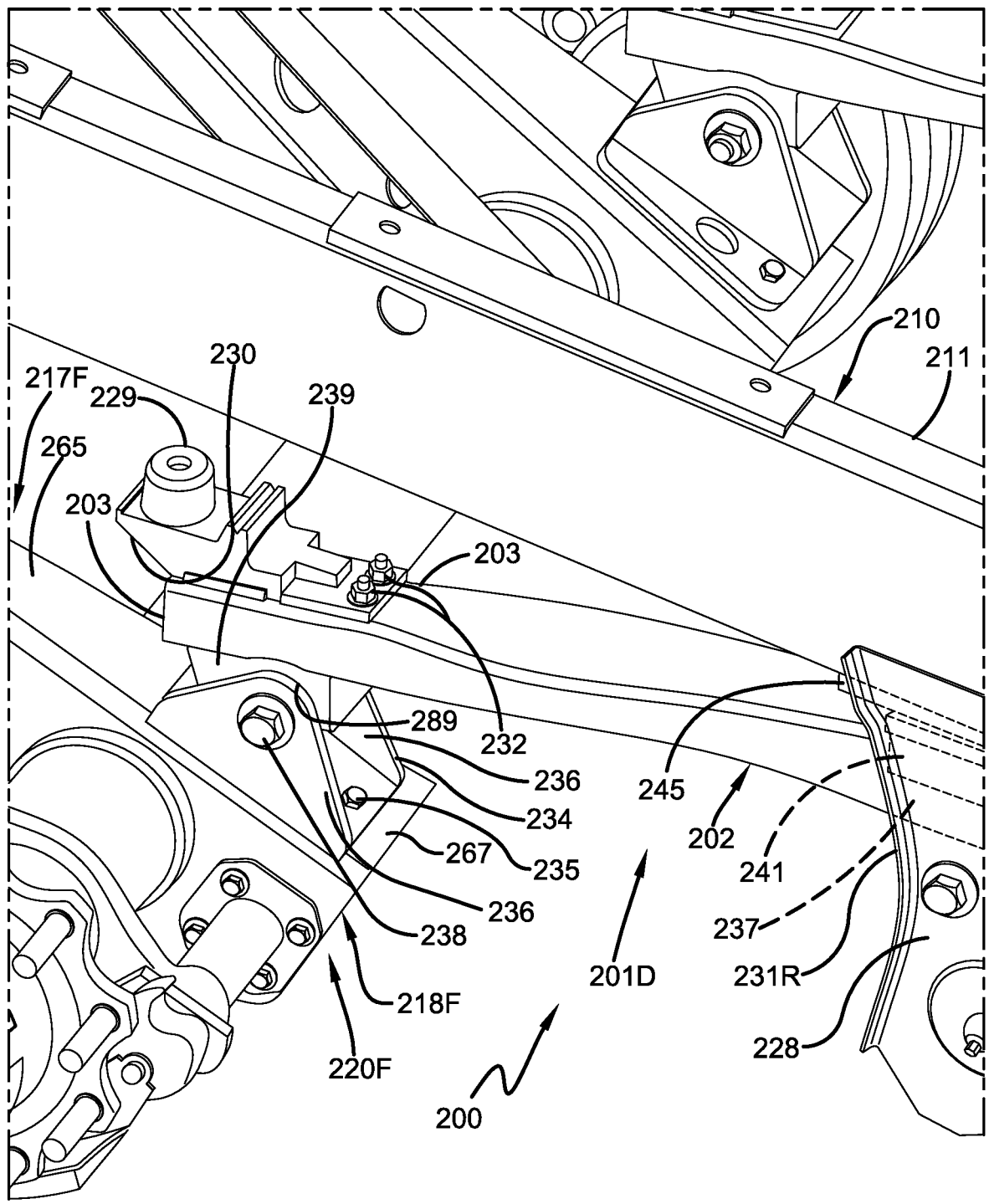
FIG. 7 is a greatly enlarged fragmentary top-rear perspective view of the driver side front mount providing operative engagement of the driver side mechanical spring to the driver side suspension assembly of the front axle/suspension system of the first exemplary embodiment tandem mechanical spring axle/suspension system shown in FIG. 4, with portions shown in ghost.
Figure 8:
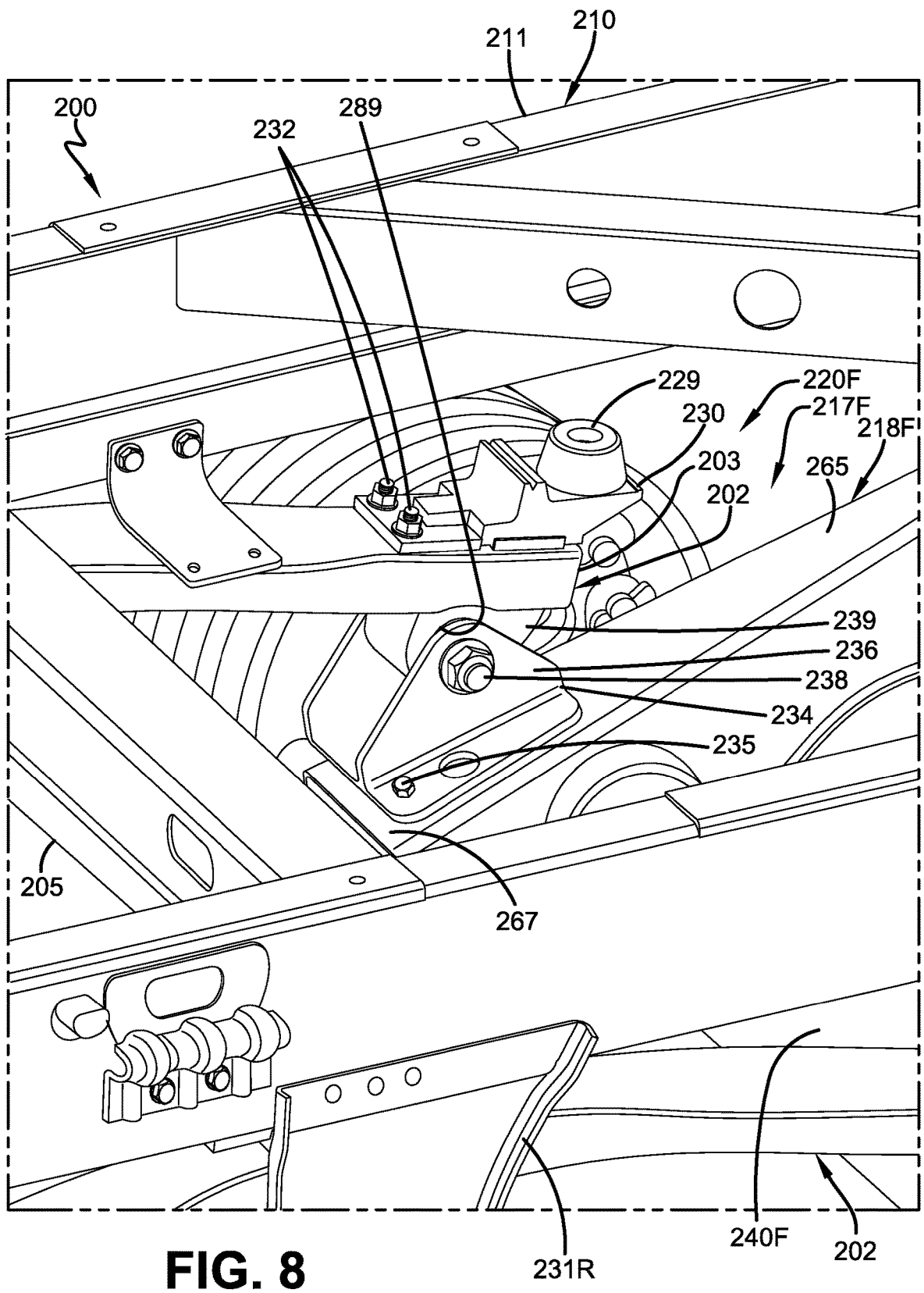
FIG. 8 is greatly enlarged fragmentary top-rear perspective view of the mechanical spring and the driver side suspension assembly of the first exemplary embodiment tandem mechanical spring axle/suspension system shown in FIG. 4, viewed in the outboard direction, showing the operative engagement between the driver side mechanical spring and the driver side suspension assembly via the driver side front mount, with portions shown in ghost.
Figure 8A:
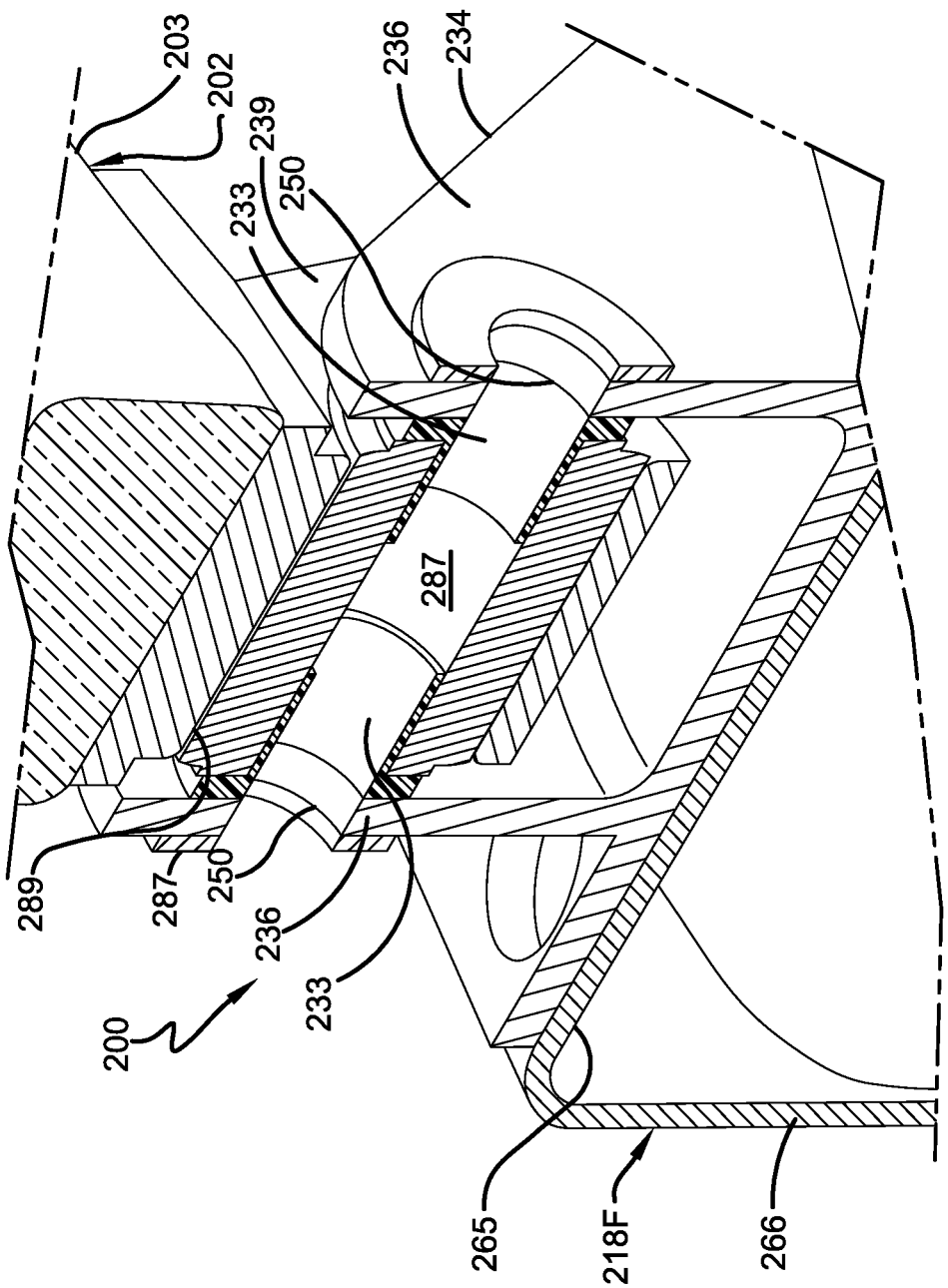
FIG. 8A is a greatly enlarged fragmentary view of the first exemplary embodiment tandem mechanical spring axle/suspension system shown in FIG. 4, showing the driver side front mount providing operative engagement of the driver side mechanical spring to the driver side suspension assembly in cross-section with certain components removed.

With particular reference to FIGS. 7-8A, and in accordance with another important aspect of the subject disclosure, mechanical spring 202 operatively engages driver side front beam 218F of driver side tandem assembly 201D. More specifically, driver side front beam 218F includes a spring mounting bracket 234 that is fixedly connected to rear portion 267 of top wall 265 of the front beam via fasteners 235 (only one shown). Spring mounting bracket 234 includes a pair of upwardly extending walls 236 forming a clevis-like structure. A pair of transversely aligned openings 250 (FIG. 8A) are formed in walls 236, through which a cam 238 (FIGS. 7-8) is disposed. With reference to FIG. 8A, a bushing assembly 239 that includes a pair of bushings 233 is disposed around cam 238 (FIGS. 7-8) and between walls 236 of spring mounting bracket 234. More specifically, bushings 233 are generally cylindrical and are disposed within a cylindrical bushing inner-metal 287 that extends substantially through the length of the bushings. Bushings 233 are formed from rubber, or other suitably pliant material, having a durometer of from about 70 to about 90 Shore A. Bushings 233 and bushing inner-metal 287 are press-fit into a cylindrical opening 289 formed in bushing assembly 239. Cam 238 is disposed through bushing inner-metal 287 and bushings 233 of bushing assembly 239, as well as through openings (not shown) formed in walls 236 of spring mounting bracket 234, and is utilized to pivotally connect the bushing assembly to the spring mounting bracket. Bushing assembly 239 is also connected to a bottom surface of a front end 203 (FIGS. 4-8A and 12-15) of mechanical spring 202, as will be described in detail below.

With reference to FIGS. 4-8, a bumper bracket 230 is mounted on the top surface of front end 203 of mechanical spring 202 and generally horizontally aligns with bushing assembly 239. More particularly, and with reference to FIGS. 7-8, a pair of fasteners 232 are disposed through aligned openings (not shown) formed in bushing assembly 239, front end 203 of mechanical spring 202, and bumper bracket 230 to pivotally connect the front end of the mechanical spring to rear portion 267 of driver side front beam 218F. With reference to FIGS. 4-8, bumper bracket 230 includes an upwardly extending bumper 229 connected to the bracket via suitable means, such as a fastener (not shown). Bumper 229 is formed from rubber, nylon, or other suitably pliant material, and extends upwardly from bumper bracket 230 toward main member 211 of subframe 210. Bumper 229 serves to provide a cushion between the top surface of bumper bracket 230 and main member 211 so that mechanical spring 202 and associated components are not damaged during extreme jounce events and to ensure the tires do not contact the underside of the frame of the heavy-duty vehicle during such events. In this manner, driver side front beam 218F and mechanical spring 202 of driver side tandem assembly 201D of first exemplary embodiment tandem mechanical spring axle/suspension system 200 are operatively engaged.

With particular reference to FIGS. 4-8 and 9-10, and in accordance with another important aspect of the subject disclosure, mechanical spring 202 operatively engages main member 211 of subframe 210. More specifically, mechanical spring 202 extends rearwardly through driver side rear hanger 231R such that the mechanical spring extends between a pair of transversely spaced sidewalls 228 of the rear hanger and includes a member interface 241 that is free to rock, pivot, and/or slide against a wear surface of a member bracket 245 attached to the bottom of main member 211 of subframe 210. More specifically, member interface 241 is connected to the top surface of mechanical spring 202 at about the midpoint of a middle portion 237 (FIGS. 4, 7, 9-10, and 12-15) of the mechanical spring via any suitable means, such as an adhesive or fasteners. Member interface 241 is preferably formed of an elastomeric material that enables mechanical spring 202 to flex relative to the member interface, but can be formed of other suitable materials without affecting the overall concept or operation of the subject disclosure. Member interface 241 includes an upwardly protruding longitudinally extending fin 243. Fin 243 of member interface 241 is disposed within and cooperates with a complimentary shaped groove 244 formed in a bottom surface of member bracket 245, which is fixedly connected to the underside of main member 211 of subframe 210 by any suitable means, such as fasteners, tabs, or welding. Fin 243 of member interface 241 protrudes into groove 244 of member bracket 245 such that mechanical spring 202 maintains transverse and longitudinal alignment during operation of the heavy-duty vehicle. In addition, the cooperation of fin 243 of member interface 241 and groove 244 of member bracket 245 allows the fin to rock, pivot and/or slide within the groove, and thus allows mechanical spring 202 to rock, pivot, and/or slide relative to sidewalls 228 of driver side rear hanger 231R while maintaining contact with main member 211 of subframe 210 so that loads or forces encountered by the heavy-duty vehicle that are transmitted through either driver side front beam 218F or rear beam 218R are transmitted directly onto the main member of the subframe during operation of the vehicle.

Figure 9:
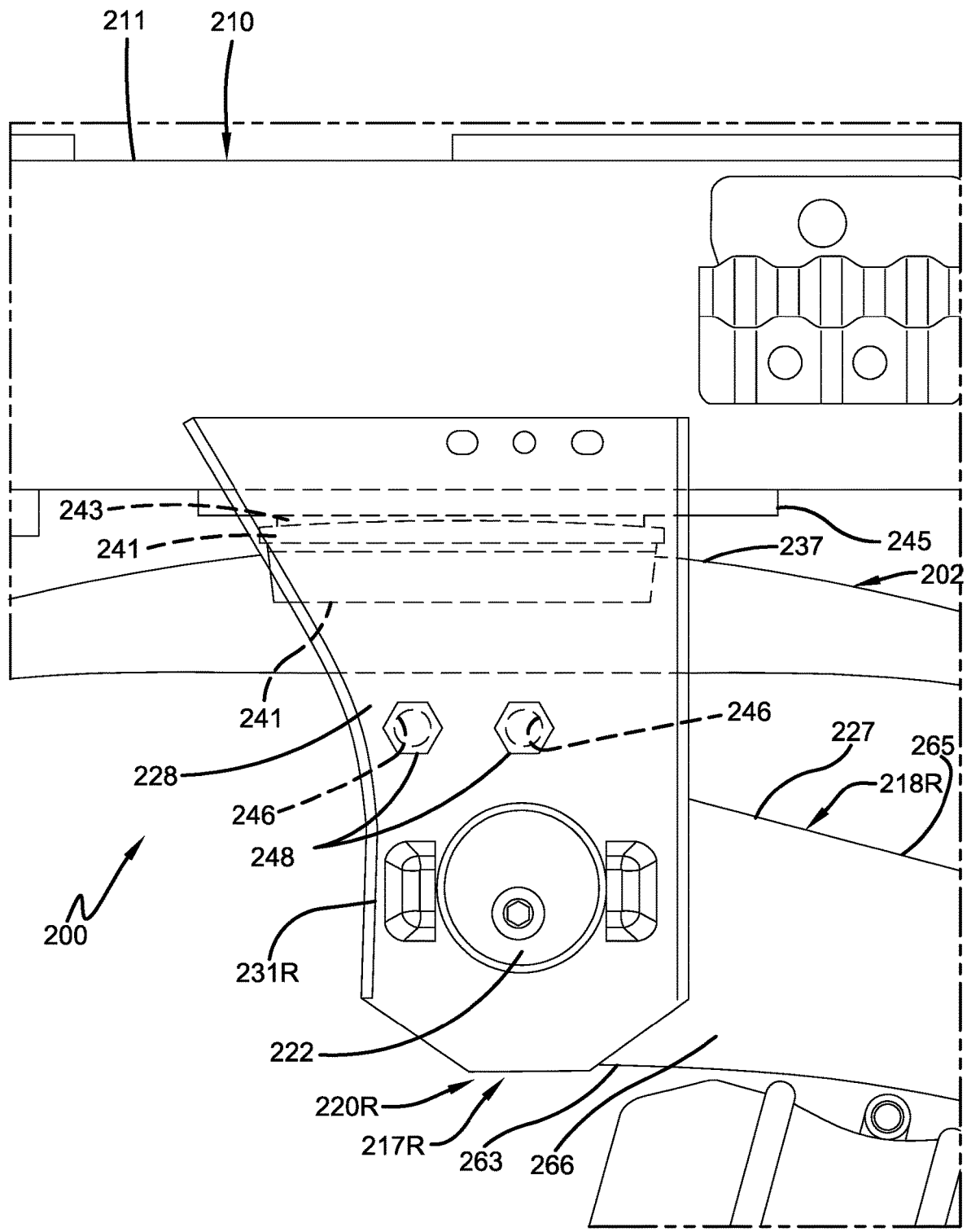
FIG. 9 is a greatly enlarged fragmentary driver side elevational view of the first exemplary embodiment tandem mechanical axle/suspension system shown in FIG. 4, with portions shown in ghost, showing the driver side mechanical spring operatively engaged with the subframe.
Figure 9A:
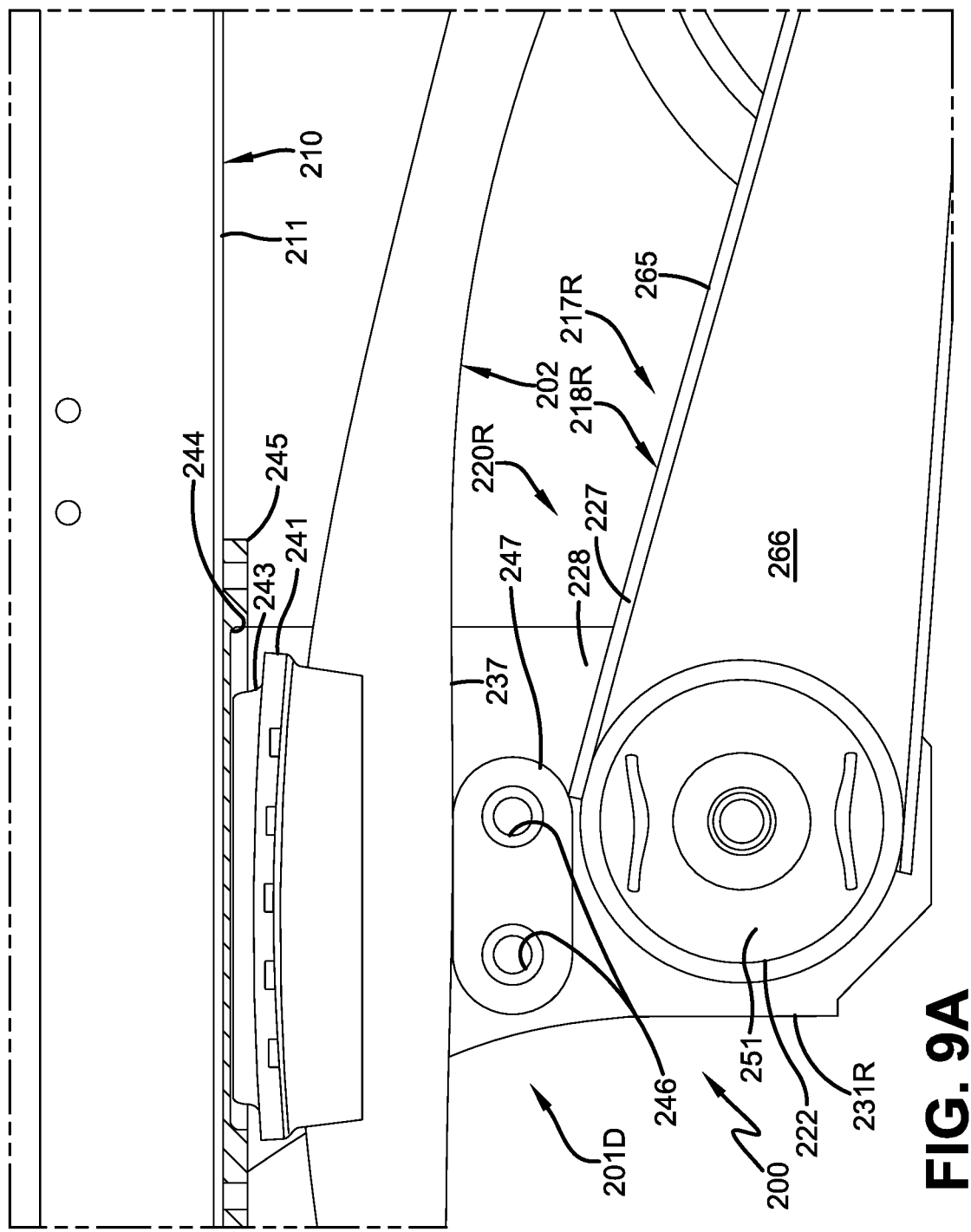
FIG. 9A is a greatly enlarged fragmentary driver side elevational view of the first exemplary embodiment tandem mechanical axle/suspension system shown in FIG. 4, shown with a driver side sidewall of a rear hanger removed and a member bracket in cross-section, showing the operative engagement of the driver side mechanical spring to the subframe.

With reference to FIGS. 9-9A, driver side rear hanger 231R includes two pairs of transversely aligned openings 246, with each pair formed through respective sidewalls 228 of the rear hanger. An ovoid shaped bushing 247 (FIG. 9A) is disposed between sidewalls 228 of driver side rear hanger 231R and also includes aligned openings (not shown) that correspond to openings 246 formed in sidewalls 228 of the rear hanger. A pair of fasteners 248 (FIG. 10) are disposed through openings 246 of sidewalls 228 of rear hanger 231R and the aligned openings formed in bushing 247 in order to connect the bushing to the rear hanger. Bushing 247 is made from rubber or other suitably pliant material and is positioned between sidewalls 228 of rear hanger 231R such that it is located below mechanical spring 202 and the top surface of bushing 247 rests against the bottom surface of mechanical spring 202. As a result, bushing 247 resists excessive downward movement of mechanical spring 202 during operation of the heavy-duty vehicle, as well as maintains engagement of fin 243 of member interface 241 with groove 244 of member bracket 245 during operation of the vehicle. More specifically, bushing 247 allows mechanical spring 202 to move in a downward direction to some extent, but also prohibits the mechanical spring from contacting top wall 265 of driver side rear beam 218R at front portion 227 of the beam during extreme jounce events that may occur during operation of the heavy-duty vehicle. In this manner, mechanical spring 202 operatively engages main member 211 of subframe 210 of the heavy-duty vehicle.

Figure 10:
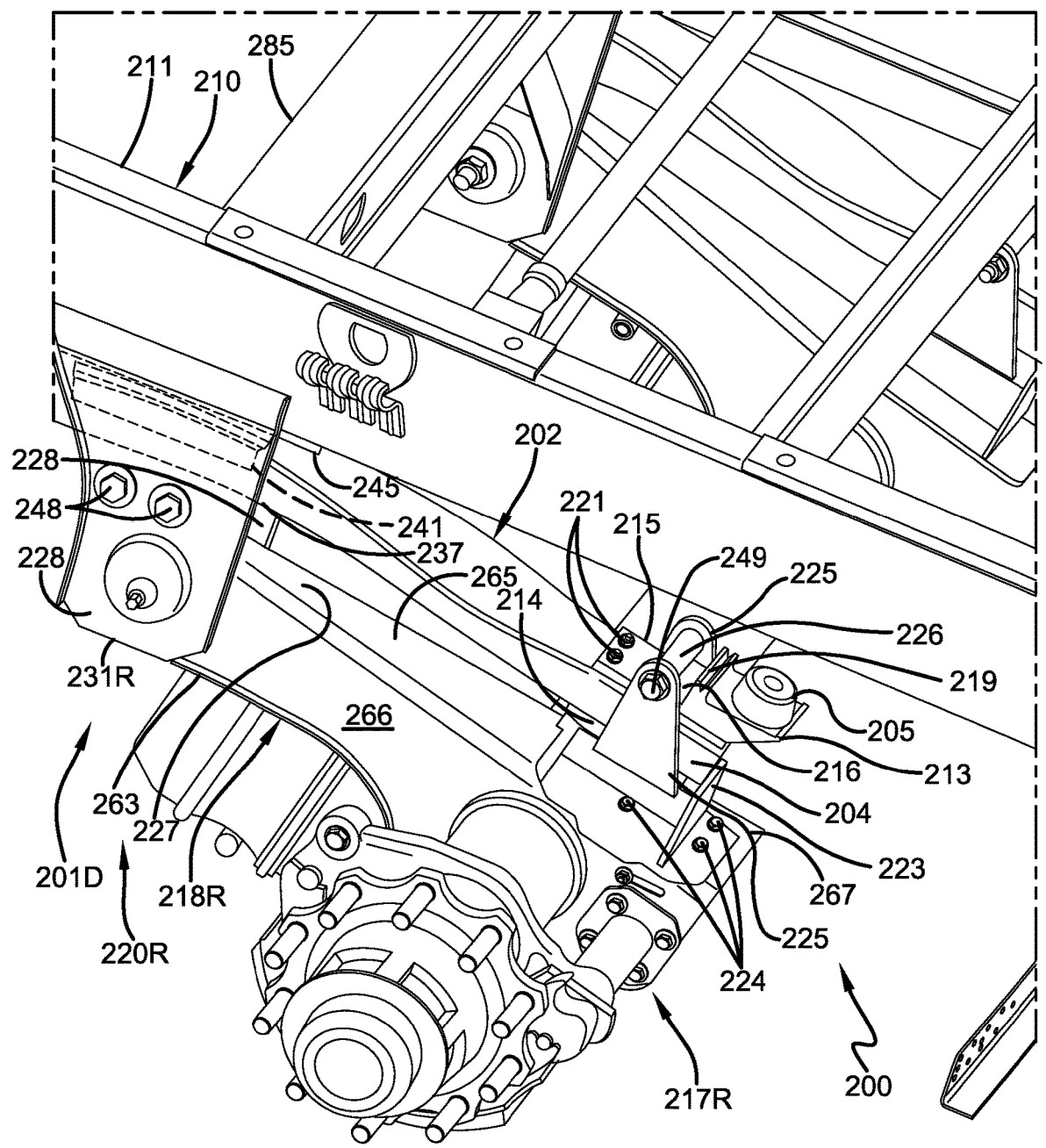
FIG. 10 is a greatly enlarged fragmentary top-rear perspective view of the driver side rear mount providing operative engagement of the driver side mechanical spring to the driver side suspension assembly of the rear axle/suspension system of the first exemplary embodiment tandem mechanical spring axle/suspension system shown in FIG. 4, with portions shown in ghost.
Figure 11:
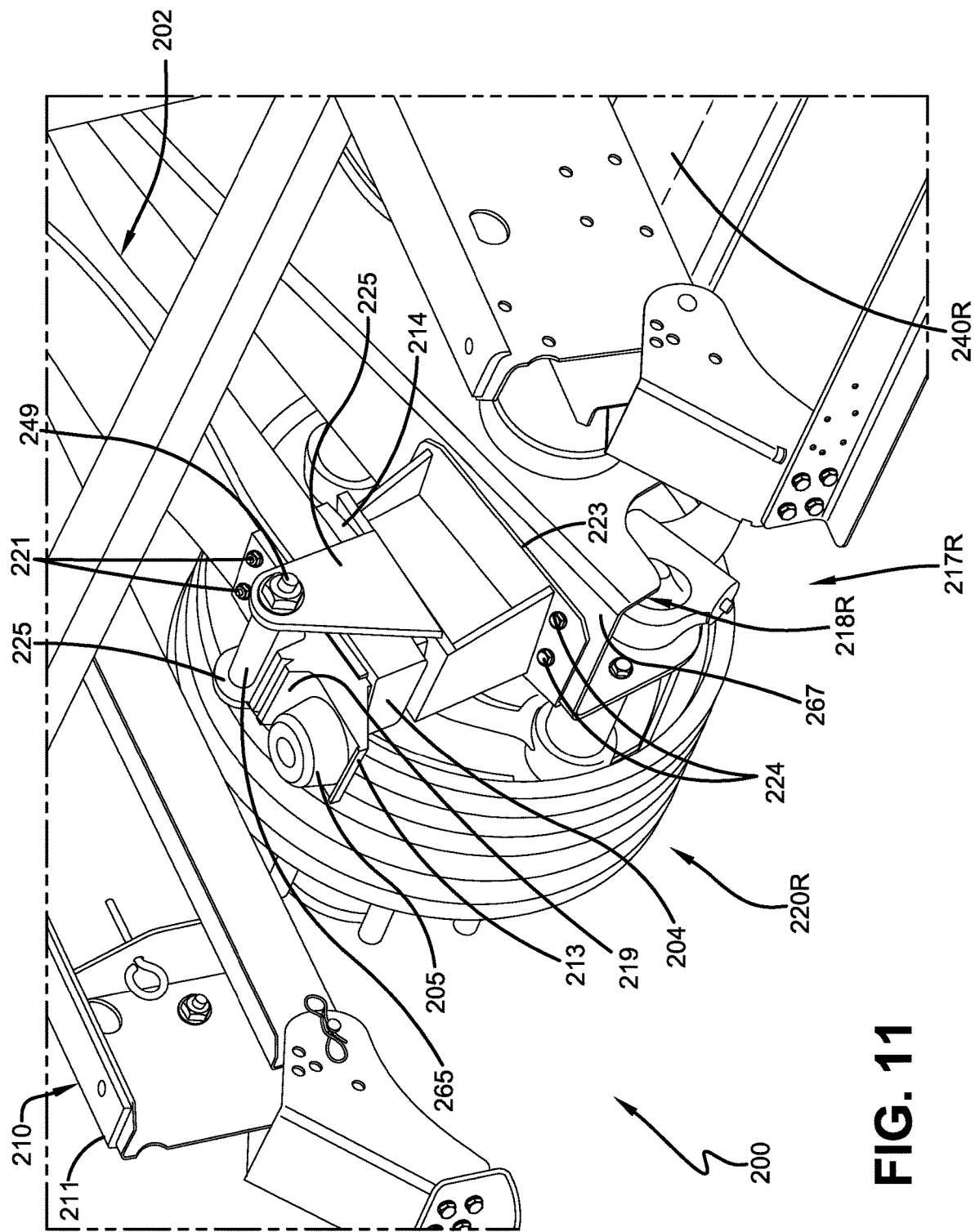
FIG. 11 is a greatly enlarged fragmentary top-rear perspective view of the driver side rear mount providing operative engagement of the driver side mechanical spring to the driver side suspension assembly of the rear axle/suspension system of the of the first exemplary embodiment tandem mechanical spring axle/suspension system shown in FIG. 4, viewed in the outboard direction, with portions shown in ghost.

With reference to FIGS. 10 and 11, and in accordance with yet another important aspect of the subject disclosure, mechanical spring 202 operatively engages driver side rear beam 218R of driver side tandem assembly 201D. More specifically, mechanical spring 202 includes a rear end 204 (FIGS. 10-15) fitted with an upper jounce/rebound control structure, or "upper jounce and rebound control structure", 213 and a generally rectangular lower slipper 214. Upper jounce/rebound control structure 213 includes a recessed area 215 (FIG. 10) formed with an incline 216 (FIG. 10) leading to a shelf 219. Upper jounce/rebound control structure 213, rear end 204 of mechanical spring 202, and lower slipper 214 are all formed with a pair of aligned openings (not shown). A pair of fasteners 221 are disposed through the aligned openings formed in upper jounce/rebound control structure 213, rear end 204 of mechanical spring 202, and lower slipper 214 to fixedly connect the upper jounce/rebound control structure and the lower slipper to the rear end of the mechanical spring.

A jounce/rebound control structure bracket, or "jounce and rebound control structure bracket", 223 (FIGS. 4, 6, and 10-11) is mounted on rear portion 267 of driver side rear beam 218R via fasteners 224. With reference to FIGS. 10-11, jounce/rebound control structure bracket 223 includes a pair of upwardly extending walls 225 that form a clevis-like structure. Walls 225 are formed with respective transversely aligned openings (not shown). A sleeve 226 is positioned between the aligned openings of walls 225. A fastener 249 is disposed through the aligned openings formed in walls 225 and sleeve 226 of jounce/rebound control structure bracket 223 so that upper jounce/rebound control structure 213 attached to rear end 204 of mechanical spring 202 is generally contained under the sleeve.

Lower slipper 214 may include a cam feature (not shown) located on its bottom surface that maintains line contact with jounce/rebound control structure bracket 223 in order to aid in load equalization between front axle/suspension system 220F and rear axle/suspension system 220R. The cam feature is designed to promote line contact between mechanical spring 202 and jounce/rebound control structure bracket 223 at a predetermined point along driver side rear beam 218R generally behind rear axle 240R. More specifically, as mechanical spring 202 flexes and bends during operation of the heavy-duty vehicle, upper jounce/rebound control structure 213, which captures rear end 204 of the mechanical spring, is able to rock, pivot and/or slide back and forth under sleeve 226 and is generally free to move without contact with the sleeve unless the vehicle experiences extreme rebound, such as, for example, during axle hang. Moreover, lower slipper 214 is able to rock, pivot and/or slide on the top surface of jounce/rebound control structure bracket 223 between walls 225 during dynamic movements of mechanical spring 202 during operation of the heavy-duty vehicle, and the mechanical spring remains protected by the lower slipper. Both lower slipper 214 and the top surface of jounce/rebound control structure bracket 223 may be formed from hardened or tempered steel. It should be understood that the top surface of jounce/rebound control structure bracket 223 may also be formed with a cam feature in order to compliment lower slipper 214, formed with or without a cam feature, to promote line contact between rear end 204 of mechanical spring 202 and jounce/rebound control structure bracket 223 at a predetermined point along driver side rear beam 218R generally behind rear axle 240R. The arrangement allows rear end 204 of mechanical spring 202 to flex, move, rock, pivot and/or slide longitudinally back and forth during operation of the heavy-duty vehicle.

The top surface of upper jounce/rebound control structure 213 includes a bumper 205 attached thereto via suitable means, such as a fastener (not shown). Bumper 205 is formed from rubber, nylon, or other suitably pliant material. Bumper 205 extends upwardly from upper jounce/rebound control structure 213 toward main member 211 of subframe 210. Bumper 205 provides a cushion between upper jounce/rebound control structure 213 and main member 211 so that mechanical spring 202 and the upper jounce/rebound control structure are not damaged during extreme jounce events and to ensure the tires do not contact the underside of the vehicle frame during such events.

Moreover, during extreme rebound events when the vehicle is lifted so that the wheels of the vehicle are no longer in contact with the ground, such as when the vehicle is loaded onto a train, upper jounce/rebound control structure 213 and jounce/rebound control structure bracket 223 work in combination with one another and mechanical spring 202 to limit rebound of the rear axle/suspension system. More specifically, as driver side rear beam 218R moves downwardly, sleeve 226 of jounce/rebound control structure bracket 223 contacts the top surface of upper jounce/rebound control structure 213 and/or shelf 219, transferring the load of the beam onto mechanical spring 202, which in turn limits further downward movement of the beam via tension of the mechanical spring. In addition, shelf 219 acts as a as a positive stop to prohibit excessive frontward longitudinal movement of rear end 204 of mechanical spring 202 via contact with sleeve 226 of jounce/rebound control structure bracket 223. The combination of jounce/rebound control structure 213, lower slipper 214, and jounce/rebound control structure bracket 223, along with mechanical spring 202, also provides for control of rebound during reverse braking, and/or extreme roll events. In this manner, driver side rear beam 218R and mechanical spring 202 of driver side tandem assembly 201D of first exemplary embodiment tandem mechanical spring axle/suspension system 200 are operatively engaged.

While first exemplary embodiment tandem mechanical spring axle/suspension system 200 is shown utilizing bushing assembly 239 in conjunction with spring mounting bracket 234 to operatively engage front end 203 of mechanical spring 202 with driver side front beam 218F and utilizes jounce/rebound control structure bracket 223 to operatively engage rear end 204 of the mechanical spring with driver side rear beam 218R, it is to be understood that a reverse mounting arrangement in which the bushing assembly and the spring mounting bracket are utilized to operatively engage the rear end of the mechanical spring with the rear beam, and the jounce rebound control structure bracket operatively engages the front end of the mechanical spring with the front beam, is also contemplated by the subject disclosure.

Figure 12:
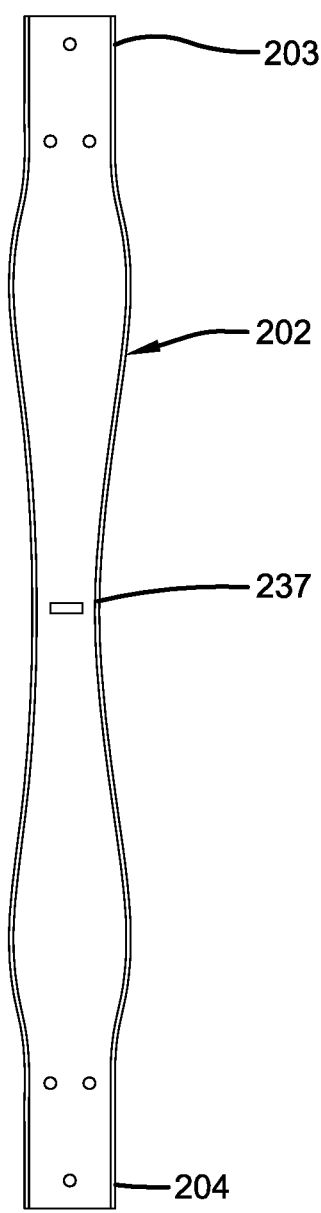
FIG. 12 is a top plan view of the driver side mechanical spring of the first exemplary embodiment tandem mechanical spring axle/suspension system shown in FIG. 4, shown removed from the tandem axle/suspension system.
Figure 13:
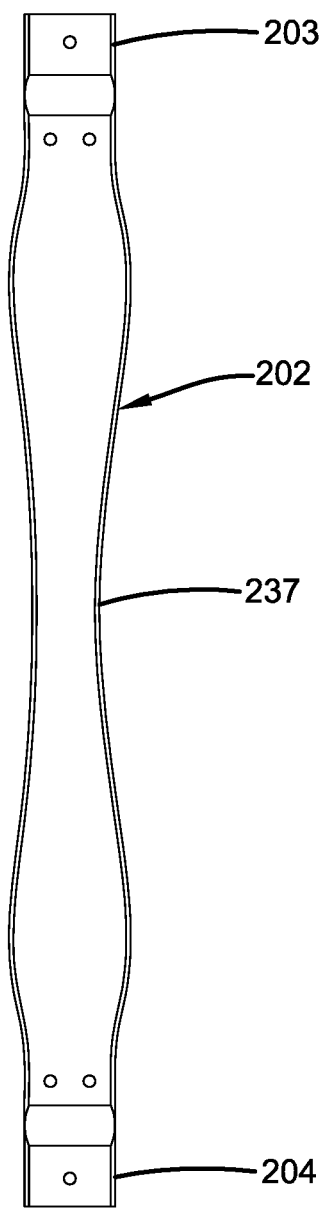
FIG. 13 is a bottom plan view of the driver side mechanical spring of the first exemplary embodiment tandem mechanical spring axle/suspension system shown in FIG. 4, shown removed from the tandem axle/suspension system.
Figure 14:
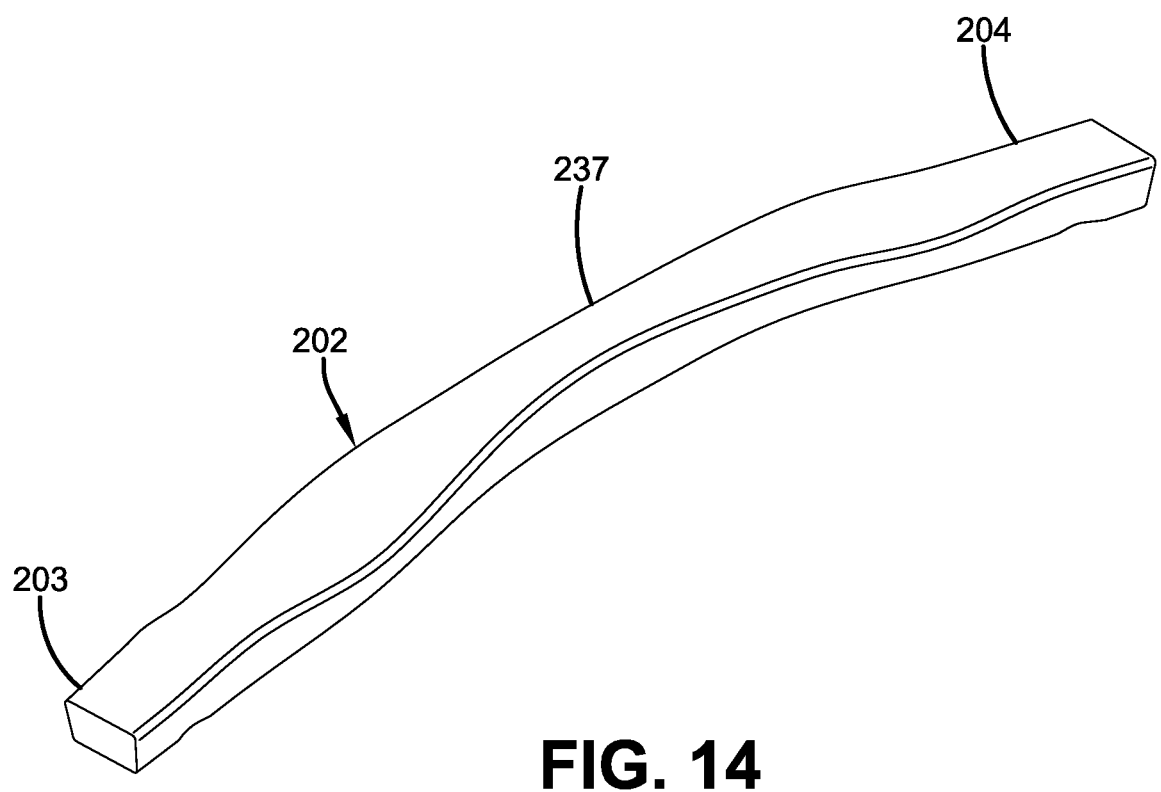
FIG. 14 is a top-rear perspective view of the driver side mechanical spring of the first exemplary embodiment tandem mechanical spring axle/suspension system shown in FIG. 4, shown removed from the tandem axle/suspension system.
Figure 15:
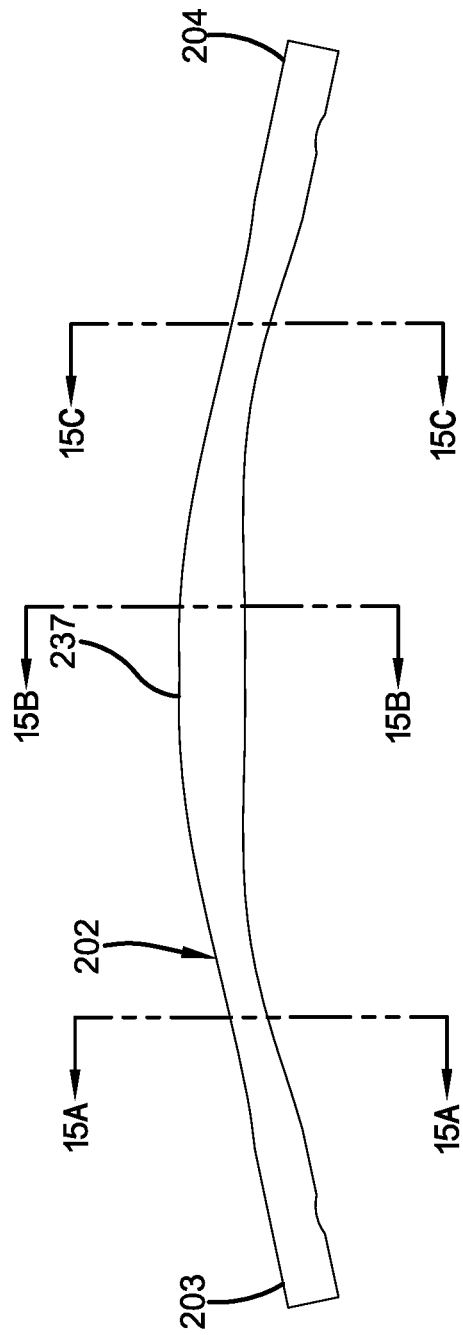
FIG. 15 is an elevational view of the driver side mechanical spring of the first exemplary embodiment tandem mechanical spring axle/suspension system shown in in FIG. 4, shown removed from the tandem axle/suspension system.

With reference to FIGS. 12-15, and in accordance with yet important aspect of the subject disclosure, mechanical spring 202 includes a generally dual taper or hourglass-like shape along its length (best shown in FIG. 12). Mechanical spring 202 tapers along its length in both transverse width and upper and lower thickness in a semi-parabolic manner, preferably such that the mechanical spring has a constant transverse cross-sectional area along its length (see FIGS. 15-15C). For example, as is shown in FIGS. 15A-15C, a transverse cross-sectional area $A_1$ taken between front end 203 and middle portion 237 of mechanical spring 202, a transverse cross-sectional area $A_2$ taken in the middle portion of the mechanical spring, and a transverse cross-sectional area $A_3$ taken between rear end 204 and the middle portion of the mechanical spring, as calculated by multiplying the vertical height of the cross-section by the transverse width of the cross-section, have substantially the same transverse cross-sectional area. This structure allows mechanical spring 202 to have a low spring rate and also improves stress distribution, while also tuning the lateral spring rate of the mechanical spring. More specifically, mechanical spring 202 of the subject disclosure has a spring rate that is generally between mechanical spring axle/suspension systems of prior art tandem mechanical spring axle/suspensions systems and air ride axle/suspension systems of prior art tandem air-ride axle/suspension systems, providing better cargo protection and rider comfort than the prior art mechanical spring axle/suspension systems. Preferably, mechanical spring 202 has a spring rate of from about 1,000 N/mm (5,700 lb/in) to about 1,400 N/mm (8,000 lb/in). Mechanical spring 202 preferably is a composite monoleaf spring having a constant cross-sectional area that also may be varied locally in order to marginally increase or decrease the fiberglass content to allow for tuning of the modulus of the spring or adding features to the spring. For example, mechanical spring 202 can be formed from a fiberglass/epoxy composite. It is to be understood that mechanical spring 202 can be formed from other suitable materials without affecting the overall concept or operation of the subject disclosure. Mechanical spring 202 is designed to support the vertical load of front axle 240F and rear axle 240R during operation of the vehicle. Mechanical spring 202 transfers the vehicle loads from both front and rear axles 240F and 240R, respectively, through a single point of operative engagement at member interface 241 and member bracket 245 into main member 211 of subframe 210. The pivoting, rocking and/or sliding action of mechanical spring 202 provides load equalization, both static and dynamic, under almost all load conditions. It is to be understood that mechanical spring 202 can exhibit different spring rate ranges than that described without affecting the overall concept or operation of the subject disclosure. For example, mechanical spring 202 could exhibit a spring rate of from about 1,000 N/mm (5,700 lb/in) to about 1,926 N/mm (11,000 lb/in) by constraining the deflection of the mechanical spring via a clamping configuration employed in the operative engagement of the mechanical spring to the main member of the subframe of the heavy-duty vehicle, altering the mechanical spring cross-sectional area and profile, and/or adjusting the fiberglass content of the mechanical spring.

As driver side front beam 218F and driver side rear beam 218R of driver side tandem assembly 201D are each operatively engaged with mechanical spring 202 of the tandem assembly in the manner described above, the driver side tandem assembly provides a hybrid combination air-ride and mechanical-type tandem assembly which utilizes a single mechanical spring in order to react loads from driver side front suspension assembly 217F and driver side rear suspension assembly 217R of front and rear axle/suspension systems 220F and 220R, respectively. Moreover, because mechanical spring 202 is operatively engaged with main member 211 of subframe 210 in the manner described above, the mechanical spring reacts loads from driver side front beam 218F and driver side rear beam 218R directly onto the main member during operation of the heavy-duty vehicle. The single mechanical spring 202 replaces a pair of air springs located on the driver side front and rear suspension assemblies of front and rear axle/suspension systems of prior art tandem air-ride axle/suspension systems, such as prior art tandem air-ride axle/suspension system 108 (FIG. 3) described above, and also replaces a pair of mechanical spring stacks located on the driver side front and rear suspension assemblies of front and rear axle/suspension systems of prior art tandem mechanical spring axle/suspension systems, such as prior art tandem mechanical spring axle/suspension system 10 (FIGS. 1-2) described above.

Thus, first exemplary embodiment tandem mechanical spring axle/suspension system 200 provides a tandem axle/suspension system with reduced spring rate compared to prior art tandem mechanical spring axle/suspension systems, reduces inter-axle load transfer due to braking, improves the distribution of forces encountered by the tandem axle/suspension system during operation, eliminates the clamp assemblies and radius rods employed by the front and rear axle/suspensions of prior art tandem mechanical sprig axle/suspension systems, and decreases the stresses placed on the subframe of the heavy-duty vehicle, while being generally lighter weight and more economical than prior art tandem air-ride axle/suspension systems. First exemplary embodiment tandem mechanical spring axle/suspension system 200 provides a tandem axle/suspension system that is light weight, provides improved ride quality, braking and handling, maintains static and dynamic load equalization between the axles of the tandem axle/suspension system, and lowers manufacturing and maintenance costs.

Figure 16:
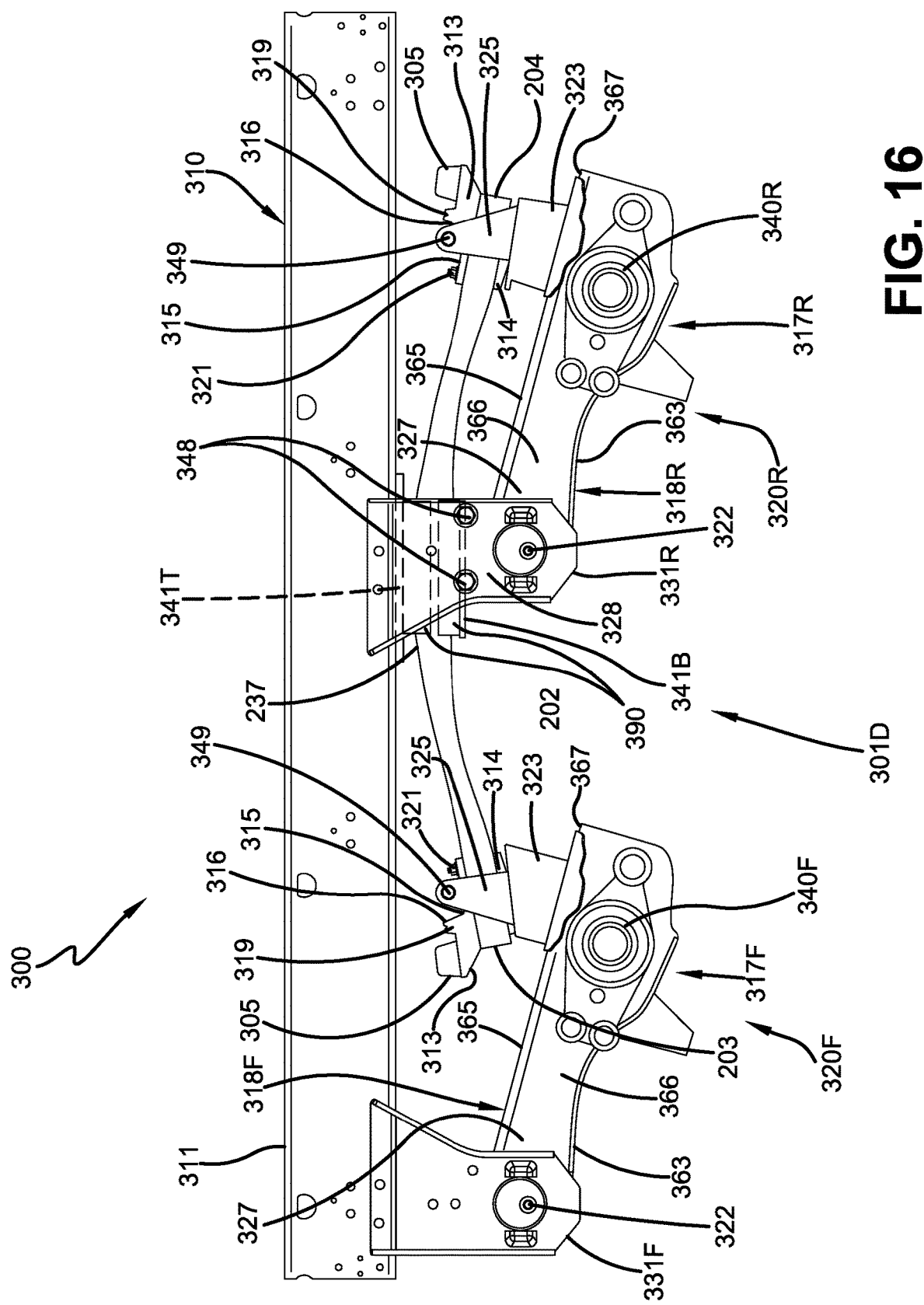
FIG. 16 is an elevational view of a second exemplary embodiment tandem mechanical spring axle/suspension system for heavy-duty vehicles of the subject disclosure mounted on a subframe of the heavy-duty vehicle, showing a driver side suspension assembly of a front axle/suspension system and a driver side suspension assembly of a rear axle/suspension system operatively engaged with a driver side mechanical spring of the subject disclosure, and showing the mechanical spring operatively engaged with the subframe of the vehicle, with portions shown in ghost.
Figure 17:
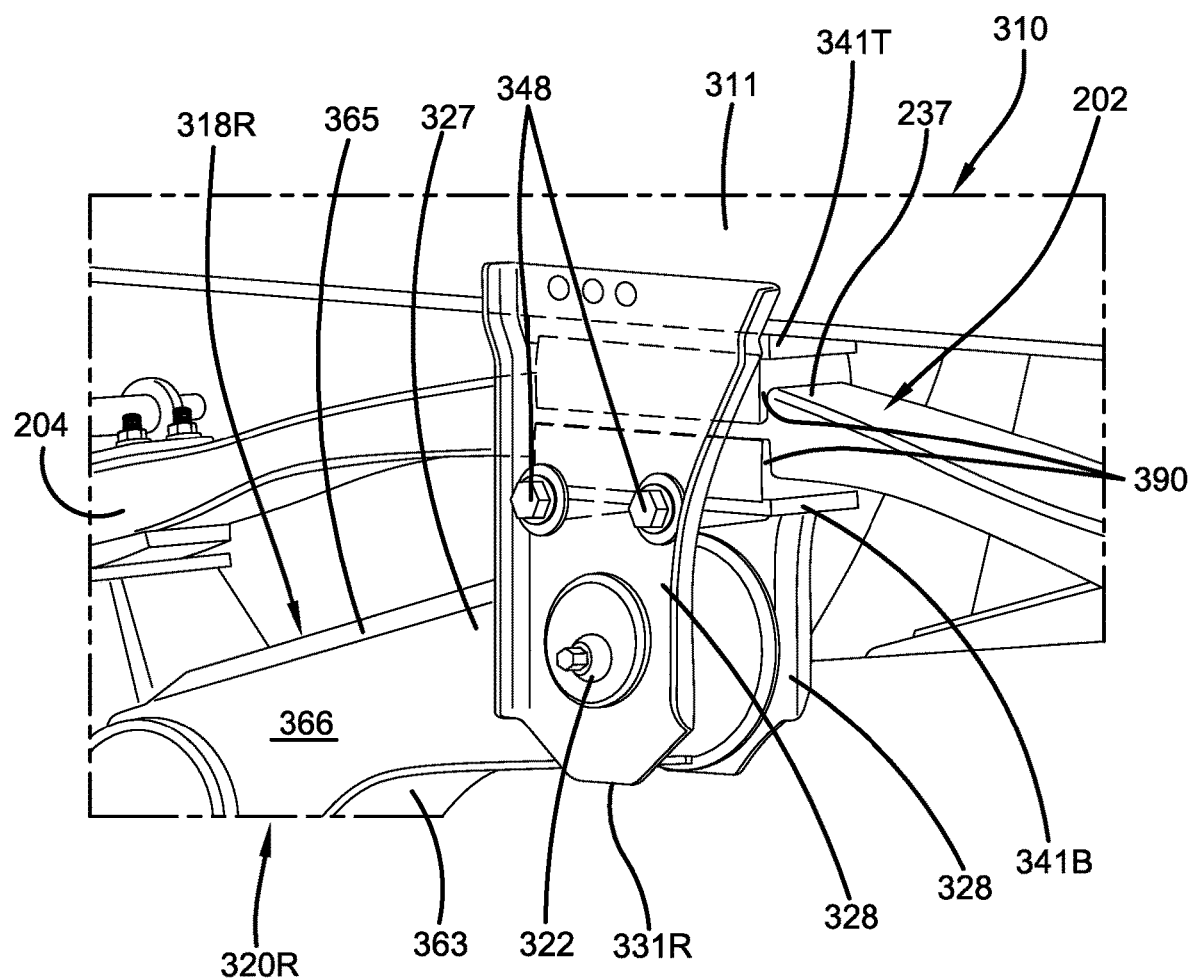
FIG. 17 is a greatly enlarged fragmentary top-front perspective view of a passenger side rear hanger of the second exemplary embodiment tandem mechanical axle/suspension system shown in FIG. 16, with portions shown in ghost.

A second exemplary embodiment tandem mechanical spring axle/suspension system for heavy-duty vehicles of the subject disclosure is shown in FIGS. 16-17 mounted on a subframe 310 of a heavy-duty vehicle (not shown), indicated generally at reference numeral 300, and will be described in detail below. Subframe 310 is similar in structure and function to subframe 210 (FIGS. 4-8 and 9-11) described above and includes a pair of elongated, longitudinally extending, spaced-apart, parallel main members 311 (only one shown) and a plurality of cross members (not shown) connected to the main members. Subframe 310 is representative of various types of frames used for heavy-duty vehicles, including primary frames that do not support a subframe and primary frames and/or floor structures that do support a subframe.

Second exemplary embodiment tandem mechanical spring axle/suspension system 300 generally includes a front axle/suspension system 320F that is longitudinally spaced from a rear axle/suspension system 320R along main members 311 of subframe 310. A pair of mechanical springs 202 (only one shown), generally identical to those used in conjunction with first exemplary embodiment tandem mechanical spring axle/suspension system 200, are spaced transversely from one another, with each being mounted on a respective driver side and passenger side of the heavy-duty vehicle. Each mechanical spring 202 is operatively engaged with front axle/suspension system 320F and rear axle/suspension system 320R, as well as subframe 310, as will be described in detail below. Front axle/suspension system 320F includes a pair of transversely spaced apart and aligned front suspension assemblies 317F, each one of which is located on a respective driver side and passenger side of the heavy-duty vehicle (only the driver side shown). Rear axle/suspension system 320R includes a pair of transversely spaced apart and aligned rear suspension assemblies 317R, each of which is located on a respective driver side and passenger side of the heavy-duty vehicle (only the driver side shown).

Each one of front suspension assemblies 317F of front axle/suspension system 320F and rear suspension assemblies 317R of rear axle/suspension system 320R includes a front trailing arm beam 318F and a rear trailing arm beam 318R, respectively. Each front beam and rear beam 318F and 318R is formed having a generally upside-down integrally formed U-shaped structure with a pair of sidewalls 366 and a top wall 365, with the open portion of the front beam and the rear beam facing generally downwardly. A bottom plate 363 extends between and is attached to the lowermost ends of sidewalls 366 by any suitable means, such as welding, to complete the structure of each front beam 318F and rear beam 318R. Front beam 318F and rear beam 318R each include a front portion 327 with a bushing assembly 322 that includes a bushing (not shown), pivot bolts (not shown), and washers (not shown) to facilitate pivotal connection of the front beam and the rear beam to a respective front hanger 331F or rear hanger 331R. Each front beam 318F and rear beam 318R also includes a rear portion 367, which is welded or otherwise rigidly attached to a respective front and rear axle 340F and 340R.

Each one of front suspension assemblies 317F and rear suspension assemblies 317R is pivotally connected to a respective main member 311. More particularly, each front and rear suspension assembly 317F and 317R is pivotally mounted on its respective main member 311 of subframe 310 via a respective front hanger 331F and rear hanger 331R. More specifically, a pair of front hangers 331F (only the driver side shown) are transversely spaced from one another and aligned, each one of which is fixedly mounted to a respective one of main members 311 of subframe 310. A pair of rear hangers 331R (only the driver side shown) are longitudinally spaced from front hangers 331F along main members 311 of subframe 310. Rear hangers 331R are also transversely spaced from one another and aligned, each one of which is fixedly mounted to a respective one of main members 311 of subframe 310.

Second exemplary embodiment tandem mechanical spring axle/suspension system 300 includes a driver side tandem assembly 301D and a passenger side tandem assembly (not shown). Because driver side tandem assembly 301D and the passenger side tandem assembly are identical mirror image copies of each other, for purposes of conciseness and clarity, only the driver side tandem assembly will be described in detail below with the understanding that the passenger tandem assembly is an identical mirror image copy of the driver side tandem assembly. Driver side tandem assembly 301D comprises driver side front beam 318F of driver side front suspension assembly 317F of front axle/suspension system 320F and driver side rear beam 318R of driver side rear suspension assembly 317R of rear axle/suspension system 320R.

With continued reference to FIGS. 16-17, and in accordance with an important aspect of the subject disclosure, driver side tandem assembly 301D also includes and incorporates mechanical spring 202, which is operatively engaged with and extends longitudinally between driver side front beam 318F and rear beam 318R of front and rear suspension assemblies 317F and 317R, respectively, as will be described in detail below. Second exemplary embodiment tandem mechanical spring axle/suspension system 300 utilizes mechanical spring 202 that is generally identical to the one utilized in first exemplary embodiment tandem mechanical spring axle/suspension systems 200 shown and described in detail above.

In accordance with an important aspect of the subject disclosure, mechanical spring 202 is operatively engaged with driver side front beam 318F of driver side tandem assembly 301D. More specifically, front end 203 of mechanical spring 202 is fitted with an upper jounce/rebound control structure, or "upper jounce and rebound control structure", 313 and a generally rectangular lower slipper 314. Upper jounce/rebound control structure 313 includes a recessed area 315 formed with an incline 316 leading to a shelf 319. Upper jounce/rebound control structure 313, front end 203 of mechanical spring 202, and lower slipper 314 are all formed with a pair of aligned openings (not shown). A pair of fasteners 321 (only one shown) are disposed through the aligned openings formed in upper jounce/rebound control structure 313, front end 203 of mechanical spring 202, and lower slipper 314 to fixedly connect the upper jounce/rebound control structure and the lower slipper to the front end of the mechanical spring. A jounce/rebound control structure bracket, or "jounce and rebound control structure bracket", 323 is mounted on rear portion 367 of driver side front beam 318F via fasteners (not shown). Jounce/rebound control structure bracket 323 includes a pair of upwardly extending walls 325 (only one shown) that form a clevis-like structure. Walls 325 are each formed with respective transversely aligned openings (not shown). A sleeve (not shown) is positioned between the aligned openings of walls 325. A fastener 349 is disposed through the aligned openings formed in walls 325 of jounce/rebound control structure bracket 323 so that upper jounce/rebound control structure 313 attached to front end 203 of mechanical spring 202 is generally contained under the sleeve. Lower slipper 314 may include a cam feature (not shown) located on its bottom surface that maintains line contact with jounce/rebound control structure bracket 323 in order to aid in load equalization between front axle/suspension system 320F and rear axle/suspension system 320R. The cam feature is designed to promote line contact between mechanical spring 202 and jounce/rebound control structure bracket 323 at a predetermined point along driver side front beam 318F generally behind front axle 340F. More specifically, as mechanical spring 202 flexes and bends during operation of the vehicle, upper jounce/rebound control structure 313, which captures front end 203 of the mechanical spring, is able to flex, rock, and pivot under the sleeve of jounce/rebound control structure bracket 323 and is generally free to move without contact with the sleeve unless the vehicle experiences extreme rebound, such as, for example, during axle hang. Moreover, lower slipper 314 is able to flex, rock, pivot and/or slide on the top surface of jounce/rebound control structure bracket 323 between walls 325 during dynamic movements of mechanical spring 202 during operation of the heavy-duty vehicle, and the mechanical spring remains protected by the lower slipper. Both lower slipper 314 and the top surface of jounce/rebound control structure bracket 323 may be formed from hardened or tempered steel. It should be understood that the top surface of jounce/rebound control structure bracket 323 may also be formed with a cam feature in order to compliment lower slipper 314, formed with or without a cam feature, to promote line contact between front end 203 of mechanical spring 202 and jounce/rebound control structure bracket 323 at a predetermined point along driver side front beam 318F generally behind front axle 340F. The arrangement allows front end 203 of mechanical spring 202 to flex, move, rock, pivot, and/or slide during operation of the heavy-duty vehicle.

The top surface of upper jounce/rebound control structure 313 includes a bumper 305 attached thereto via suitable means, such as a fastener (not shown). Bumper 305 is formed from rubber, nylon, or other suitably pliant material. Bumper 305 extends upwardly from upper jounce/rebound control structure 313 toward main member 311 of subframe 310. Bumper 305 provides a cushion between the upper jounce/rebound control structure 313 and main member 311 of subframe 310 so that mechanical spring 202 and the upper jounce/rebound control structure are not damaged during extreme jounce events, as well as ensure the tires of the heavy-duty vehicle do not contact the underside of the vehicle frame during such events.

Moreover, during extreme rebound events when the vehicle is lifted so that the wheels of the vehicle are no longer in contact with the ground, such as when the vehicle is loaded onto a train, jounce/rebound control structure 313 and jounce/rebound control structure bracket 323 work in combination with one another and mechanical spring 202 to limit rebound of the front axle/suspension system. More specifically, as driver side front beam 318F moves downwardly, the sleeve of jounce/rebound control structure bracket 323 contacts the top surface of upper j ounce/rebound control structure 313 and/or shelf 319, transferring the load of the beam onto mechanical spring 202, which in turn limits further downward movement of the beam via tension of the mechanical spring. In addition, shelf 319 acts as a positive stop to prohibit excessive rearward longitudinal movement of front end 203 of mechanical spring 202 via contact with the sleeve of jounce/rebound control structure bracket 323. The combination of jounce/rebound control structure 313, lower slipper 314, and jounce/rebound control structure bracket 323, along with mechanical spring 202, also provides for control of rebound during reverse braking, and/or extreme roll events. In this manner, driver side front beam 318F and mechanical spring 202 are operatively engaged with one another during operation of the heavy-duty vehicle.

In accordance with another important aspect of the subject disclosure, mechanical spring 202 operatively engages main member 311 of subframe 310. More specifically, mechanical spring 202 extends rearwardly through driver side rear hanger 331R such that the mechanical spring extends between a pair of transversely spaced sidewalls 328 of the rear hanger and includes a top member interface plate 341T, a bottom member interface plate 341B, and a pair of cushions 390 that are each sandwiched between a respective one of the top member interface and the bottom member interface around the mechanical spring. A pair of fasteners 348 are disposed through respective pairs of transversely aligned hanger openings formed in sidewalls 328 of driver side rear hanger 331R in order to capture mechanical spring 202, top member interface plate 341T, bottom member interface plate 341B, and cushions 390 within the rear hanger, thereby providing operative engagement of the spring to main member 311 of subframe 310 to which the rear hanger is attached. Cushions 390 are made from rubber or other suitably pliant material. The operative engagement of mechanical spring 202 to driver side rear hanger 331R, and thus to main member 311 of subframe 310 in this manner prevents mechanical spring 202 from moving downwardly during extreme rebound events, such as when the vehicle wheels are lifted from contact with the ground. Moreover, the operative engagement of mechanical spring 202 to main member 311 utilizing top member interface plate 341T and bottom member interface plate 341B, in combination with cushions 390, provides direct transmission of loads and forces encountered by front axle/suspension system 320F and rear axle/suspension system 320R of the heavy-duty vehicle directly onto subframe 310. In addition, the operative engagement of mechanical spring 202 to driver side rear hanger 331R and main member 311 allows the mechanical spring to minimally flex, rock, and/or pivot within the hanger during dynamic movements of second embodiment tandem mechanical spring axle/suspension system 300 during operation of the heavy-duty vehicle.

In accordance with yet another important aspect of the subject disclosure, mechanical spring 202 operatively engages driver side rear beam 318R of driver side tandem assembly 301D. More specifically, rear end 204 of mechanical spring 202 is fitted with an upper jounce/rebound control structure, or "upper jounce and rebound control structure", 313 and a generally rectangular lower slipper 314, which are similar in structure and function to the upper jounce/rebound control structure employed with front end 203 of the mechanical spring. A jounce/rebound control structure bracket 323, which is similar in structure and function to the jounce/rebound control structure bracket employed with driver side front beam 318F, is mounted on rear portion 367 of driver side rear beam 318R. Together, upper jounce/rebound control structure 313, lower slipper 314, and jounce/rebound control structure bracket 323 enable operative engagement of driver side rear beam 318R and mechanical spring 202 during operation of the heavy-duty vehicle in a manner similar to that described above with regard to the operative engagement of the mechanical spring and driver side front beam 318F.

As driver side front beam 318F and driver side rear beam 318R of driver side tandem assembly 301D are each operatively engaged with mechanical spring 202 of the tandem assembly in the manner described above, the driver side tandem assembly provides a hybrid combination air-ride and mechanical-type tandem assembly which utilizes a single mechanical spring in order to react loads from driver side front suspension assembly 317F and driver side rear suspension assembly 317R of front and rear axle/suspension systems 320F and 320R, respectively. Moreover, because mechanical spring 202 is operatively engaged with main member 311 of subframe 310 in the manner described above, the mechanical spring reacts loads from driver side front beam 318F and driver side rear beam 318R directly onto the main member during operation of the heavy-duty vehicle. The single mechanical spring 202 replaces a pair of air springs located on the driver side front and rear suspension assemblies of the front and rear axle/suspension systems of prior art tandem air-ride axle/suspension systems, such as prior art tandem air-ride axle/suspension system 108 (FIG. 3) described above, and also replaces a pair of mechanical spring stacks located on the driver side front and rear suspension assemblies of front and rear axle/suspension systems of prior art tandem mechanical spring axle/suspension systems, such as prior art tandem mechanical spring axle/suspension system 10 (FIGS. 1-2) described above.

Thus, second exemplary embodiment tandem mechanical spring axle/suspension system 300 provides a tandem axle/suspension system with reduced spring rate compared to prior art tandem mechanical spring axle/suspension systems, reduces inter-axle load transfer due to braking, improves the distribution of forces encountered by the tandem axle/suspension system during operation, eliminates the clamp assemblies and radius rods employed by the front and rear axle/suspensions of prior art tandem mechanical sprig axle/suspension systems, and decreases the stresses placed on the subframe of the heavy-duty vehicle, while being generally lighter weight and more economical than prior art tandem air-ride axle/suspension systems. Accordingly, second exemplary embodiment tandem mechanical spring axle/suspension system 300 provides a tandem axle/suspension system that is light weight, provides improved ride quality, braking and handling, maintains static and dynamic load equalization between the axles of the tandem axle/suspension system, and lowers manufacturing and maintenance costs.

Figure 18:
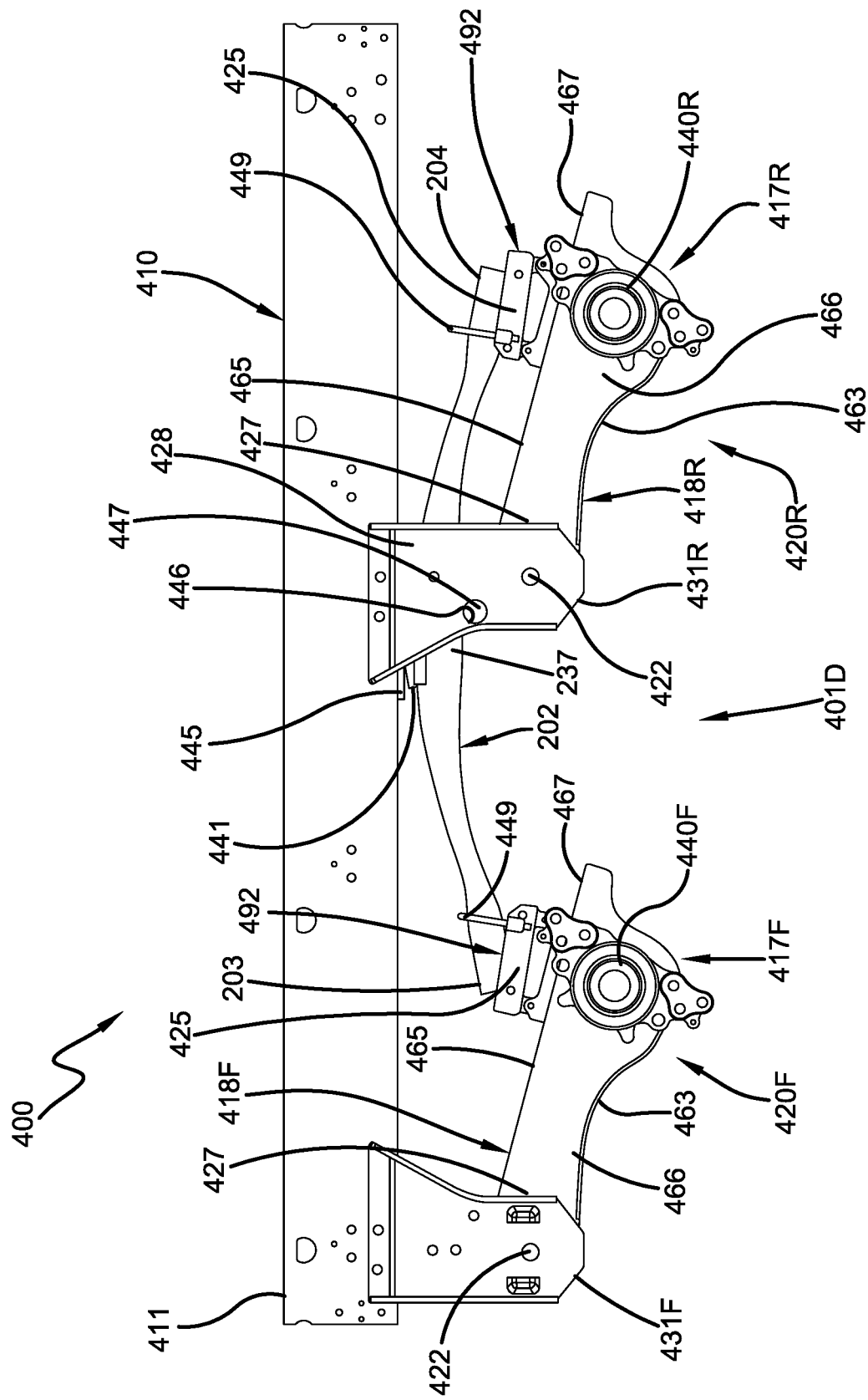
FIG. 18 is an elevational view of a third exemplary embodiment tandem mechanical spring axle/suspension system for heavy-duty vehicles of the subject disclosure mounted on a subframe of the heavy-duty vehicle, showing a driver side suspension assembly of a front axle/suspension system and a driver side suspension assembly of a rear axle/suspension system operatively engaged with a driver side mechanical spring of the subject disclosure, and showing the mechanical spring operatively engaged with the subframe of the vehicle.
Figure 19:
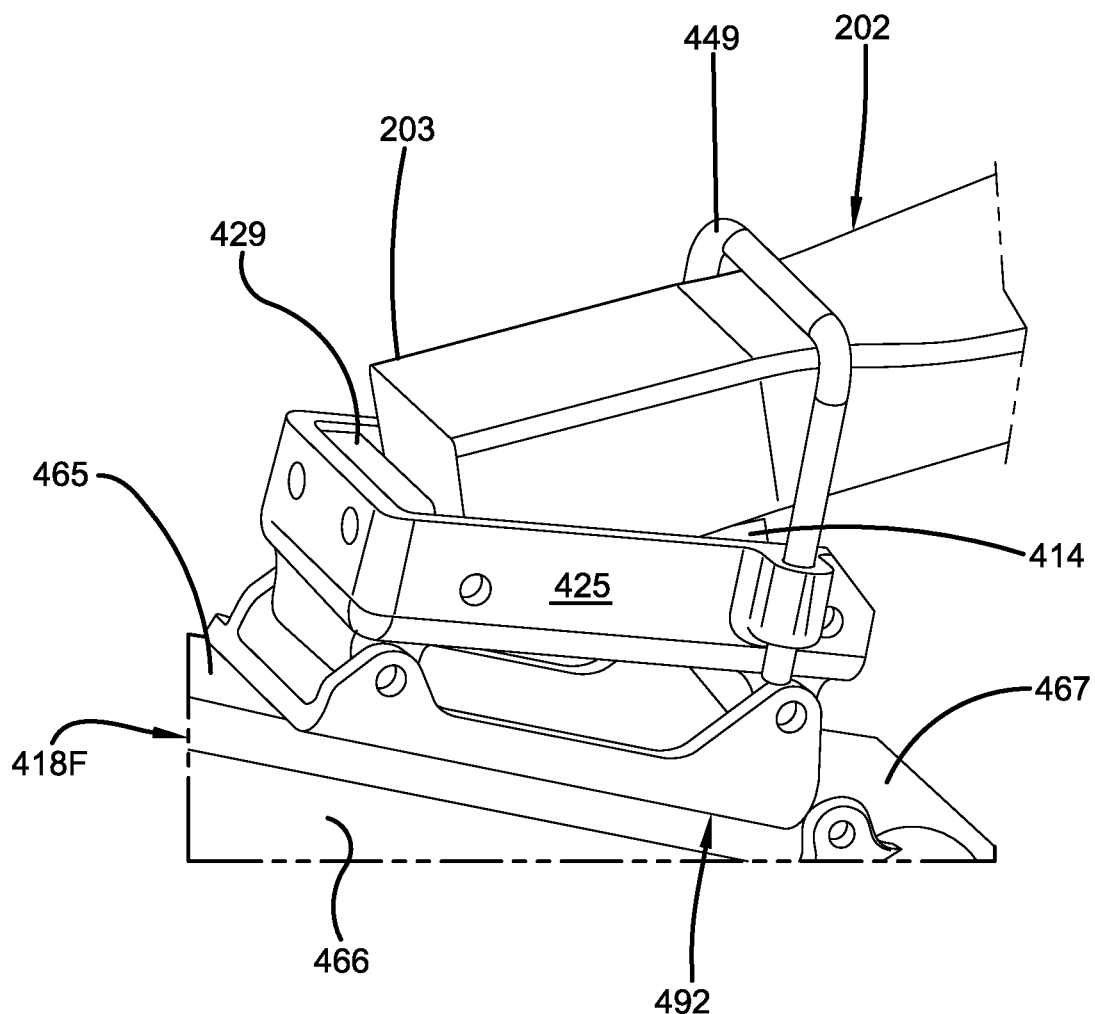
FIG. 19 is a greatly enlarged fragmentary top-front perspective view of the driver side front mount providing operative engagement of the driver side mechanical spring to the driver side suspension assembly of the front axle/suspension system of the third exemplary embodiment tandem mechanical spring axle/suspension system shown in FIG. 18.

Turning now to FIGS. 18-19, a third exemplary embodiment tandem mechanical spring axle/suspension system for heavy-duty vehicles of the subject disclosure is shown mounted on a subframe 410 of a heavy-duty vehicle (not shown), indicated generally at reference numeral 400, and will be described below. Subframe 410 is similar to subframe 210 (FIGS. 4-11) and includes a pair of elongated, longitudinally extending, spaced-apart, parallel main members 411 (only one shown) and a plurality of cross members (not shown) connected to the main members. Subframe 410 is representative of various types of frames used for heavy-duty vehicles, including primary frames that do not support a subframe and primary frames and/or floor structures that do support a subframe.

Third exemplary embodiment tandem mechanical spring axle/suspension system 400 generally includes a front axle/suspension system 420F that is longitudinally spaced from a rear axle/suspension system 420R along main members 411 of subframe 410. A pair of mechanical springs 202, generally identical to those used in conjunction with first and second exemplary embodiment tandem mechanical spring axle/suspension systems 200 and 300, respectively, are spaced transversely from one another, with each one being mounted on a respective driver side and passenger side of the heavy-duty vehicle. Each mechanical spring 202 is operatively engaged with front axle/suspension system 420F and rear axle/suspension system 420R, as well as subframe 410, as will be described in detail below. Front axle/suspension system 420F includes a pair of transversely spaced apart and aligned front suspension assemblies 417F (only driver side shown), each one of which is located on a respective driver side of the heavy-duty vehicle and passenger side of the vehicle. Rear axle/suspension system 420R includes a pair of transversely spaced apart and aligned rear suspension assemblies 417R (only driver side shown), each one of which is located on a respective driver side and passenger side of the heavy-duty vehicle.

Each one of front suspension assemblies 417F of front axle/suspension system 420F and rear suspension assemblies 417R of rear axle/suspension system 420R includes a front trailing arm beam 418F and a rear trailing arm beam 418R, respectively. Each front beam and rear beam 418F and 418R is formed having a generally upside-down integrally formed U-shaped structure with a pair of sidewalls 466 and a top wall 465, with the open portion of the front beam and the rear beam facing generally downwardly. A bottom plate 463 extends between and is attached to the lowermost ends of sidewalls 46 by any suitable means, such as welding, to complete the structure of each front beam 418F and rear beam 418R. Front beam 418F and rear beam 418R each include a front portion 427 with a bushing assembly 422 that includes a bushing (not shown), pivot bolts (not shown), and washers (not shown) to facilitate pivotally connection of the front beam and the rear beam to a respective front hanger 431F or rear hanger 431R. Each front beam 418F and rear beam 418R also includes a rear portion 467, which is welded or otherwise rigidly attached to a respective front and rear axle 440F and 440R.

Each one of front and rear suspension assemblies 417F and 417R is pivotally connected to a respective main member 411 of subframe 410. More particularly, each front and rear suspension assembly 417F and 417R is pivotally mounted on its respective main member 411 of subframe 410 via a respective front hanger 431F and rear hanger 431R. More specifically, a pair of front hangers 431F (only driver side shown) are transversely spaced from one another and aligned, each one of which is fixedly mounted to a respective one of main members 411 of subframe 410. A pair of rear hangers 431R (only driver side shown) are longitudinally spaced from front hangers 431F along main members 411 of subframe 410. Rear hangers 431R are also transversely spaced from one another and aligned, each one of which is fixedly mounted to a respective one of main members 411 of subframe 410.

Third exemplary embodiment tandem mechanical spring axle/suspension system 400 includes a driver side tandem assembly 401D and a passenger side tandem assembly (not shown). Because driver side tandem assembly 401D and the passenger side tandem assembly are identical mirror image copies of each other, for purposed of conciseness and clarity, only the driver side tandem assembly will be described in detail below with the understanding that the passenger tandem assembly is an identical mirror image copy of the driver side tandem assembly. Driver side tandem assembly 401D comprises driver side front beam 418F of driver side front suspension assembly 417F of front axle/suspension system 420F and driver side rear beam 418R of driver side rear suspension assembly 417R of rear axle/suspension system 420R.

In accordance with an important aspect of the subject disclosure, driver side tandem assembly 401D also includes and incorporates mechanical spring 202, which is operatively engaged with and extends longitudinally between driver side front beam 418F and rear beam 418R of front and rear suspension assemblies 417F and 417R, respectively, as well is operatively engaged with main member 411 of subframe 410, as will be described in detail below. Third exemplary embodiment tandem mechanical spring axle/suspension system 400 utilizes mechanical spring 202 that is generally identical to the ones utilized in first and second exemplary embodiment tandem mechanical spring axle/suspension systems 200 and 300 shown and described in detail above.

The difference between third exemplary embodiment tandem mechanical spring axle/suspension system 400 and first exemplary embodiment tandem mechanical spring axle/suspension system 200 is the way in which mechanical spring 202 is operatively engaged with front and rear beams 418F and 418R, respectively, and also the way the mechanical spring operatively engages main member 411 of subframe 410. More specifically, third exemplary embodiment tandem mechanical spring axle/suspension system 400 utilizes a slipper-type mount similar to those found in second exemplary embodiment tandem mechanical spring axle/suspension system 300 to operatively engage mechanical spring 202 with driver side front beam 418F and also driver side rear beam 418R, as will be described in detail below. In addition, third exemplary embodiment tandem mechanical spring axle/suspension system 400 is also operatively engaged with main member 411 of subframe 410 in a manner similar to that shown and described with first exemplary embodiment tandem mechanical spring axle/suspension system 200 described above, in order to allow mechanical spring 202 to slide longitudinally along the main member, as will also be described in detail below. As a result, mechanical spring 202 of third exemplary embodiment tandem mechanical spring axle/suspension system 400 incorporates a slipper-type mount at all three interfaces between the mechanical spring and driver side front beam 418F, driver side rear beam 418R, and main member 411. Thus, mechanical spring 202 of third exemplary embodiment tandem mechanical spring axle/suspension system 400 is allowed to generally pivot, flex, rock and/or slide longitudinally at all three aforementioned interfaces.

In accordance with an important aspect of the subject disclosure, mechanical spring 202 operatively engages driver side front beam 418F of driver side tandem assembly 401D. Third exemplary embodiment tandem mechanical axle/suspension system 400 includes a slipper mount 492, which is mounted to rear portion 467 of driver side front beam 418F of driver side tandem assembly 401D. Slipper mount 492 provides for operative engagement of mechanical spring 202 with front beam 418F in order to react loads and forces encountered by front axle/suspension systems 420F during operation of the vehicle. More specifically, front end 203 of mechanical spring 202 is fitted, via adhesive, bonding, or other suitable fastening means, with a generally rectangular lower slipper 414 (FIG. 19) and is operatively engaged with slipper mount 492, that is fixedly mounted to rear portion 467 of driver side front beam 418F. Slipper mount 492 is mounted on rear portion 467 of driver side front beam 418F via fasteners or other fastening means (not shown). Slipper mount 492 includes a pair of upwardly extending walls 425 that form a clevis-like structure. A bracket 449 is fastened to slipper mount 492 via suitable means and extends upwardly over front end 203 of mechanical spring 202. A spring stop 429 (FIG. 19) is formed within slipper mount 492, which functions as a positive stop to prohibit excessive frontward longitudinal movement of front end 203 of mechanical spring 202. Lower slipper 414 may include a cam feature (not shown) located on its bottom that maintains line contact with slipper mount 492 in order to aid in load equalization between front axle/suspension system 420F and rear axle/suspension system 420R. The cam feature is designed to promote line contact between mechanical spring 202 and slipper mount 492 at a predetermined point along driver side front beam 418F generally behind front axle 440F. More specifically, as mechanical spring 202 flexes, bends, and/or slides during operation of the heavy-duty vehicle, front end 203 of the mechanical spring is able to flex, rock, pivot, and/or slide under bracket 449 and is generally free to move without contact with the bracket unless the vehicle experiences extreme rebound, such as, for example, during axle hang. Moreover, lower slipper 414 is able to rock, pivot and/or slide on the top surface of slipper mount 492 within walls 425 during dynamic movements of mechanical spring 202 during operation of the vehicle, and the spring remains generally protected by the lower slipper. Both lower slipper 414 and slipper mount 492 may be formed from hardened or tempered steel. It should be understood that the top surface of slipper mount 492 may also be formed with a cam feature in order to compliment lower slipper 414, formed with or without a cam feature, to promote line contact between front end 203 of mechanical spring 202 and the slipper mount at a predetermined point along driver side front beam 418F generally behind front axle 440F. The arrangement allows front end 203 of mechanical spring 202 to flex, move, rock, pivot, and/or slide longitudinally during operation of the heavy-duty vehicle.

The top surface of front end 203 of mechanical spring 202 includes a bumper (not shown) attached thereto via suitable means, such as a fastener (not shown). The bumper is formed from rubber, nylon, or other suitably pliant material. The bumper extends upwardly from mechanical spring 202 toward main member 411 of subframe 410. The bumper provides a cushion between the top of mechanical spring 202 and main member 411 of subframe 410 so that the mechanical spring is not damaged during extreme jounce events, as well as ensures the tires of the vehicle do not contact the underside of the vehicle frame during such events.

Moreover, during extreme rebound events when the vehicle is lifted so that the wheels of the heavy-duty vehicle are no longer in contact with the ground, such as when the vehicle is loaded onto a train, slipper mount 492, lower slipper 414, and bracket 449 work in combination with one another and mechanical spring 202 to limit rebound of front axle/suspension system 420F. The combination of slipper mount 492, lower slipper 414, and bracket 449, along with mechanical spring 202, also provides for control of rebound during reverse braking, and/or extreme roll events. In this manner, driver side front beam 418F and mechanical spring 202 are operatively engaged with one another during operation of the heavy-duty vehicle.

In accordance with another important aspect of the subject disclosure, mechanical spring 202 operatively engages main member 411 of subframe 410. More specifically, and with reference to FIG. 18, mechanical spring 202 extends rearwardly through driver side rear hanger 431R such that the mechanical spring extends between a pair of transversely spaced sidewalls 428 (only one shown) of the rear hanger, and includes a member interface 441 that is free to rock, pivot, and/or slide against a wear surface of a member bracket 445 attached to the bottom of main member 411 of subframe 410. More specifically, member interface 441 is connected to the top surface of mechanical spring 202 at about the midpoint of middle portion 237 of the mechanical spring via suitable means, such as an adhesive or fasteners. Member interface 441 is preferably formed of an elastomeric interface material that enables mechanical spring 202 to flex relative to the member interface, but can be formed of other suitable materials without affecting the overall concept or operation of the subject disclosure. Member interface 441 includes an upwardly protruding longitudinally extending fin (not shown). The fin of member interface 441 is disposed within and cooperates with a complimentary shaped groove (not shown) formed in a bottom surface of member bracket 445, which is fixedly connected to the underside of main member 411 of subframe 410 by any suitable means, such as fasteners, tabs, or welding. The fin of member interface 441 protrudes into the groove of member bracket 445 such that mechanical spring 202 maintains transverse and longitudinal alignment during operation of the heavy-duty vehicle. In addition, the cooperation of the fin of member interface 441 and the groove of member bracket 445 allows the fin to rock, pivot and/or slide within the groove, and thus allows mechanical spring 202 to rock, pivot, and/or slide relative to sidewalls 428 of driver side rear hanger 431R, while maintaining contact with main member 411 of subframe 410 so that loads or forces encountered by the heavy-duty vehicle that are transmitted through either driver side front beam 418F or rear beam 418R are transmitted directly onto the main member of the subframe during operation of the vehicle. Driver side rear hanger 431R includes a pair of aligned openings 446, with each opening being formed through respective sidewalls 428 of the rear hanger. A fastener 447 is disposed through openings 446 of sidewalls 428 of rear hanger 431R such that the fastener extends transversely between the sidewalls and rests against the lower surface of mechanical spring 202. As a result, fastener 447 resists excessive downward movement of mechanical spring 202 during operation of the heavy-duty vehicle, keeping the fin of member interface 441 engaged with the groove of member bracket 445. More specifically, fastener 447 allows mechanical spring 202 to move in the downward direction to some extent, but also prohibits the mechanical spring from contacting top wall 465 of the driver side rear beam 418R at front portion 427 during extreme jounce that may occur during operations of the heavy-duty vehicle. In this manner, mechanical spring 202 main member 411 of subframe 410 are operatively engaged with one another during operation of the heavy-duty vehicle.

In accordance with yet another important aspect of the subject disclosure, mechanical spring 202 operatively engages driver side rear beam 418R of driver side tandem assembly 401D. More specifically, rear end 204 of mechanical spring 202 is fitted with a generally rectangular lower slipper (not shown) similar in structure and function to lower slipper 414 described above via adhesive bonding or other suitable fastening means, and is operatively engaged with a slipper mount 492 that is fixedly mounted to rear portion 467 of driver side rear beam 418R of driver side tandem assembly 401D. Slipper mount 492 is similar in structure and function to the slipper mount fixedly mounted on driver side front beam 418F described above. Together, the lower slipper and slipper mount 492 enable operative engagement of driver side rear beam 418R and mechanical spring 202 during operation of the heavy-duty vehicle in a manner similar to that described above with regard to the operative engagement of the mechanical spring and driver side front beam 418F.

As driver side front beam 418F and driver side rear beam 418R of driver side tandem assembly 401D are each operatively engaged with mechanical spring 202 of the tandem assembly in the manner described above, the driver side tandem assembly provides a hybrid combination air-ride and mechanical-type tandem assembly which utilizes a single mechanical spring in order to react loads from driver side front suspension assembly 417F and driver side rear suspension assembly 417R of front and rear axle/suspension systems 420F and 420R, respectively. Moreover, because mechanical spring 202 is operatively engaged with main member 411 of subframe 410 in the manner described above, the mechanical spring reacts loads from driver side front beam 418F and driver side rear beam 418R directly onto the main member during operation of the heavy-duty vehicle. The single mechanical spring 202 replaces a pair of air springs located on the driver side front and rear suspension assemblies of the front and rear axle/suspension systems of prior art tandem air-ride axle/suspension systems, such as prior art tandem air-ride axle/suspension system 108 (FIG. 3) described above, and also replaces a pair of mechanical spring stacks located on the driver side front and rear suspension assemblies of front and rear axle/suspension systems of prior art tandem mechanical spring axle/suspension systems, such as prior art tandem mechanical spring axle/suspension system 10 (FIGS. 1-2) described above.

Thus, third exemplary embodiment tandem mechanical spring axle/suspension system 400 provides a tandem axle/suspension system with reduced spring rate compared to prior art tandem mechanical spring axle/suspension systems, reduces inter-axle load transfer due to braking, improves the distribution of forces encountered by the tandem axle/suspension system during operation, eliminates the clamp assemblies and radius rods employed by the front and rear axle/suspensions of prior art tandem mechanical sprig axle/suspension systems, and decreases the stresses placed on the subframe of the heavy-duty vehicle, while being generally lighter weight and more economical than prior art tandem air-ride axle/suspension systems. Accordingly, third exemplary embodiment tandem mechanical spring axle/suspension system 400 provides a tandem axle/suspension system that is light weight, provides improved ride quality, braking and handling, maintains static and dynamic load equalization between the axles of the tandem axle/suspension system, and lowers manufacturing and maintenance costs.

Figure 20:
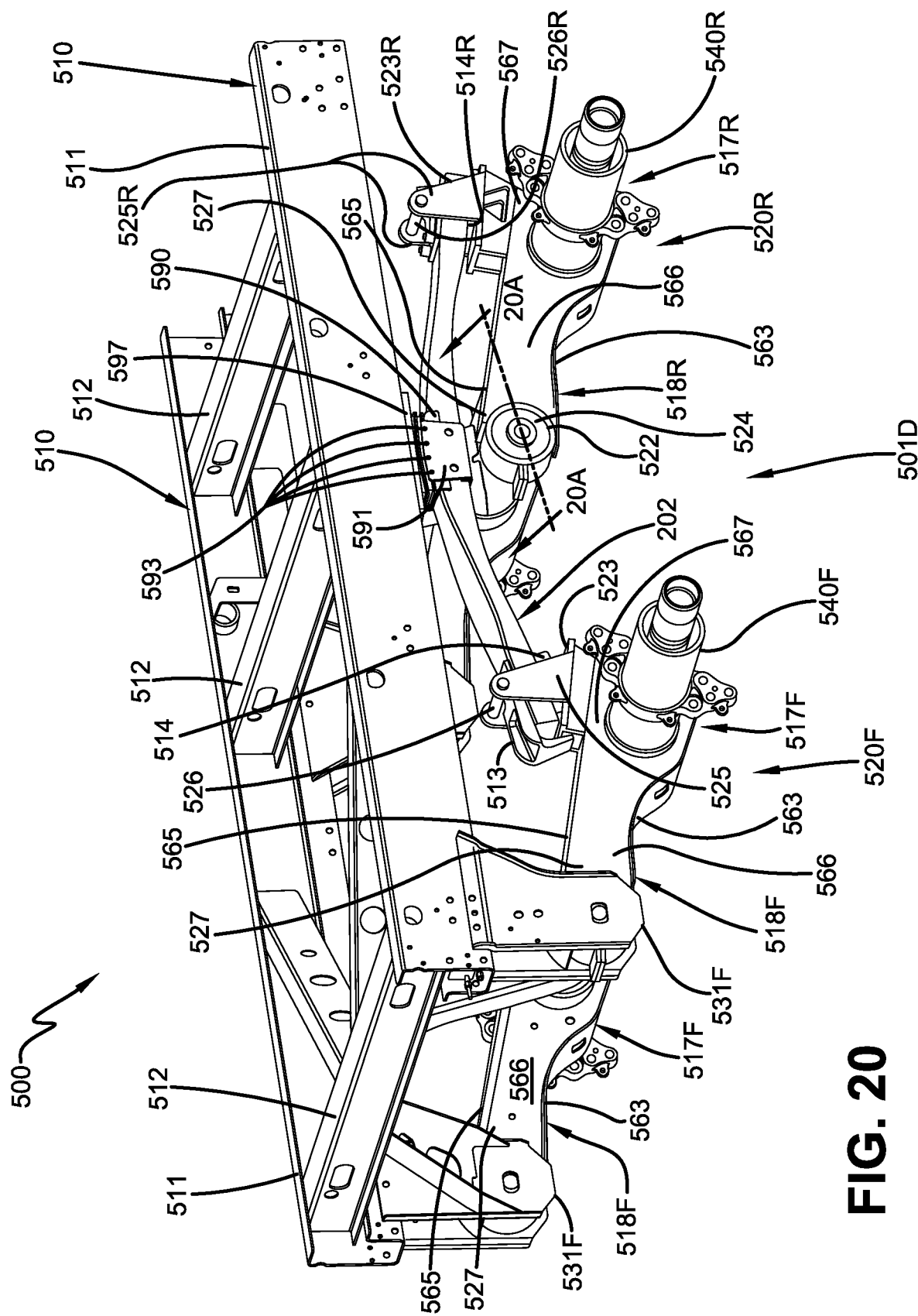
FIG. 20 is a top-front perspective view of a fourth exemplary embodiment tandem mechanical spring axle/suspension system for heavy-duty vehicles of the subject disclosure mounted on a subframe of the heavy-duty vehicle, showing a driver side suspension assembly of a front axle/suspension system and a driver side suspension assembly of a rear axle/suspension system operatively engaged with a driver side mechanical spring of the subject disclosure, and showing the mechanical spring operatively engaged with the subframe of the vehicle.
Figure 21:
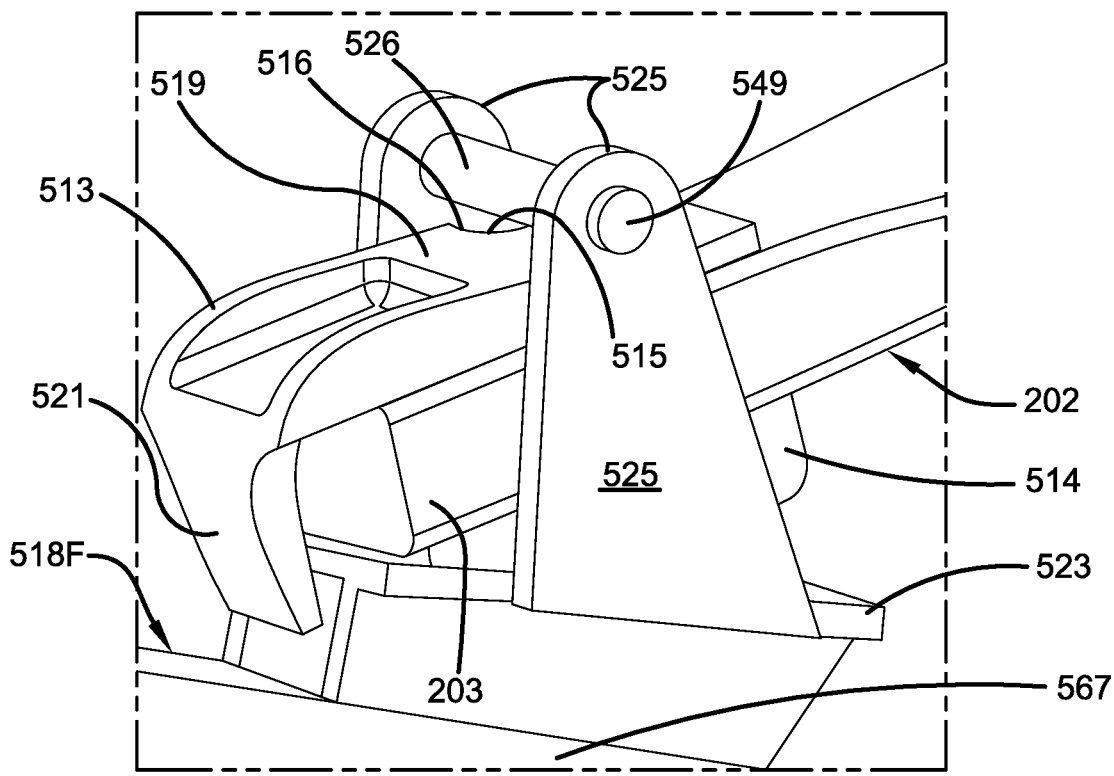
FIG. 21 is a greatly enlarged top-front fragmentary perspective view of a portion of the fourth exemplary embodiment tandem mechanical spring axle/suspension system shown in FIG. 20, showing the operative engagement of the driver side mechanical spring with the driver side suspension assembly of the front axle/suspension system.
Figure 22:
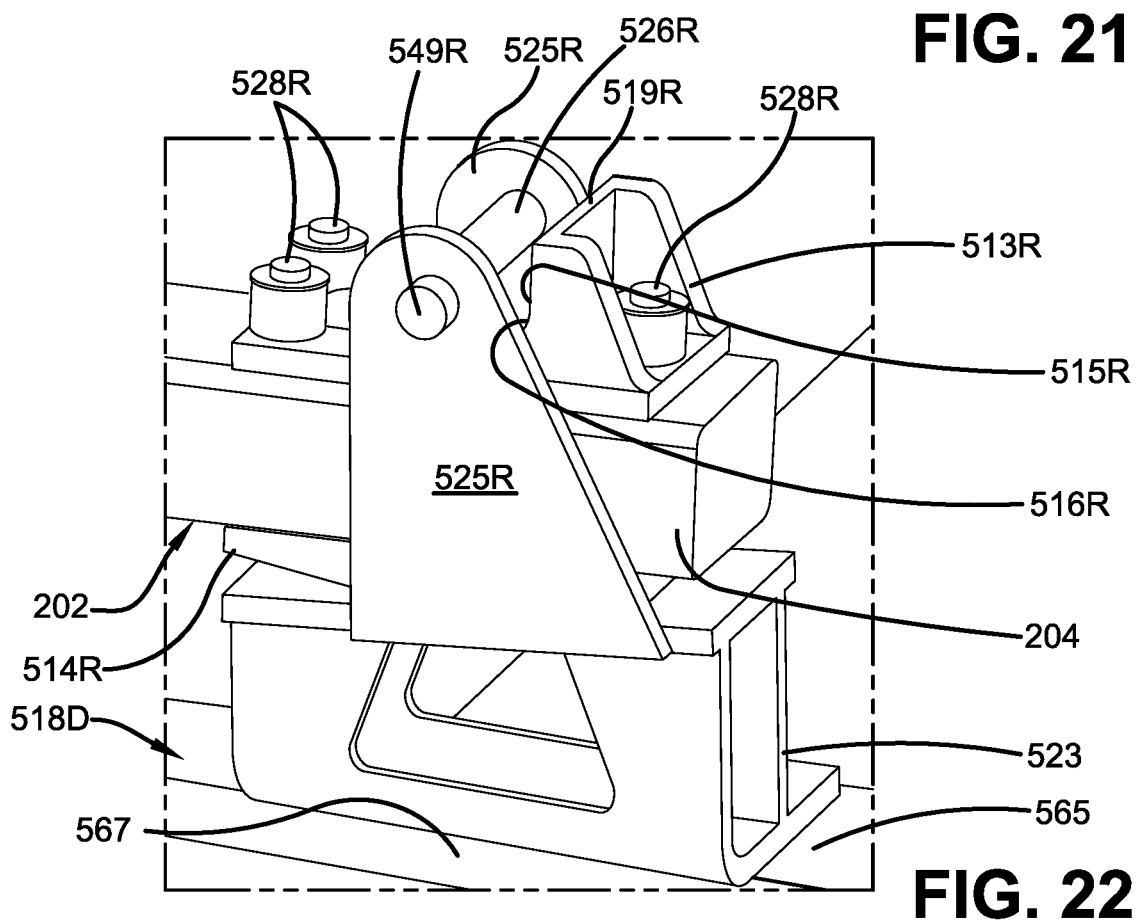
FIG. 22 is a greatly enlarged top-rear fragmentary perspective view of a portion of the fourth exemplary embodiment tandem mechanical spring axle/suspension system shown in FIG. 20, showing the operative engagement of the driver side mechanical spring with the driver side suspension assembly of the rear axle/suspension system.
Figure 23:
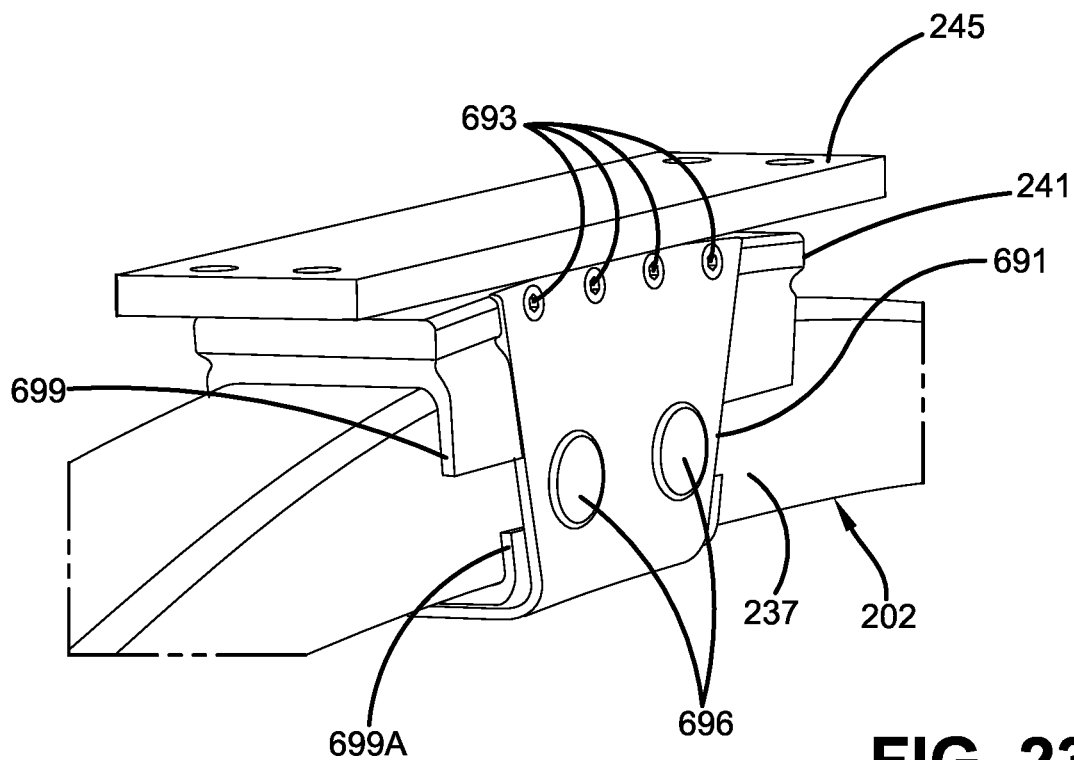
FIG. 23 is a greatly enlarged fragmentary perspective view of an alternative mechanically enhanced connection between a mechanical spring of the subject disclosure and a member interface utilized in conjunction with either the first or third exemplary embodiment tandem mechanical spring axle/suspension systems shown in FIGS. 4 and 18, respectively.

Turning now to FIGS. 20-22, a fourth exemplary embodiment tandem mechanical spring axle/suspension system for heavy-duty vehicles of the subject disclosure is shown mounted on a subframe 510 of a heavy-duty vehicle (not shown), indicated generally at reference numeral 500, and will be described below. Subframe 510 is similar to subframe 210 described above and includes a pair of elongated longitudinally extending, spaced-apart, parallel main members 511 and a plurality of cross members 512 connected therebetween. Subframe 510 is representative of various types of frames used for heavy-duty vehicles, including primary frames that do not support a subframe and primary frames and/or floor structures that do support a subframe.

Figure 20A:
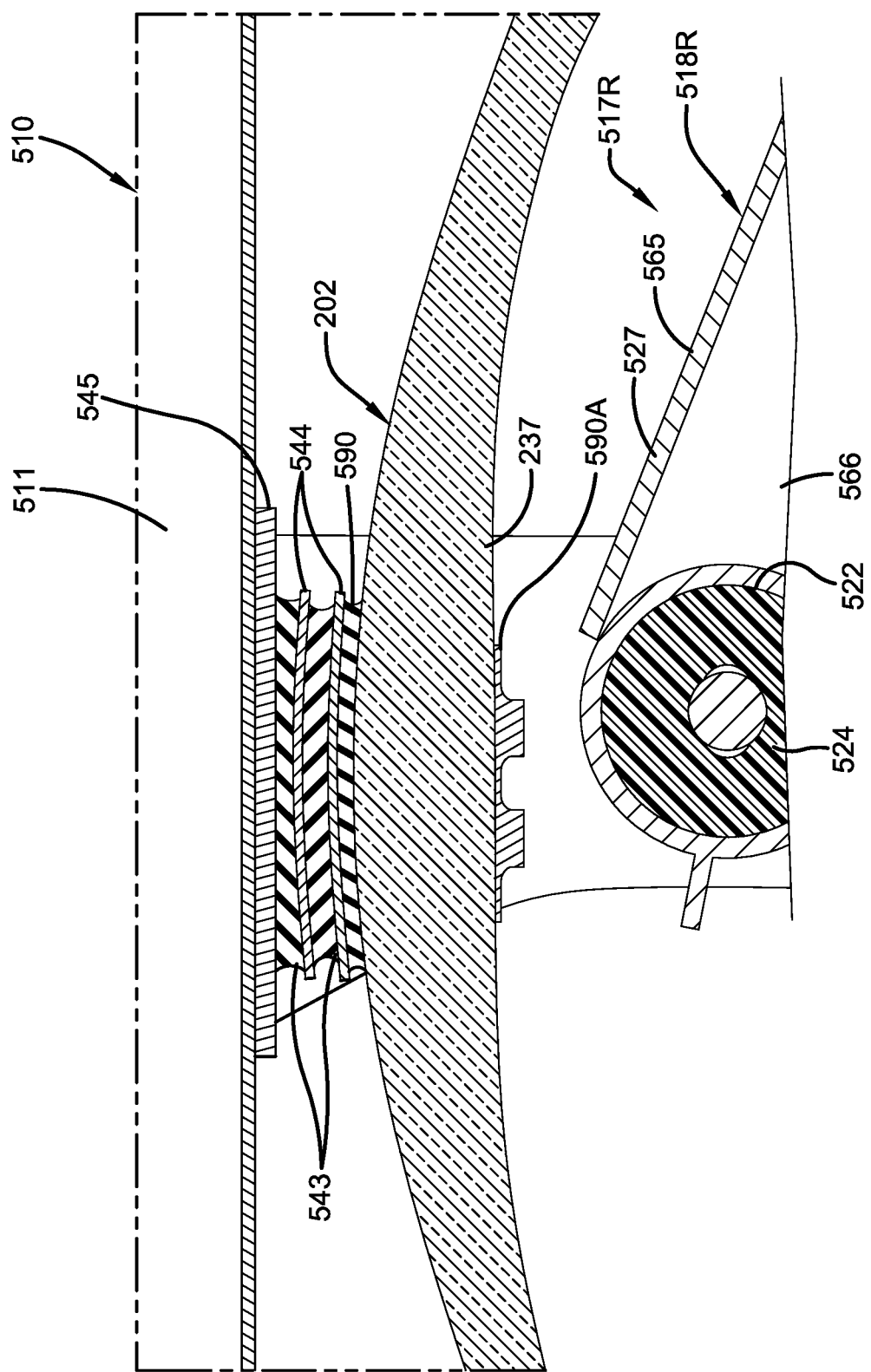
FIG. 20A is a greatly enlarged fragmentary cross-sectional view of a portion of the mechanical spring and the driver side suspension assembly of the rear axle/suspension system of the fourth exemplary embodiment tandem mechanical spring axle/suspension system shown in FIG. 20, showing the driver side mechanical spring operatively engaged with a main member of the subframe via a bolster.

With reference to FIGS. 20-20A, fourth exemplary embodiment tandem mechanical axle/suspension system 500 generally includes a front axle/suspension system 520F that is longitudinally spaced from a rear axle/suspension system 520R along main members 511 of subframe 510. A pair of mechanical springs 202 (only one shown), generally identical to those used in conjunction with first, second, and third exemplary embodiment tandem mechanical spring axle/suspension systems 200, 300, and 400, respectively, are spaced transversely from one another, with each one being mounted on a respective driver side and passenger side of the heavy-duty vehicle. Each mechanical spring 202 is operatively engaged with front axle/suspension system 520F and rear axle/suspension system 520R, as well as subframe 510, as will be described in detail below. Front axle/suspension system 520F includes a pair of transversely spaced apart and aligned front suspension assemblies 517F, each one of which is located on a respective driver side and passenger side of the heavy-duty vehicle. Rear axle/suspension system 520R includes a pair of transversely spaced apart and aligned rear suspension assemblies 517R, each one of which is located on a respective driver side and passenger side of the heavy-duty vehicle.

Each one of front suspension assemblies 517F of front axle/suspension system 520F and rear suspension assemblies 517R of rear axle/suspension system 520R includes a front trailing arm beam 518F and a rear trailing arm beam 518R, respectively. Each front beam and rear beam 518F and 518R is formed having a generally upside-down integrally formed U-shaped structure with a pair of sidewalls 566 and a top wall 565, with the open portion of the front beam and the rear beam facing generally downwardly. A bottom plate 563 extends between and is attached to the lowermost ends of sidewalls 566 by any suitable means, such as welding, to complete the structure of each front beam 518F and rear beam 518R. Front beam 518F and rear beam 518R each include a front portion 527 with a bushing assembly 522 that includes a bushing 524 (only one shown), pivot bolts (not shown), and washers (not shown) to facilitate pivotally connection of the front beam and the rear beam to a respective front hanger 531F or rear hanger (not shown). Each front beam 418F and rear beam 418R also includes a rear portion 567, which is welded or otherwise rigidly attached to a respective front and rear axle 540F and 540R.

Each one of suspension front and rear suspension assemblies 517F and 517R is pivotally connected to its respective main member 511 and is also rigidly connected to a front and rear axle 540F and 540R, respectively. More particularly, each front and rear suspension assembly 517F and 517R is pivotally mounted on its respective main member 511 of subframe 510 via a respective front hanger 531F or rear hanger. More specifically, a pair of front hangers 531F are transversely spaced from one another and aligned, each one of which is fixedly mounted to a respective one of main members 511 of subframe 510. A pair of rear hangers (not shown) are longitudinally spaced from the front hangers along the main members of the subframe. The rear hangers (not shown) are also transversely spaced from one another and aligned, each one of which is fixedly mounted to a respective one of main members 511 of subframe 510.

Fourth exemplary embodiment tandem mechanical spring axle/suspension system 500 includes a driver side tandem assembly 501D and a passenger side tandem assembly (not shown). Because driver side tandem assembly 501D is an identical mirror image copy of the passenger side tandem assembly, for purposes of conciseness and clarity, only the driver side tandem assembly will be described in detail below with the understanding that the passenger side tandem assembly is an identical mirror image copy of the driver side tandem assembly. With reference to FIG. 1, driver side tandem assembly 501D comprises driver side front beam 518F of driver side front suspension assembly 517F of front axle/suspension system 520F and driver side rear beam 518R of driver side rear suspension assembly 517R of rear axle/suspension system 520R.

In accordance with an important aspect of the subject disclosure, driver side tandem assembly 501D also includes and incorporates mechanical spring 202, which is operatively engaged with and extends longitudinally between driver side front beam 518F and rear beam 518R of driver side front and rear suspension assemblies 517F and 517R, respectively, as well as is operatively engaged with main member 511 of subframe 510, as will be described in detail below. Fourth exemplary embodiment tandem mechanical spring axle/suspension system 500 utilizes mechanical spring 202 that is generally identical to the ones utilized in first, second, and third exemplary embodiment tandem mechanical spring axle/suspension systems 200, 300, and 400, respectively, shown and described in detail above. Mechanical spring 202 is operatively engaged with driver side front beam 518F via a slipper-type mount that is similar in function to the front and rear mounts shown and described above with regard to second exemplary embodiment tandem mechanical spring axle/suspension system 300, but includes a different structure, as will be described in detail below. Mechanical spring 202 is also operatively engaged with driver side rear beam 518R via a slipper-type mount similar in structure and function to the front and rear mounts shown and described above with regard to second exemplary embodiment tandem mechanical spring axle/suspension system 300. Like second exemplary embodiment tandem mechanical spring axle/suspension system 300, fourth exemplary embodiment tandem mechanical spring axle/suspension system 500 includes a bolster that generally prohibits mechanical spring 202 from sliding longitudinally because it is operatively engaged to main member 511 of subframe 510 via the bolster, which holds the mechanical spring longitudinally in place, but allows the mechanical spring to pivot, rock, and/or flex at the engagement area, as will also be described in detail below.

In accordance with an important aspect of the subject disclosure, mechanical spring 202 operatively engages driver side front beam 518F of driver side tandem assembly 501D. More specifically, and with reference to FIGS. 20 and 21, front end 203 of mechanical spring 202 is fitted with an upper jounce/rebound control structure, or "upper jounce and rebound control structure", 513 and a generally rectangular lower slipper 514. Upper jounce/rebound control structure 513 includes a recessed area 515 (FIG. 21) formed with an incline 516 (FIG. 21) leading to a shelf 519 (FIG. 21). Upper jounce/rebound control structure 513 further includes a positive stopping structure 521 (FIG. 21) extending downwardly from the rear end of the upper jounce/rebound control structure, the importance of which will be described below. Upper jounce/rebound control structure 513, front end 203 of mechanical spring 202, and lower slipper 514 are all formed with a pair of aligned openings (not shown). A pair of fasteners (not shown) are disposed through the aligned openings formed in upper jounce/rebound control structure 513, front end 203 of mechanical spring 202, and lower slipper 514 to fixedly connect the upper jounce/rebound control structure and the lower slipper to the front end of the mechanical spring. A jounce/rebound control structure bracket, or "jounce and rebound control structure bracket", 523 is mounted on rear portion 567 of driver side front beam 518F via fasteners (not shown). Jounce/rebound control structure bracket 523 includes a pair of upwardly extending walls 525 that form a clevis-like structure. Walls 525 are each formed with an aligned opening (not shown). A sleeve 526 is positioned between the aligned openings of walls 525. A fastener 549 (FIG. 21) is disposed through the aligned openings formed in walls 525 and sleeve 526 of jounce/rebound control structure bracket 523 so that upper jounce/rebound control structure 513 attached to front end 203 of mechanical spring 202 is generally contained under the sleeve. Lower slipper 514 may include a cam feature (not shown) located on its bottom surface that maintains line contact with jounce/rebound control structure bracket 523 in order to aid in load equalization between front axle/suspension system 520F and rear axle/suspension system 520R. The cam feature is designed to promote line contact between mechanical spring 202 and jounce/rebound control structure bracket 523 at a predetermined point along driver side front beam 518F generally behind front axle 540F. More specifically, as mechanical spring 202 flexes and bends during operation of the heavy-duty vehicle, upper jounce/rebound control structure 513, which captures front end 203 of the mechanical spring, is able to flex, rock, pivot, and/or slide under sleeve 526 and is generally free to move without contact with the sleeve unless the vehicle experiences extreme rebound, such as, for example, during axle hang. Moreover, lower slipper 514 is able to rock, pivot and/or slide on the top surface of jounce/rebound control structure bracket 523 between walls 525 during dynamic movements of mechanical spring 202 during operation of the heavy-duty vehicle, and the mechanical spring remains protected by the lower slipper. In addition, and with reference to FIG. 21, positive stopping structure 521 of upper jounce/rebound control structure 513 prevents mechanical spring 202 from sliding longitudinally rearwardly out of operative engagement with jounce/rebound control structure bracket 523 via contact with the upper jounce/rebound control structure. Both lower slipper 514 and the top surface of jounce/rebound control structure bracket 523 may be formed from hardened or tempered steel. It should be understood that the top surface of jounce/rebound control structure bracket 523 may also be formed with a cam feature in order to compliment lower slipper 514, formed with or without a cam feature, to promote line contact between front end 203 of mechanical spring 202 and jounce/rebound control structure bracket 523 at a predetermined point along driver side front beam 518F generally behind front axle 540F. The arrangement allows front end 203 of mechanical spring 202 to flex, move, rock, pivot, and/or slide longitudinally during operation of the heavy-duty vehicle.

The top surface of upper jounce/rebound control structure 513 includes a bumper (not shown) attached thereto via suitable means, such as a fastener (not shown). The bumper is formed from rubber, nylon, or other suitably pliant material. The bumper extends upwardly from upper jounce/rebound control structure 513 toward main member 511 of subframe 510. The bumper provides a cushion between the upper jounce/rebound control structure 513 and main member 511 of subframe 510 so that mechanical spring 202 and the upper jounce/rebound control structure are not damaged during extreme jounce events, as well as ensures the tires of the heavy-duty vehicle do not contact the underside of the vehicle frame during such events.

Moreover, during extreme rebound events when the vehicle is lifted so that the wheels of the heavy-duty vehicle are no longer in contact with the ground, such as when the vehicle is loaded onto a train, upper jounce/rebound control structure 513 and jounce/rebound control structure bracket 523 work in combination with one another and mechanical spring 202 to limit rebound of the front axle/suspension system. More specifically, as driver side front beam 218F moves downwardly, sleeve 526 of jounce/rebound control structure bracket 523 contacts the top surface of upper jounce/rebound control structure 513, transferring the load of the beam onto mechanical spring 202, which in turn limits further downward movement of the beam via tension of the mechanical spring. The combination of upper jounce/rebound control structure 513, lower slipper 514, and jounce/rebound control structure bracket 523, along with mechanical spring 202, also provides for control of rebound during reverse braking, and/or extreme roll events. In this manner, driver side front beam 518F and mechanical spring 202 of driver side tandem assembly 501D of fourth exemplary embodiment tandem mechanical spring axle/suspension system 500 are operatively engage.

In accordance with another important aspect of the subject disclosure, mechanical spring 202 operatively engages main member 511 of subframe 510. More specifically, and with reference to FIG. 20-20A, mechanical spring 202 extends rearwardly through the driver side rear hanger (not shown) such that a middle portion 237 of the mechanical spring extends between a pair of transversely spaced sidewalls (not shown) of the rear hanger and includes a bolster 597 and an upper cushion 590 and a lower cushion 590A (FIG. 20A) that are each connected to mechanical spring 202. Bolster 597 is in turn connected to main member 511 of subframe 510 in order to mount mechanical spring 202 to the main member. More specifically, bolster 597 is fixedly attached to main member 511 via suitable means, such as fasteners (not shown). With reference to FIG. 20A, bolster 597 includes a top plate 545 that is rectangular and generally planer. A pair of rectangular plates 544 having an arced curvature along their longitudinal axis are spaced downwardly from the top plate. The spaces between top plate 545 and plates 544 are filled with an elastomeric material 543. With reference to FIGS. 20-20A, upper cushion 590 is positioned between the lower plate 544 and mechanical spring 202 and lower cushion 590A is positioned on the bottom of the mechanical spring. With reference to FIG. 20, a sleeve 591 formed from metal or other suitably robust material is disposed around mechanical spring 202, including upper and lower cushions 590 and 590A, and is fastened to bolster 597 via fasteners 593 (FIG. 20). Bolster 597 provides operative engagement of mechanical spring 202 to main member 511 between the sidewalls of the driver side rear hanger. Upper cushion 590 and lower cushion 590A are made from rubber or other suitably pliant material. The operative engagement of mechanical spring 202 to bolster 597 prevents the mechanical spring from moving downwardly during extreme rebound events, such as when the vehicle wheels are lifted from contact with the ground. Moreover, the operative engagement of mechanical spring 202 to main member 511 utilizing bolster 597 in combination with upper and lower cushions 590 and 590A provides direct transmission of loads and forces encountered by front axle/suspension system 520F of the heavy-duty vehicle directly onto subframe 510. In addition, the operative engagement of mechanical spring 202 to main member 511 of subframe allows the mechanical spring to minimally flex, rock, and/or pivot between the sidewalls of the driver side rear hanger during dynamic movements of fourth exemplary embodiment tandem mechanical spring axle/suspension system 500 during operation of the heavy-duty vehicle. In this manner, mechanical spring 202 operatively engages main member 511 of subframe 510 of the heavy-duty vehicle.

In accordance with yet another important aspect of the subject disclosure, and with reference to FIGS. 20 and 22, mechanical spring 202 operatively engages driver side rear beam 518R of driver side tandem assembly 501D. More specifically, rear end 204 of mechanical spring 202 is fitted with an upper jounce/rebound control structure, or "upper jounce and rebound control structure", 513R and a generally rectangular lower slipper 514R (FIG. 22). With reference to FIG. 22, upper jounce/rebound control structure 513R includes a recessed area 515R formed with an incline 516R leading to a shelf 519R. Upper jounce/rebound control structure 513R, rear rend 204 of mechanical spring 202, and lower slipper 514R are all formed with a pair of aligned openings (not shown). A plurality of fasteners 528R pass through the aligned openings formed in upper jounce/rebound control structure 513R, rear end 204 of mechanical spring 202, and lower slipper 514R to fixedly connect the upper jounce/rebound control structure and the lower slipper to the rear end of the mechanical spring.

A jounce/rebound control structure bracket 523R, or "jounce and rebound control structure bracket", is mounted on rear portion 567 of driver side rear beam 518R via fasteners (not shown). Jounce/rebound control structure bracket 523R includes a pair of upwardly extending walls 525R that form a clevis-like structure. Walls 525R are each formed with respective transversely aligned opening (not shown). A sleeve 526R is positioned between the aligned openings of walls 525R. A fastener 549R is disposed through the aligned openings formed in walls 525R and sleeve 526R of jounce/rebound control structure bracket 523R so that upper jounce/rebound control structure 513R attached to rear end 204 of mechanical spring 202 is generally contained under the sleeve. Lower slipper 514R may include a cam feature (not shown) located on its bottom that maintains line contact with jounce/rebound control structure bracket 523R in order to aid in load equalization between front axle/suspension system 520F and rear axle/suspension system 520R. The cam feature is designed to promote line contact between mechanical spring 202 and jounce/rebound control structure bracket 523R at a predetermined point along driver side rear beam 518R generally behind rear axle 540R. More specifically, as mechanical spring 202 flexes and bends during operation of the heavy-duty vehicle, upper jounce/rebound control structure 513R, which captures rear end 204 of the mechanical spring, is able to flex, rock, pivot, and/or slide under sleeve 526R and is generally free to move without contact with the sleeve unless the vehicle experiences extreme rebound, such as, for example, during axle hang. Moreover, lower slipper 514R is able to rock, pivot, and/or slide on the top surface of jounce/rebound control structure bracket 523R between walls 525R during dynamic movements of mechanical spring 202 during operation of the heavy-duty vehicle, and the mechanical spring remains protected by the lower slipper. Both lower slipper 514R and the top surface of jounce/rebound control structure bracket 523R may be formed from hardened or tempered steel. It should be understood that the top surface of jounce/rebound control structure bracket 523R may also be formed with a cam feature in order to compliment lower slipper 514R, formed with or without a cam feature, to promote line contact between mechanical spring 202 and jounce/rebound control structure bracket 523R at a predetermined point along driver side rear beam 518R generally behind rear axle 540R. The arrangement allows rear end 204 of mechanical spring 202 to flex, move, rock, pivot, and/or slide during operation of the heavy-duty vehicle.

The top surface of upper jounce/rebound control structure 513R includes a bumper (not shown) attached thereto via suitable means, such as a fastener (not shown). The bumper is formed from rubber, nylon, or other suitably pliant material. The bumper extends upwardly from upper jounce/rebound control structure 513R toward main member 511 of subframe 510. The bumper provides a cushion between upper jounce/rebound control structure 513R and main member 511 so that mechanical spring 202 and the upper jounce/rebound control structure are not damaged during extreme jounce events, as well as ensures the tires of the vehicle do not contact the underside of the vehicle frame during such events.

Moreover, during extreme rebound events when the heavy-duty vehicle is lifted so that the wheels of the vehicle are no longer in contact with the ground, such as when the vehicle is loaded onto a train, upper jounce/rebound control structure 513R and jounce/rebound control structure bracket 523R work in combination with one another and mechanical spring 202 to limit rebound of rear axle/suspension system 520R. More specifically, as driver side rear beam 518R moves downwardly, sleeve 526R of jounce/rebound control structure bracket 523R contacts upper jounce/rebound control structure 513R and/or shelf 519R, transferring the load of the beam onto mechanical spring 202, which in turn limits further downward movement of the beam via tension of the mechanical spring. In addition, shelf 519R acts as a as a positive stop to prohibit excessive frontward longitudinal movement of rear end 204 of mechanical spring 202 via contact with the sleeve of j ounce/rebound control structure bracket 323R. The combination of upper jounce/rebound control structure 513R, lower slipper 514R, and jounce/rebound control structure bracket 523R, along with mechanical spring 202, also provides for control of rebound during reverse braking, and/or extreme roll events. In this manner, driver side rear beam 518R and mechanical spring 202 of driver side tandem assembly 501D of fourth exemplary embodiment tandem mechanical spring axle/suspension system 500 are operatively engaged.

As driver side front beam 518F and driver side rear beam 518R of driver side tandem assembly 501D are each operatively engaged with mechanical spring 202 of the tandem assembly in the manner described above, the driver side tandem assembly provides a hybrid combination air-ride and mechanical-type tandem assembly which utilizes a single mechanical spring in order to react loads from driver side front suspension assembly 517F and driver side rear suspension assembly 517R of front and rear axle/suspension systems 520F and 520R, respectively. Moreover, because mechanical spring 202 is operatively engaged with main member 511 of subframe 510 in the manner described above, the mechanical spring reacts loads from driver side front beam 518F and driver side rear beam 518R directly onto the main member during operation of the heavy-duty vehicle. The single mechanical spring 202 replaces a pair of air springs located on the driver side front and rear suspension assemblies of the front and rear axle/suspension systems of prior art tandem air-ride axle/suspension systems, such as prior art tandem air-ride axle/suspension system 108 (FIG. 3) described above, and also replaces a pair of mechanical spring stacks located on the driver side front and rear suspension assemblies of front and rear axle/suspension systems of prior art tandem mechanical spring axle/suspension systems, such as prior art tandem mechanical spring axle/suspension system 10 (FIGS. 1-2) described above.

Thus, fourth exemplary embodiment tandem mechanical spring axle/suspension system 500 provides a tandem axle/suspension system with reduced spring rate compared to prior art tandem mechanical spring axle/suspension systems, reduces inter-axle load transfer due to braking, improves the distribution of forces encountered by the tandem axle/suspension system during operation, eliminates the clamp assemblies and radius rods employed by the front and rear axle/suspensions of prior art tandem mechanical sprig axle/suspension systems, and decreases the stresses placed on the subframe of the heavy-duty vehicle, while being generally lighter weight and more economical than prior art tandem air-ride axle/suspension systems. Accordingly, fourth exemplary embodiment tandem mechanical spring axle/suspension system 500 provides a tandem axle/suspension system that is light weight, provides improved ride quality, braking and handling, maintains static and dynamic load equalization between the axles of the tandem axle/suspension system, and lowers manufacturing and maintenance costs.

Figure 24:
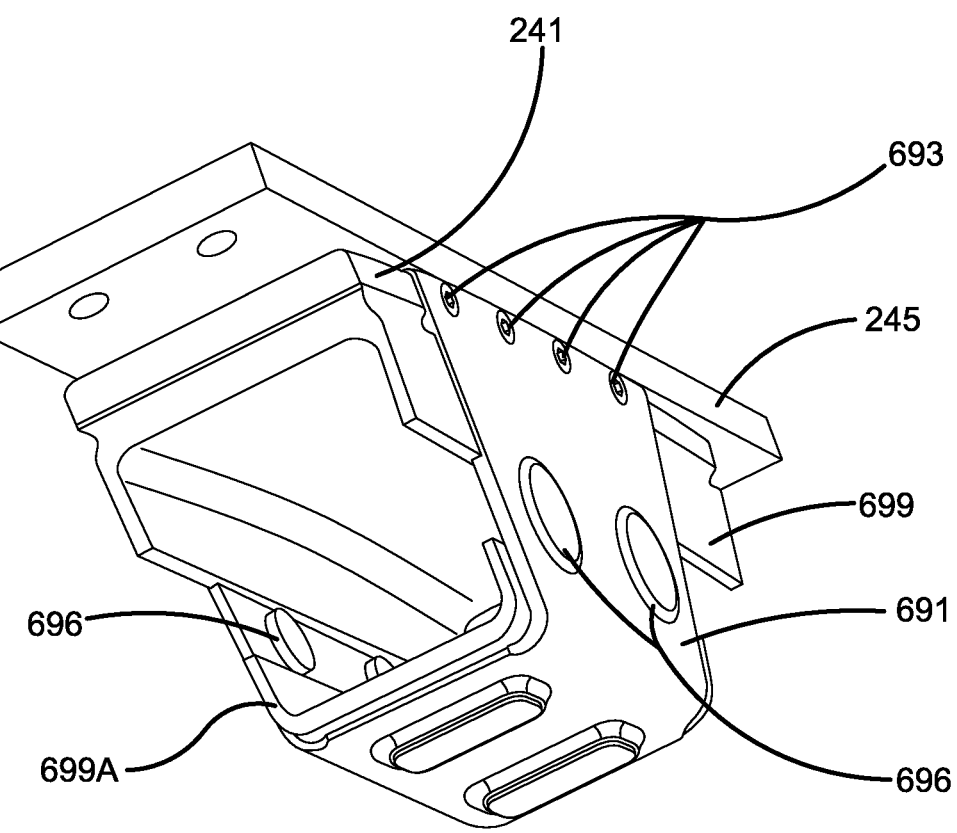
FIG. 24 is an enlarged perspective view of the alternative mechanically enhanced connection shown in FIG. 23, shown with the mechanical spring removed.

Turning now to FIGS. 24 and 25, an alternative means for the operative engagement of mechanical spring 202 to main member 211 and 411 for first and third exemplary embodiment tandem mechanical spring axle/suspension systems 200 and 400, respectively, is shown. This alternative means for operative engagement allows mechanical spring 202 to slide longitudinally, but offers additional mechanically enhanced vertical support to the mechanical spring at member interface 241 of the mechanical spring. More particularly, a wrap 691 formed from metal or other suitably robust material is disposed around mechanical spring 202, including an upper cushion 699 and a lower cushion 699A positioned on the top and bottom of mechanical spring 202 at middle portion 237 of the mechanical spring, and is fastened to member interface 241 via fasteners 693. Pairs of wear pads 696 are disposed through each of the inboard and outboard sides of wrap 691, which protect the wrap from wear against the sidewalls (not shown) of the rear hanger (not shown).

As mentioned above, exemplary embodiment tandem mechanical spring axle/suspension systems 200,300,400, and 500 are designed to absorb forces that act on the heavy-duty vehicle as it is operating. More particularly, it is desirable for tandem mechanical spring axle/suspension systems 200,300,400, and 500 to be rigid or stiff in order to resist roll forces and thus provide roll stability for the vehicle. This is typically accomplished by using front and rear beams, respectively, which are rigid, and also are rigidly attached to the front and rear axles, respectively. It is also desirable, however, for tandem mechanical spring axle/ suspension systems 200,300,400, and 500 to be flexible to assist in cushioning the vehicle (not shown) from vertical impacts and to provide compliance so that the axle/suspension system resists failure and protects the vehicle and cargo. Such flexibility typically is achieved through the pivotal connection of the front and rear beams to the front and rear hangers, respectively, utilizing the bushing assembly. Mechanical spring 202 assists in cushioning the ride for cargo and passengers. The rigid connection of the front and rear beams to their respective front or rear axle, provides a structure that reacts lateral, transverse, and torsional loads during operation of the vehicle.

Tandem mechanical spring axle/suspension systems 200, 300,400, and 500 of the subject disclosure overcome the problems and deficiencies of prior art mechanical spring axle/suspension systems and air-ride axle/suspension systems by providing a tandem mechanical spring axle/suspension system that incorporates a pair of mechanical springs 202, each one of which spans and is operatively engaged with a respective side of the front axle/suspension system and the rear axle/suspension system of the tandem axle/suspension system, and which is also operatively engaged with a respective main member 211,311,411,511 of the heavy-duty vehicle, which is light weight, provides improved ride quality, braking and handling, maintains static and dynamic load equalization between the axles of the tandem axle/suspension system and lowers manufacturing and maintenance costs.

Exemplary embodiment tandem mechanical spring axle/suspension systems 200,300,400, and 500 of the subject disclosure provide a hybrid combination air-ride and mechanical-type tandem axle/suspension system which utilizes a pair of mechanical springs in order to react loads from the driver side and passenger side suspension assemblies of the front and rear axle/suspension systems, respectively. Each mechanical spring 202 of exemplary embodiment tandem mechanical spring axle/suspension systems 200,300, 400, and 500 of the subject disclosure replaces a pair of air springs located on the driver side or passenger side suspension assemblies of prior art front and rear air-ride axe/suspension systems, respectively, and also replaces a pair of mechanical springs located on the driver side or passenger side suspension assemblies of prior art front and rear mechanical spring axle/suspension systems, respectively, shown above.

Exemplary embodiment tandem mechanical spring axle/suspension systems 200,300,400, and 500 overcome the disadvantages of prior art mechanical and air-ride axle/suspension systems by reducing inter-axle load transfer due to braking, improving the distribution of forces encountered by the axle/suspension system, and decreasing the stresses placed on the vehicle subframe, while being lighter in weight and more economical than prior art mechanical spring and air-ride axle/suspension systems. In addition, exemplary embodiment tandem mechanical spring axle/suspension systems 200,300,400, and 500 avoid ABS cycling and eliminate the need for radius rods and/or stabilizer bars.

Exemplary embodiment tandem mechanical spring axle/suspension systems 200,300,400, and 500 of the subject disclosure allow the front and rear axles to articulate freely and independently. In addition, exemplary embodiment tandem mechanical spring axle/suspension systems 200,300, 400, and 500 maintain both static and dynamic load share equalization between the front and rear axles. Exemplary embodiment tandem mechanical spring axle/suspension systems 200,300,400, and 500 eliminate the need for air springs, hoses, tanks, compressed air, and height control valves, and as a result, save weight, manufacturing cost and also reduce maintenance costs over the life of the suspension system. Exemplary embodiment tandem mechanical spring axle/suspension systems 200,300,400, and 500 react vertical loads of the vehicle and provide primary roll stability while the suspension structure performs the function of maintaining control of the axle and allowing it to articulate. The suspension structure of exemplary embodiment tandem mechanical spring axle/suspension systems 200,300,400, and 500 provide significant auxiliary roll stability, allowing mechanical spring 202 to be designed for a softer overall spring rate, thus achieving excellent ride and handling characteristics. More specifically, mechanical spring 202 of exemplary embodiment tandem mechanical spring axle/suspension systems 200,300,400, and 500 of the subject disclosure has a spring rate that is generally lower than prior art tandem mechanical spring axle/suspension systems, thus providing improved ride quality without sacrificing handling. Exemplary embodiment tandem mechanical spring axle/suspension systems 200,300,400, and 500 eliminate the axle-to-spring clamp group found in prior art tandem mechanical spring axle/suspension systems, thereby increasing durability of the suspension system. Exemplary embodiment tandem mechanical spring axle/suspension systems 200,300,400, and 500 provide improved braking, decreased stopping distances, and reduced irregular tire wear. Exemplary embodiment tandem mechanical spring axle/suspension systems 200,300,400, and 500 are lightweight and provide soft ride characteristics including added comfort and cargo protection. Mechanical spring 202 of exemplary embodiment tandem mechanical spring axle/suspension systems 200,300,400, and 500 of the subject disclosure effectively react large axle excursions and cross-articulations without causing undue stress to the main members of the subframe. More specifically, for large vertical excursions of any one of the front or rear axles, or any particular corner thereof, mechanical spring 202 maintains equal axle load and reduces vertical input to the subframe.

It is contemplated that exemplary embodiment tandem mechanical spring axle/suspension systems 200,300,400, and 500 could be utilized with different types of beams than those shown and described, including underslung, overslung and through-the-wall beams, having differing shapes and sizes, and methods for making the beams, including casting, forging, stamping, and fabricating, and the like, without changing the overall concept or operation of the subject disclosure. It is also contemplated that exemplary embodiment tandem mechanical spring axle/suspension systems 200,300,400, and 500 could be utilized with all types of heavy-duty vehicles, including trucks, buses, trailers, tractor-trailers, etc., without changing the overall concept or operation of the subject disclosure. It is even further contemplated that exemplary embodiment tandem mechanical spring axle/suspension systems 200,300,400, and 500 could be utilized with all types of mechanical springs with differing shapes and sizes and formed from different materials including metal and other materials without changing the overall concept or operation of the subject disclosure. It is further contemplated that exemplary embodiment tandem mechanical spring axle/suspension systems 200,300,400, and 500 of the subject disclosure could be utilized on vehicles having frames or subframes which are moveable or non-movable without changing the overall concept or operation of the subject disclosure. It is yet even further contemplated that exemplary embodiment tandem mechanical spring axle/suspension systems 200,300,400, and 500 of the subject disclosure could be utilized on all types of axle/suspension systems, such as leading and/or trailing arm beam-type axle/suspension system designs known to those skilled in the art without changing the overall concept or operation of the subject disclosure. It is also contemplated that exemplary embodiment tandem mechanical spring axle/suspension systems 200,300,400, and 500 of the subject disclosure could be utilized in conjunction with other types of rigid beam-type axle/suspension systems such as those using U-bolts, U-bolt brackets/axle seats and the like, without changing the overall concept or operation of the subject disclosure. It is further contemplated that mechanical spring 202 of exemplary embodiment tandem mechanical spring axle/suspension systems 200,300,400, and 500 of the subject disclosure could be formed from various materials, including composites, metal and the like, without changing the overall concept or operation of the subject disclosure.

Accordingly, the tandem mechanical spring axle/suspension system for heavy-duty vehicles of the subject disclosure is simplified, provides an effective, safe, inexpensive, and efficient structure which achieves all the enumerated objectives, provides for eliminating difficulties encountered with prior art axle/suspension systems, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the disclosed subject matter has been described with reference to a specific embodiments. It shall be understood that these illustrations are by way of example and not by way of limitation, as the scope of the invention is not limited to the exact details shown or described. Potential modifications and alterations will occur to others upon a reading and understanding of the subject disclosure, and it is understood that the disclosed subject matter includes all such modifications, alterations, and equivalents thereof.

Having now described the features, discoveries and principles of the subject disclosure, the manner in which the tandem mechanical spring axle/suspension system for heavy-duty vehicles is constructed, arranged and used, the characteristics of the construction and arrangement, and the advantageous, new and useful results obtained; the new and useful structures, devices, elements, arrangements, parts and combinations are set forth in the claims.

What is claimed is:

1. A tandem assembly for a suspension system of a heavy-duty vehicle comprising:
   a front suspension assembly pivotally attached to a main member of said heavy-duty vehicle;
   a rear suspension assembly pivotally attached to said main member; and
   a single mechanical spring, a first end of said mechanical spring being operatively engaged with a longitudinally extending front beam of said front suspension assembly, a middle portion of the mechanical spring being operatively engaged with the main member, and a second end of said mechanical spring being operatively engaged with a longitudinally extending rear beam of said rear suspension assembly.

2. The tandem assembly for a suspension system of a heavy-duty vehicle of claim 1, wherein said mechanical spring tapers in both a transverse width and a vertical thickness in a semi-parabolic manner along a length of the mechanical spring.

3. The tandem assembly for a suspension system for a heavy-duty vehicle of claim 1, wherein said mechanical spring is a monoleaf having a constant cross-sectional area.

4. The tandem assembly for a suspension system for a heavy-duty vehicle of claim 1, wherein said mechanical spring has a spring rate from 1,000 N/mm (5,700 lb./in.) to 1,926 N/mm (11,000 lb./in.).

5. The tandem assembly for a suspension system for a heavy-duty vehicle of claim 1, wherein said mechanical spring is formed of a composite.

6. The tandem assembly for a suspension system for a heavy-duty vehicle of claim 5, wherein said composite is formed of at least one of fiberglass and epoxy.

7. The tandem assembly for a suspension system for a heavy-duty vehicle of claim 1, wherein said tandem assembly further includes a spring mounting bracket fixedly connected to said front suspension assembly or said rear suspension assembly, said spring mounting bracket providing operative engagement of said mechanical spring with the front suspension assembly or the rear suspension assembly via pivotal connection with a bushing assembly connected to a bottom surface of the mechanical spring.

8. The tandem assembly for a suspension system for a heavy-duty vehicle of claim 7, wherein said tandem assembly further comprises a bumper bracket mounted to a top surface of said mechanical spring, said bumper bracket including a bumper to provide a cushion between the mechanical spring and said main member of said heavy-duty vehicle.

9. The tandem assembly for a suspension system for a heavy-duty vehicle of claim 1, wherein said tandem assembly further comprises:
   a jounce and rebound control structure bracket mounted on said front suspension assembly or said rear suspension assembly;
   a lower slipper fixedly connected to a bottom surface of said mechanical spring;
   an upper jounce and rebound control structure fixedly connected to a top surface of the mechanical spring, said lower slipper being vertically aligned with said upper jounce and rebound control structure; and
   wherein the mechanical spring, the lower slipper, and the upper jounce and rebound control structure are captured by said jounce and rebound control structure bracket to provide operative engagement of said mechanical spring with the front suspension assembly or the rear suspension assembly, whereby the mechanical spring is able to flex, move, rock, pivot, or slide relative to the jounce and rebound control structure bracket.

10. The tandem assembly for a suspension system for a heavy-duty vehicle of claim 9, wherein said jounce and rebound control structure bracket is mounted on said front beam of said front suspension assembly or said rear beam of said rear suspension assembly.

11. The tandem assembly for a suspension system for a heavy-duty vehicle of claim 9, wherein said jounce and rebound control structure bracket further includes:
   a pair of sidewalls forming a clevis; and
   a sleeve extending between said sidewalls, said mechanical spring, said lower slipper, and said upper jounce and rebound control structure being positioned between the sidewalls and below said sleeve.

12. The tandem assembly for a suspension system for a heavy-duty vehicle of claim 11, wherein said upper jounce and rebound control structure includes a shelf, said shelf acting as a positive stop to prohibit excessive frontward or rearward longitudinal movement of said mechanical spring via contact with said sleeve.

13. The tandem assembly for a suspension system for a heavy-duty vehicle of claim 9, wherein said upper jounce and rebound control structure further includes a bumper, said bumper providing a cushion between said mechanical spring and said main member of said heavy-duty vehicle.

14. The tandem assembly for a suspension system for a heavy-duty vehicle of claim 1, wherein said tandem assembly further comprises: a slipper mount mounted on said front suspension assembly or said rear suspension assembly, said slipper mount including a pair of walls;
a lower slipper fixedly connected to a bottom surface of said mechanical spring;
a bracket extending upwardly over the mechanical spring, the bracket being secured to said slipper mount to operatively engage said mechanical spring with the front suspension assembly for the rear suspension assembly; and
wherein said lower slipper and the mechanical spring are disposed within said walls and under said bracket such that the mechanical spring is able to flex, rock, pivot, and/or slide under the bracket and the lower slipper is able to rock, pivot and/or slide on the top surface of the slipper mount within the walls during dynamic movements of said mechanical spring during operation of said heavy-duty vehicle, the mechanical spring remaining generally protected by said lower slipper.

15. The tandem assembly for a suspension system for a heavy-duty vehicle of claim 14, wherein said slipper mount further includes a spring stop, said spring stop providing a positive stop to prohibit excessive frontward or rearward longitudinal movement of said mechanical spring via contact of the mechanical spring with the spring stop.

16. The tandem assembly for a suspension system for a heavy-duty vehicle of claim 1, wherein said middle portion of said mechanical spring is operatively engaged with a hanger and a member bracket, said hanger being fixedly mounted to said main member and said member bracket being fixedly connected to a bottom surface of the main member.

17. The tandem assembly for a suspension system for a heavy-duty vehicle of claim 16, wherein said hanger includes a pair of sidewalls and a bushing disposed between said sidewalls, said member bracket being positioned within the sidewalls, said middle portion of said mechanical spring including a member interface connected to the top of the mechanical spring, the middle portion of said mechanical spring extending through said sidewalls such that a bottom surface of the mechanical spring engages said bushing and said member interface engages said member bracket, whereby said mechanical spring is able to rock, pivot, and/or slide relative to the sidewalls of the hanger.

18. The tandem assembly for a suspension system for a heavy-duty vehicle of claim 17, wherein said member interface includes a fin, said fin being disposed within and cooperating with a groove formed in said member bracket to maintain transverse and longitudinal alignment of said mechanical spring relative to said main member within said hanger during operation of said heavy-duty vehicle.

19. The tandem assembly for a suspension system for a heavy-duty vehicle of claim 1, wherein said middle portion of said mechanical spring is disposed through sidewalls of a hanger fixedly mounted to said main member, the middle portion of the mechanical spring being positioned between a cushion of a top interface plate and a cushion of a bottom interface plate positioned between said sidewalls of said hanger to operatively engage the mechanical spring with the main member.

20. The tandem assembly for a suspension system for a heavy-duty vehicle of claim 19, wherein one or more fasteners are disposed through said sidewalls of said hanger to capture said mechanical spring, said top member interface, said bottom interface plate, and said cushions within the sidewalls and provide operative engagement of the mechanical spring to said main member, whereby said mechanical spring is able to rock, pivot, and/or flex relative to the sidewalls of the hanger.

21. The tandem assembly for a suspension system for a heavy-duty vehicle of claim 1, wherein said middle portion of said mechanical spring is captured by a bolster fixedly attached to said main member, said bolster providing operative engagement of the mechanical spring to the main member, whereby said mechanical spring is able to rock, pivot, and/or flex relative to said bolster.

22. The tandem assembly for a suspension system for a heavy-duty vehicle of claim 21, wherein said bolster is positioned between sidewalls of a hanger fixedly mounted to said main member.

23. The tandem assembly for a suspension system for a heavy-duty vehicle of claim 21, wherein said bolster further includes:
a top plate, said top plate contacting said main member;
a pair of rectangular plates positioned below the top plate, said rectangular plates having arced curvatures along their longitudinal axis;
elastomeric material, said elastomeric material filing spaces between said top plate and said rectangular plates;
an upper cushion, said upper cushion being positioned below said rectangular plates and above said middle portion of said mechanical spring;
a lower cushion, said lower cushion being positioned below the mechanical spring; and
a sleeve, said sleeve being disposed around the upper cushion, the middle portion of the mechanical spring, and the lower cushion, said sleeve being secured to the bolster.

24. The tandem assembly for a suspension system for a heavy-duty vehicle of claim 1, wherein said middle portion of said mechanical spring is operatively engaged with a member bracket fixedly connected to a bottom surface of said main member via a structure that includes:
a member interface connected to said member bracket;
an upper cushion positioned on a top surface of the middle portion of said mechanical spring;
a lower cushion positioned on a bottom surface of said middle portion of the mechanical spring; and
a sleeve disposed around the upper cushion, the middle portion of the mechanical spring, and the lower cushion, said sleeve being secured to said member interface.

25. A mechanical spring for a suspension system for a heavy-duty vehicle comprising:
an elongate structure, said elongate structure tapering in both a transverse width and a vertical thickness in a semi-parabolic manner along a length of the elongate structure, wherein said vertical thickness of said elongate structure at least decreases, then increases, and then decreases along said length moving in a direction from a front end of the elongate structure to a rear end of said elongate structure.

26. The mechanical spring for a suspension system for a heavy-duty vehicle of claim 25, wherein said mechanical spring is a monoleaf having a constant cross-sectional area along said length.

27. The mechanical spring for a suspension system for a heavy-duty vehicle of claim 25, wherein said mechanical spring has a spring rate from 1,000 N/mm (5,700 lb./in.) to 1,400 N/mm (11,000 lb./in.).

28. The mechanical spring for a suspension system for a heavy-duty vehicle of claim 25, wherein said mechanical spring is formed of a composite.

29. The mechanical spring for a suspension system for a heavy-duty vehicle of claim 28, wherein said composite is formed of at least one of fiberglass and epoxy.

30. A mechanical spring for a suspension system for a heavy-duty vehicle comprising:
an elongate structure, said elongate structure tapering in both a transverse width and a vertical thickness in a semi-parabolic manner along a length of the elongate structure, wherein said mechanical spring is a monoleaf having a constant cross-sectional area along said length.

31. A tandem assembly for a suspension system of a heavy-duty vehicle comprising:
a front suspension assembly pivotally attached to a main member of said heavy-duty vehicle;
a rear suspension assembly pivotally attached to said main member; and
a mechanical spring operatively engaged with said front suspension assembly, said rear suspension assembly, and the main member, wherein a middle portion of said mechanical spring is operatively engaged with a hanger and a member bracket, said hanger being fixedly mounted to said main member and said member bracket being fixedly connected to a bottom surface of the main member.

32. A tandem assembly for a suspension system of a heavy-duty vehicle comprising:
a front suspension assembly pivotally attached to a main member of said heavy-duty vehicle;
a rear suspension assembly pivotally attached to said main member; and
a mechanical spring operatively engaged with said front suspension assembly, said rear suspension assembly, and the main member, wherein a middle portion of said mechanical spring is disposed through sidewalls of a hanger fixedly mounted to said main member, said middle portion of the mechanical spring being positioned between a cushion of a top interface plate and a cushion of a bottom interface plate positioned between said sidewalls of said hanger to operatively engage the mechanical spring with the main member.

33. A tandem assembly for a suspension system of a heavy-duty vehicle comprising:
a front suspension assembly pivotally attached to a main member of said heavy-duty vehicle;
a rear suspension assembly pivotally attached to said main member; and
a mechanical spring operatively engaged with said front suspension assembly, said rear suspension assembly, and the main member, wherein a middle portion of said mechanical spring is captured by a bolster fixedly attached to said main member, said bolster providing operative engagement of the mechanical spring to the main member, whereby said mechanical spring is able to rock, pivot, and/or flex relative to the bolster, said bolster including:
a top plate, said top plate contacting said main member;
a pair of rectangular plates positioned below the top plate, said rectangular plates having arced curvatures along their longitudinal axis;
elastomeric material, said elastomeric material filing spaces between said top plate and the rectangular plates;
an upper cushion, said upper cushion being positioned below said rectangular plates and above said middle portion of the mechanical spring;
a lower cushion, said lower cushion being positioned below said mechanical spring; and
a sleeve, said sleeve being disposed around the upper cushion, the middle portion of the mechanical spring, and the lower cushion, the sleeve being secured to the bolster.

34. A tandem assembly for a suspension system of a heavy-duty vehicle comprising:
a front suspension assembly pivotally attached to a main member of said heavy-duty vehicle;
a rear suspension assembly pivotally attached to said main member; and
a mechanical spring operatively engaged with said front suspension assembly, said rear suspension assembly, and the main member, wherein a middle portion of said mechanical spring is operatively engaged with a member bracket fixedly connected to a bottom surface of said main member via a structure that includes:
a member interface connected to said member bracket;
an upper cushion positioned on a top surface of said middle portion of the mechanical spring;
a lower cushion positioned on a bottom surface of the middle portion of said mechanical spring; and
a sleeve disposed around said upper cushion, said middle portion of the mechanical sleeve, and said lower cushion, said sleeve being secured to said member interface.

* * * * *